(12) United States Patent
Sia

(10) Patent No.: US 10,233,902 B2
(45) Date of Patent: Mar. 19, 2019

(54) POWER GENERATING WINDBAGS AND WATERBAGS

(71) Applicant: Yik Hei Sia, Johor Bahru (MY)

(72) Inventor: Yik Hei Sia, Johor Bahru (MY)

( * ) Notice: Subject to any disclaimer, the term of this patent is extended or adjusted under 35 U.S.C. 154(b) by 0 days.

(21) Appl. No.: 15/889,937

(22) Filed: Feb. 6, 2018

(65) Prior Publication Data

US 2018/0163702 A1     Jun. 14, 2018

Related U.S. Application Data

(63) Continuation of application No. 15/630,670, filed on Jun. 22, 2017, now Pat. No. 10,113,534, which is a continuation-in-part of application No. 15/270,500, filed on Sep. 20, 2016, now Pat. No. 9,698,652, which is a continuation of application No. 14/976,855, filed
(Continued)

(30) Foreign Application Priority Data

Apr. 26, 2012    (SG) .................................. 01203067-2
Apr. 19, 2013    (SG) .................................. 01302987-1

(51) Int. Cl.

| | |
|---|---|
| *F03D 5/02* | (2006.01) |
| *F03D 7/06* | (2006.01) |
| *F03D 5/00* | (2006.01) |
| *F03D 9/30* | (2016.01) |
| *F03B 17/06* | (2006.01) |
| *F03D 15/10* | (2016.01) |
| *H02K 7/06* | (2006.01) |
| *H02K 7/18* | (2006.01) |
| *F03D 9/25* | (2016.01) |

(Continued)

(52) U.S. Cl.
CPC .............. *F03D 7/06* (2013.01); *B64C 39/022* (2013.01); *B64C 39/024* (2013.01); *F03B 17/06* (2013.01); *F03D 5/00* (2013.01); *F03D 5/02* (2013.01); *F03D 9/008* (2013.01); *F03D 9/25* (2016.05); *F03D 9/30* (2016.05); *F03D 15/10* (2016.05); *H02K 7/06* (2013.01); *H02K 7/1853* (2013.01); *B64C 2201/12* (2013.01); *F05B 2220/70* (2013.01); *F05B 2240/922* (2013.01); *F05B 2240/923* (2013.01); *F05B 2270/18* (2013.01); *F05B 2270/20* (2013.01); *Y02E 10/28* (2013.01); *Y02E 10/70* (2013.01); *Y02E 10/725* (2013.01)

(58) Field of Classification Search
None
See application file for complete search history.

(56) References Cited

U.S. PATENT DOCUMENTS

| | | | |
|---|---|---|---|
| 8,242,621 B1 * | 8/2012 | Tate .................... | F03B 13/20 290/42 |
| 2002/0158472 A1* | 10/2002 | Robson ................ | F03B 17/061 290/43 |

(Continued)

*Primary Examiner* — Jonathan M Dager
*Assistant Examiner* — Garrett F Evans
(74) *Attorney, Agent, or Firm* — K. David Crockett, Esq.; Niky Economy Syrengelas, Esq.

(57) ABSTRACT

A method of using a bagged power generation system comprising windbags and waterbags integrated with drones and adapting drone technologies for harnessing wind and water power to produce electricity. An extremely scalable and environmentally friendly method, system, apparatus, equipment, techniques and ecosystem configured to produce renewable green energy with high productivity and efficiency.

2 Claims, 20 Drawing Sheets

Related U.S. Application Data on Dec. 21, 2015, now Pat. No. 9,447,775, which is a continuation of application No. 14/608,511, filed on Jan. 29, 2015, now Pat. No. 9,234,501, which is a continuation of application No. 13/870,413, filed on Apr. 25, 2013, now Pat. No. 8,963,362.

(51) Int. Cl.
*B64C 39/02* (2006.01)
*F03D 9/00* (2016.01)

(56) References Cited

U.S. PATENT DOCUMENTS

| | | | | |
|---|---|---|---|---|
| 2007/0257492 | A1* | 11/2007 | Robson | F03B 13/264 |
| | | | | 290/54 |
| 2010/0276934 | A1* | 11/2010 | Francis | F03B 17/06 |
| | | | | 290/54 |
| 2013/0068153 | A1* | 3/2013 | Hine | B63G 8/08 |
| | | | | 114/337 |

* cited by examiner

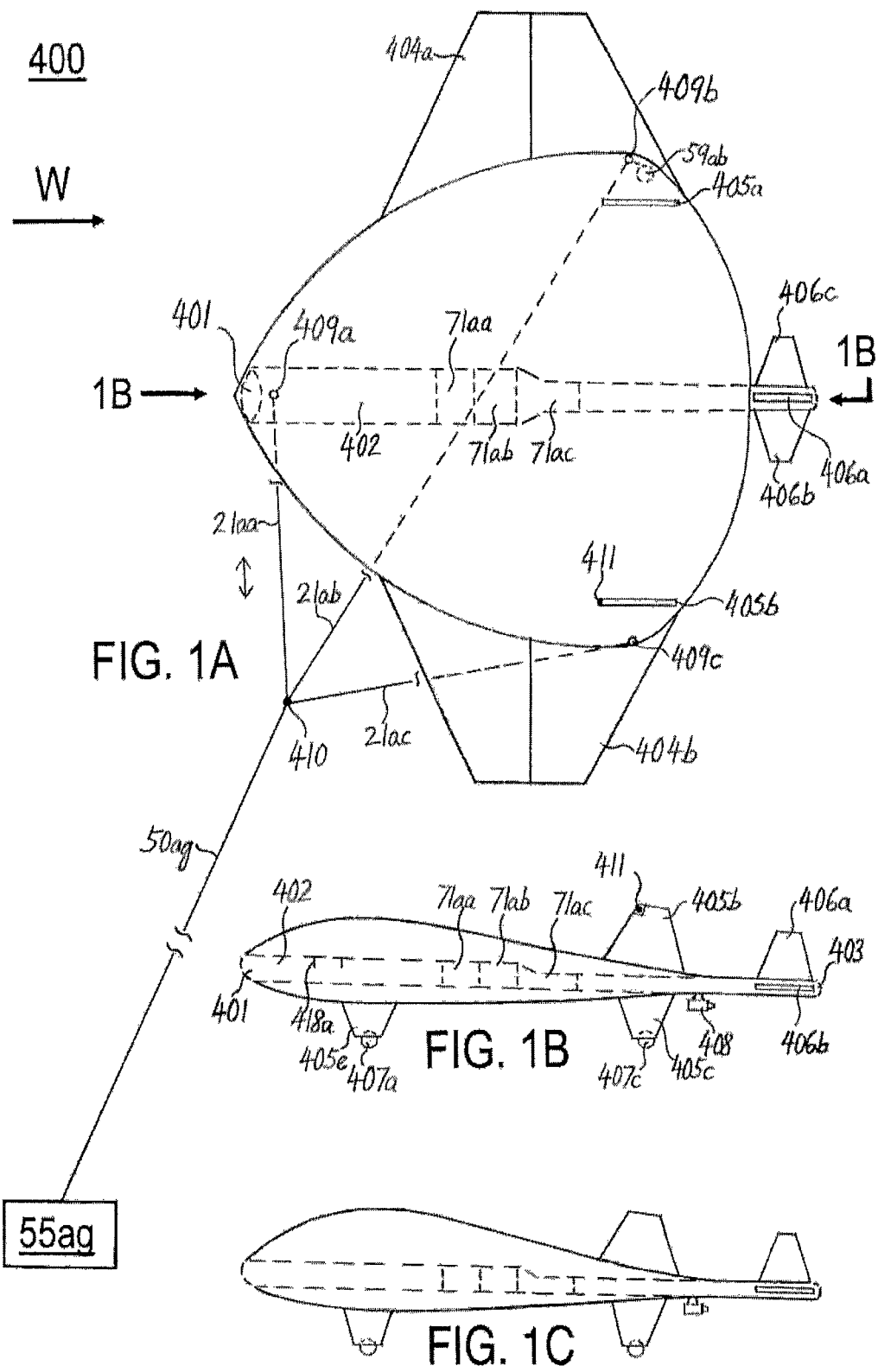

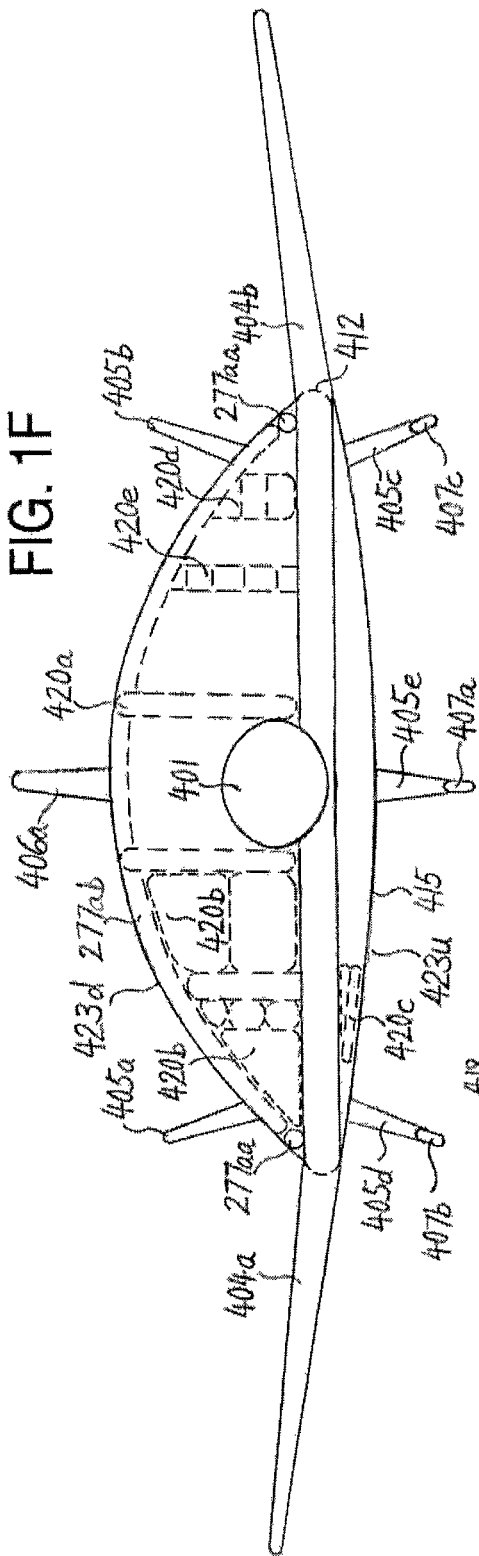
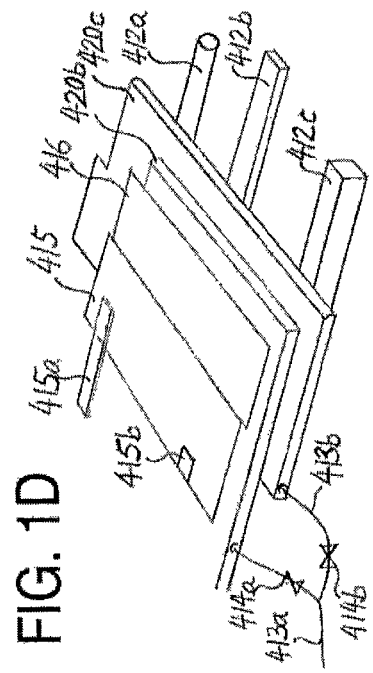
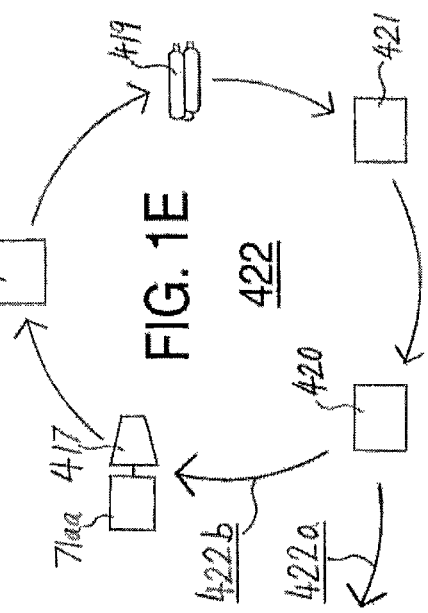

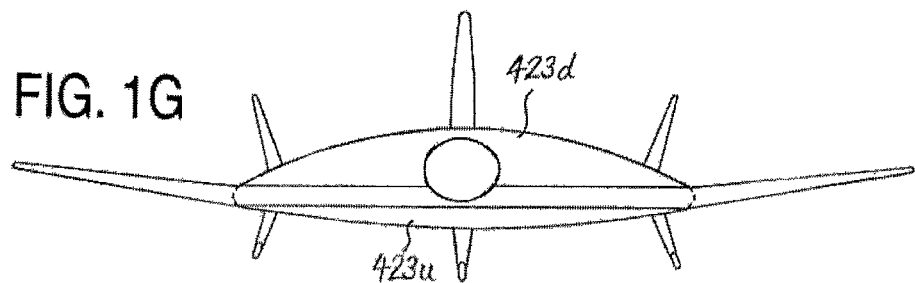
FIG. 1G
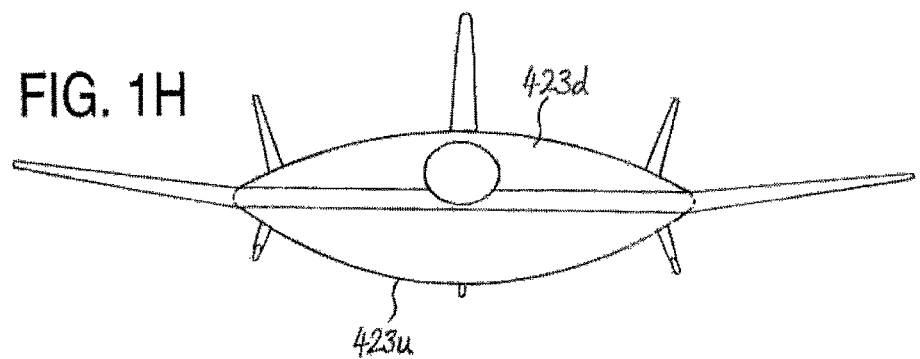
FIG. 1H
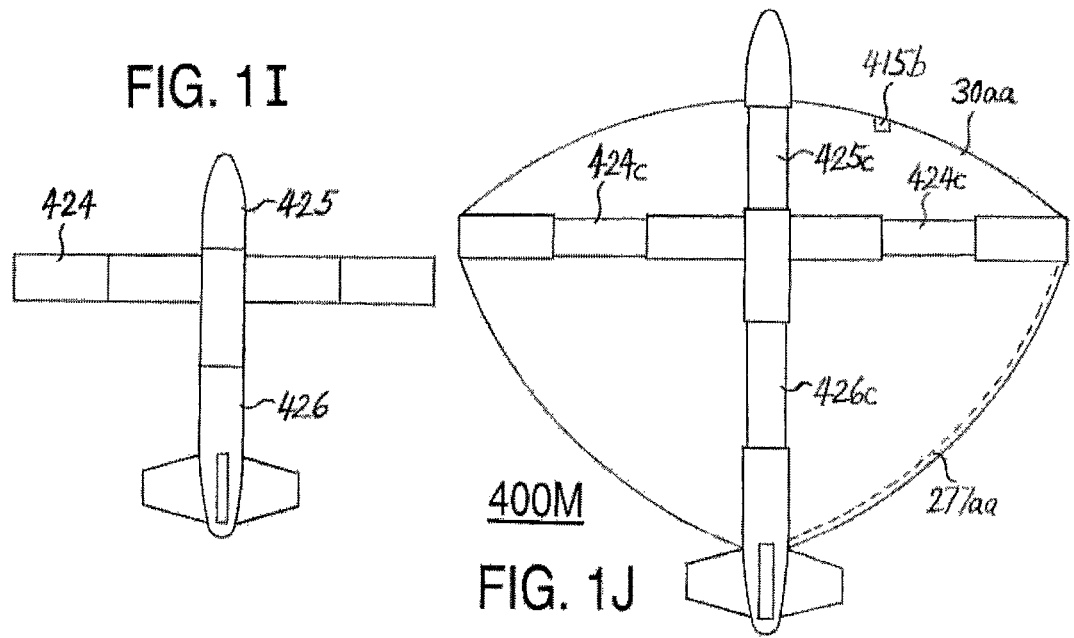
FIG. 1I
FIG. 1J

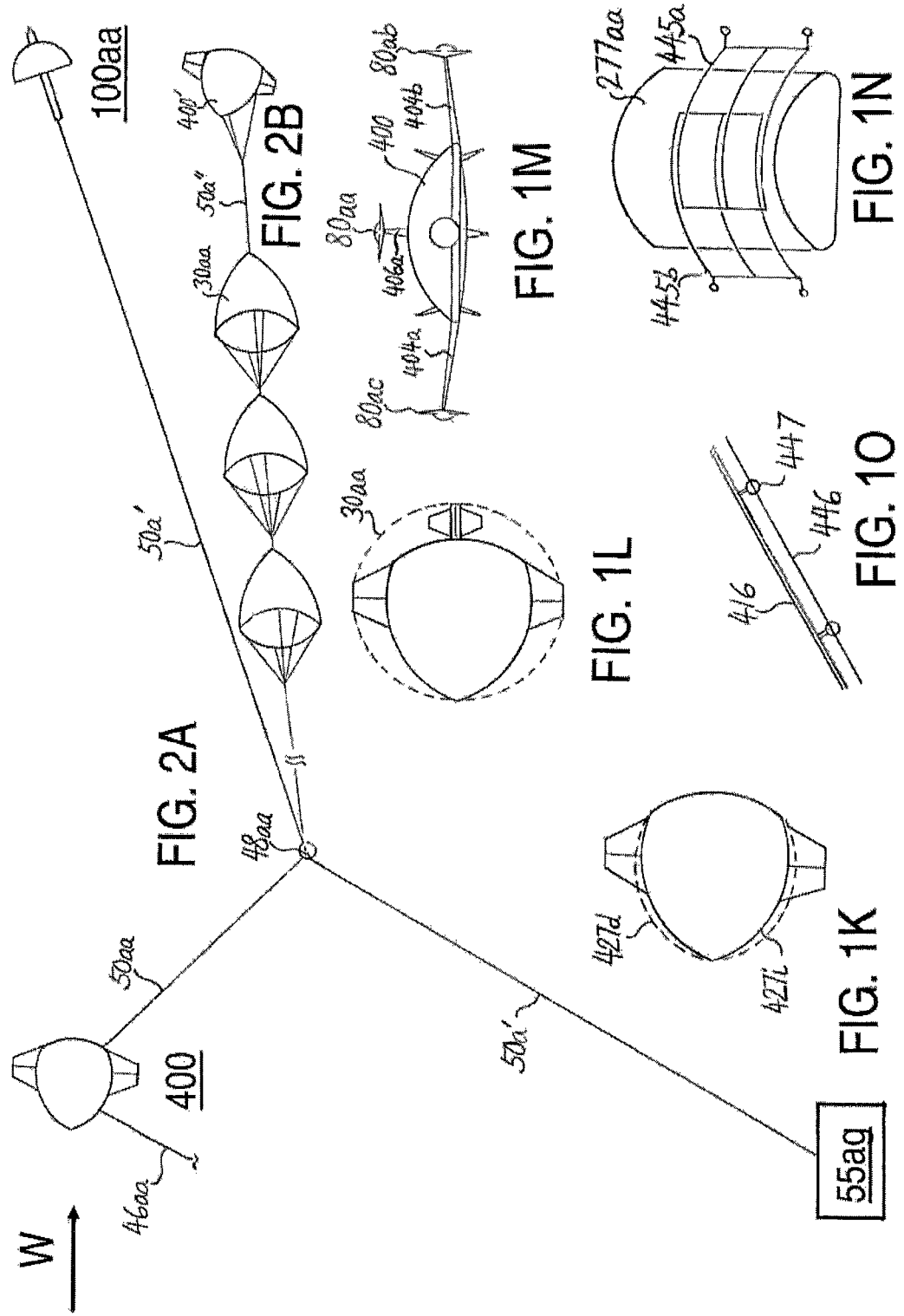

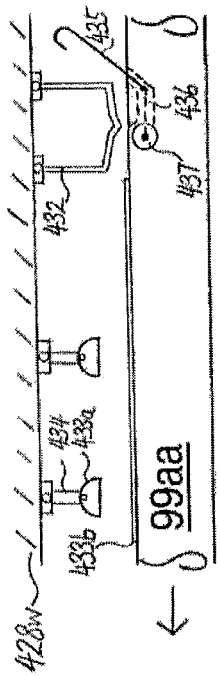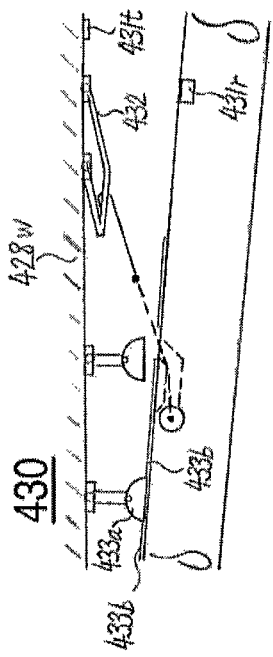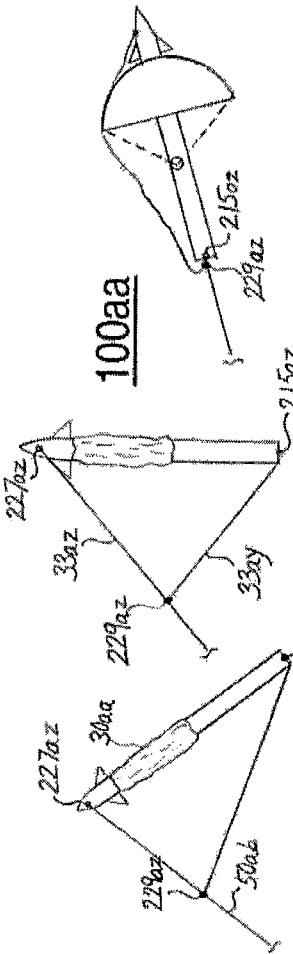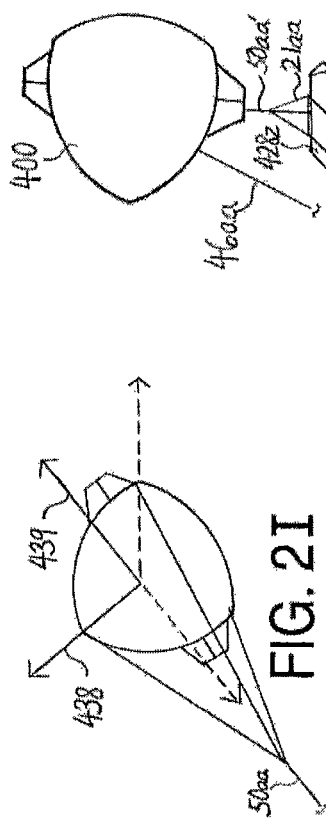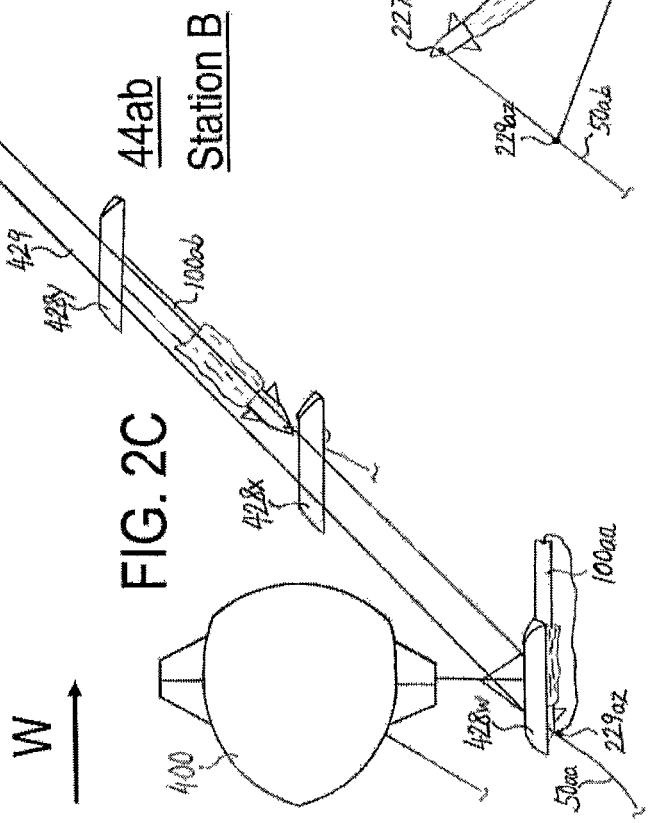

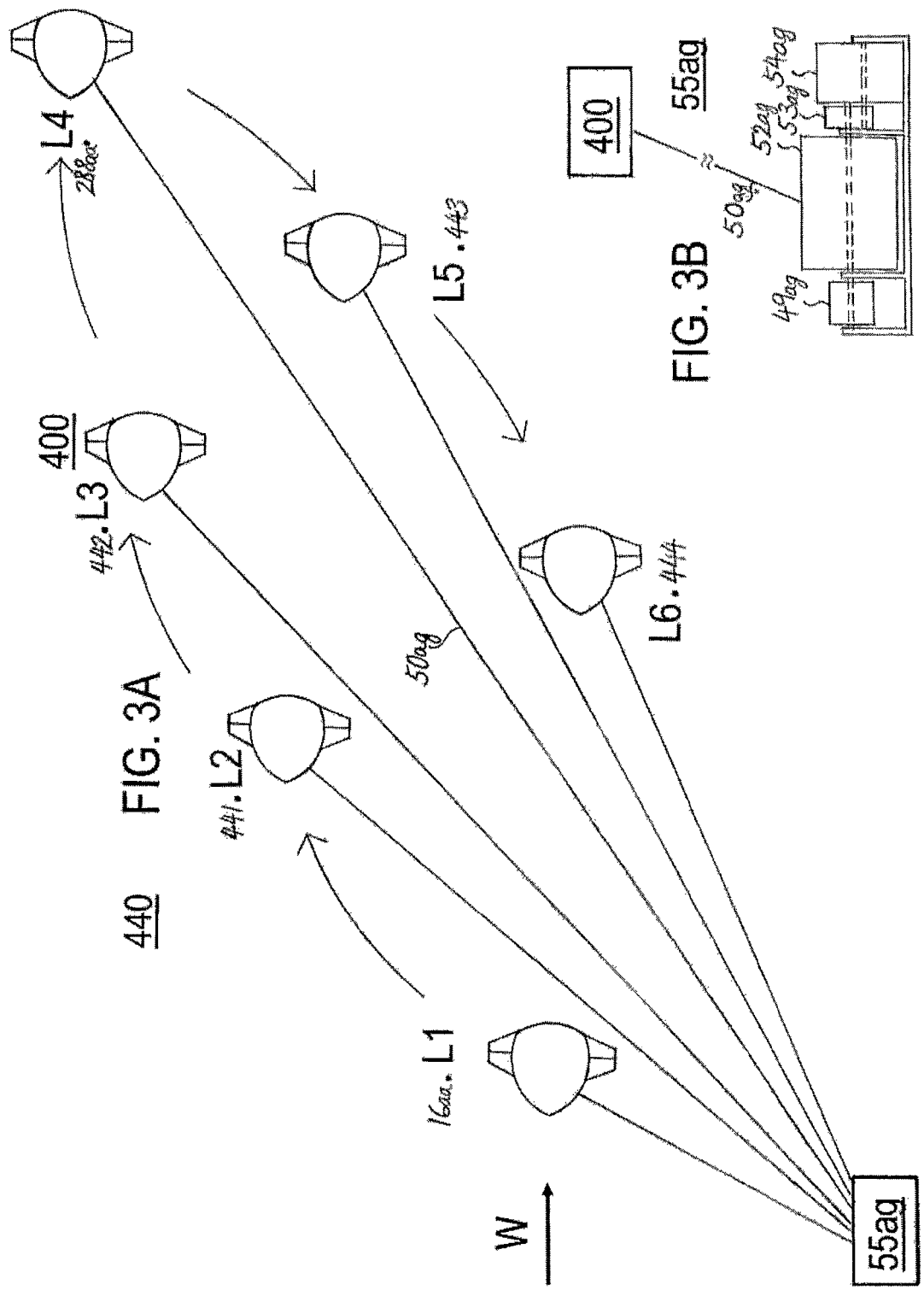

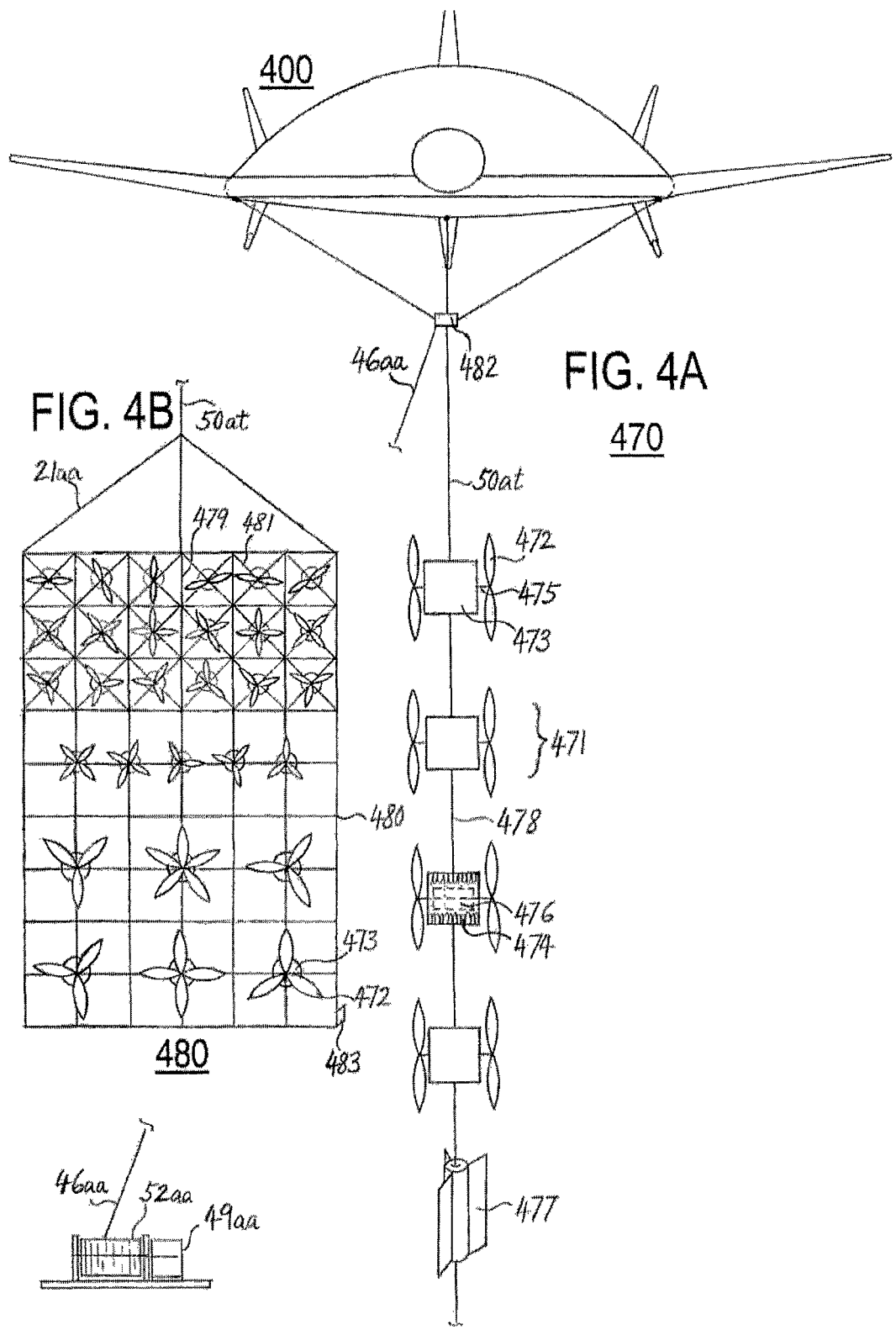

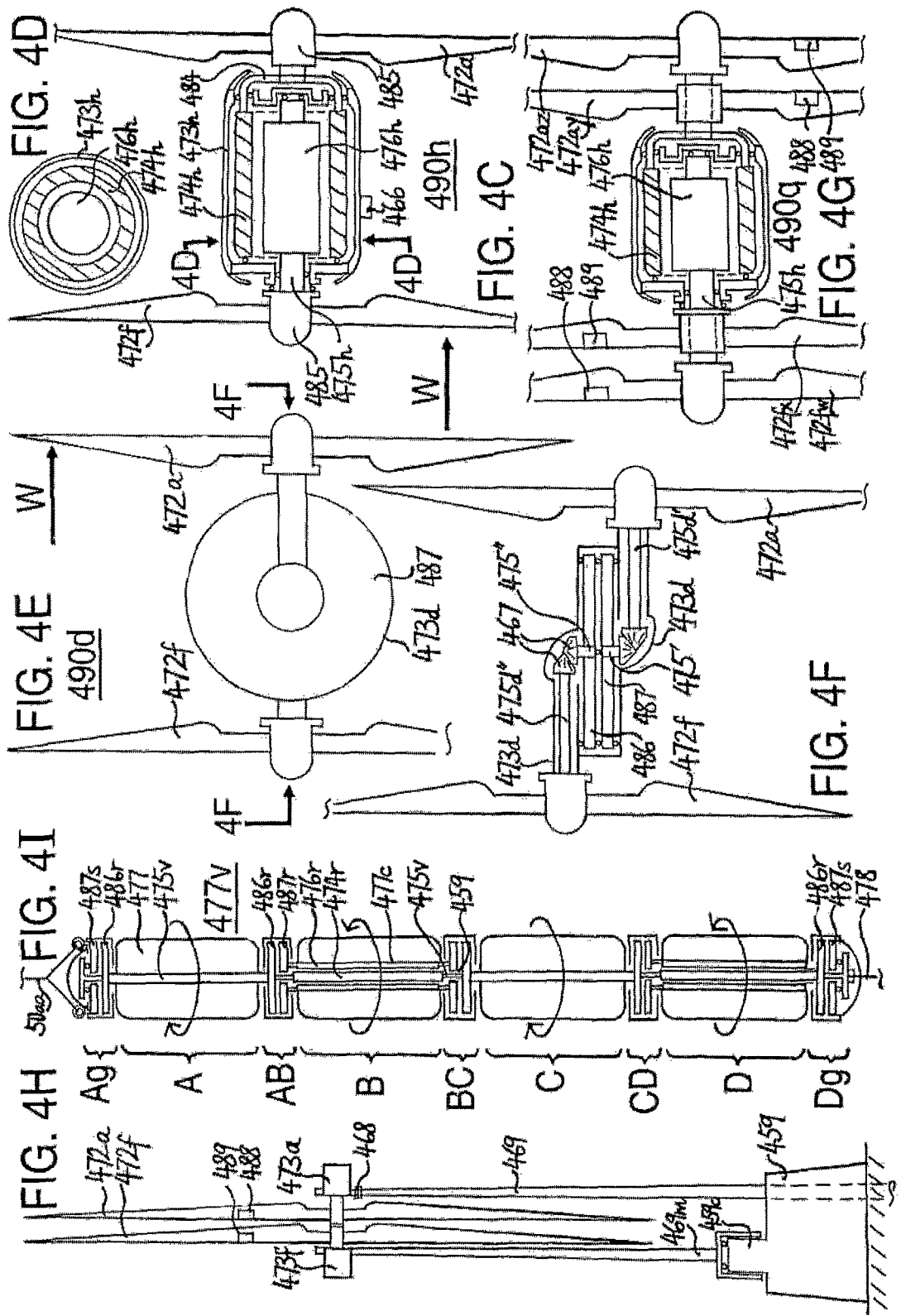

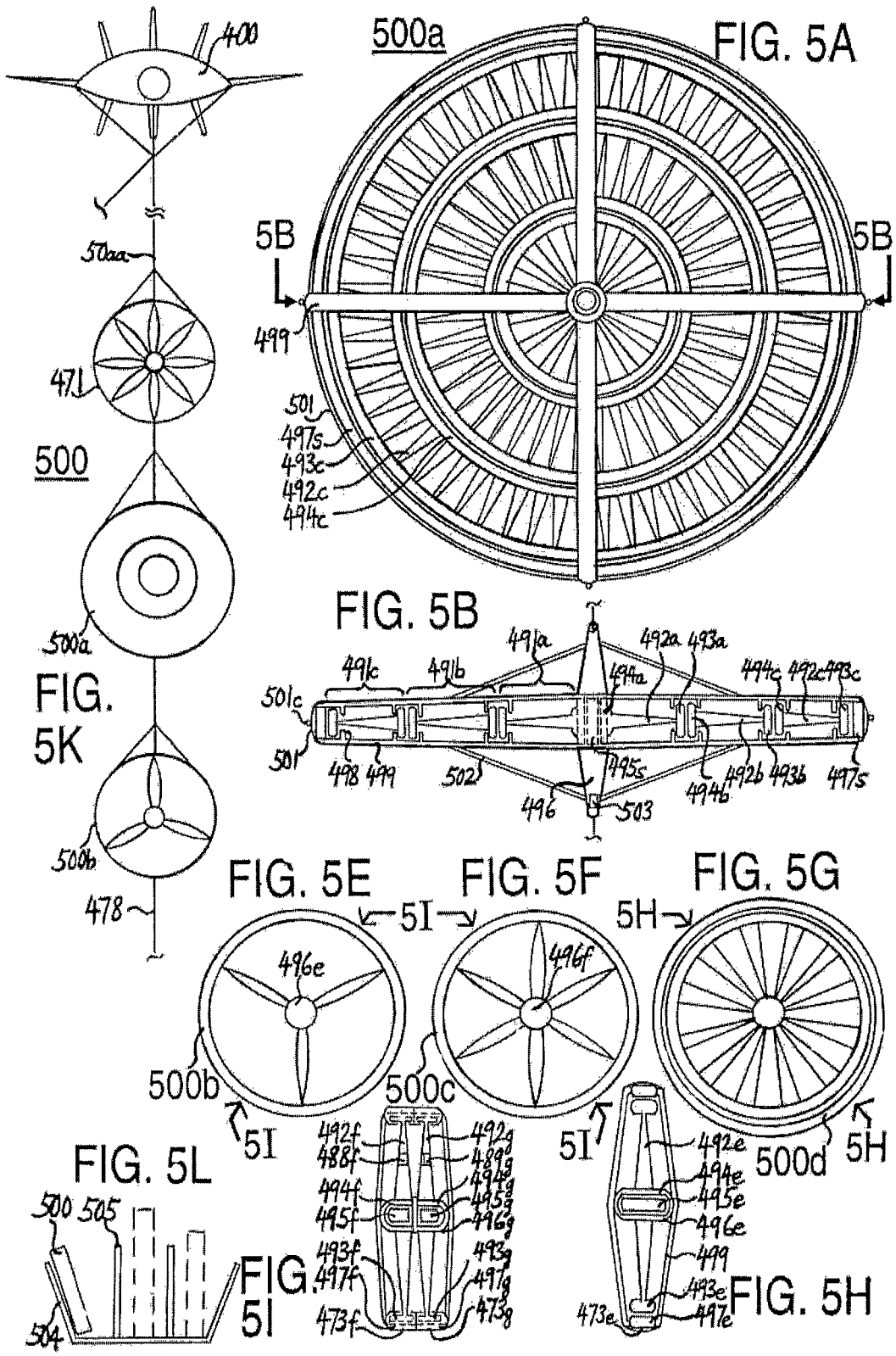

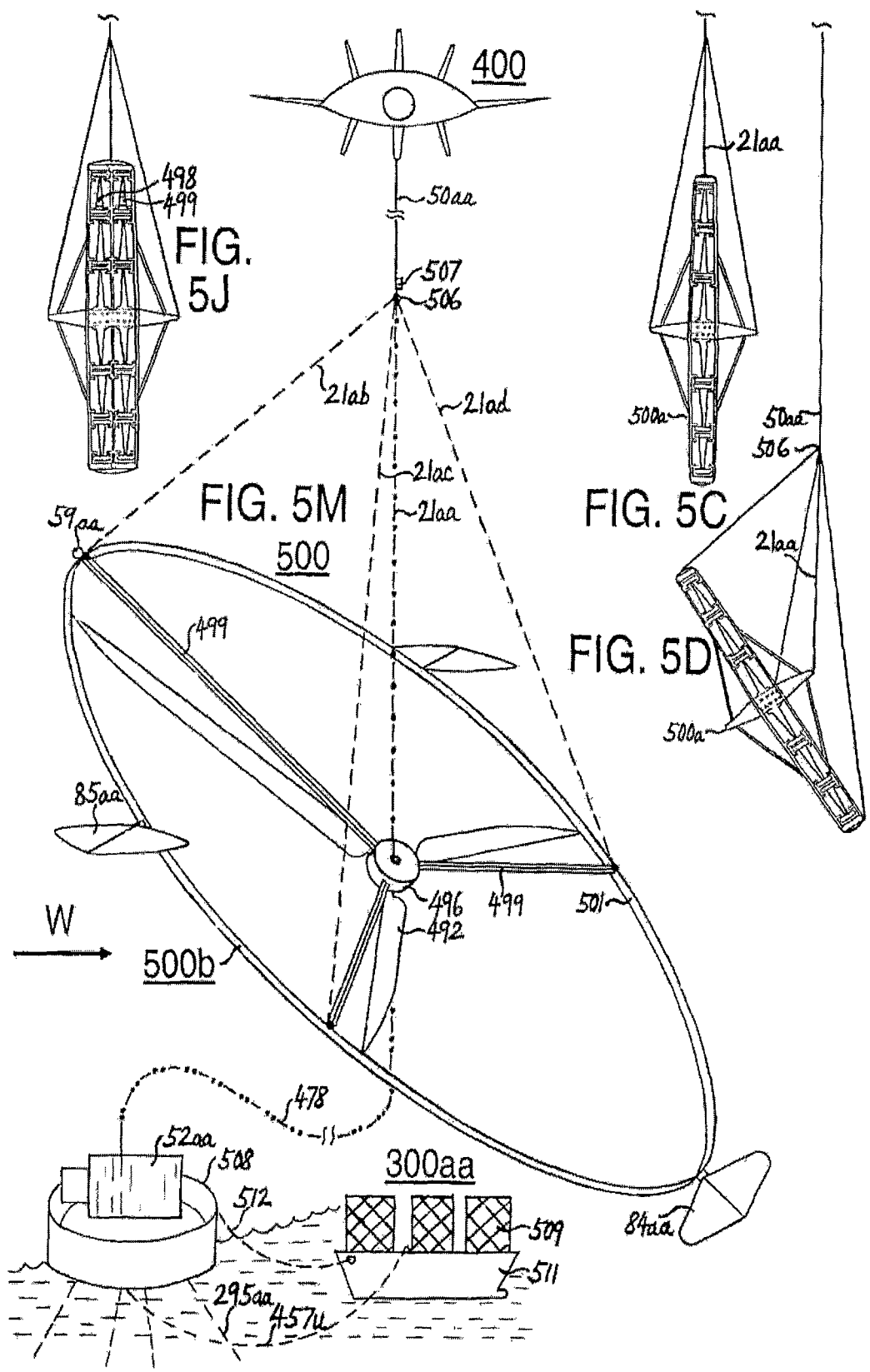

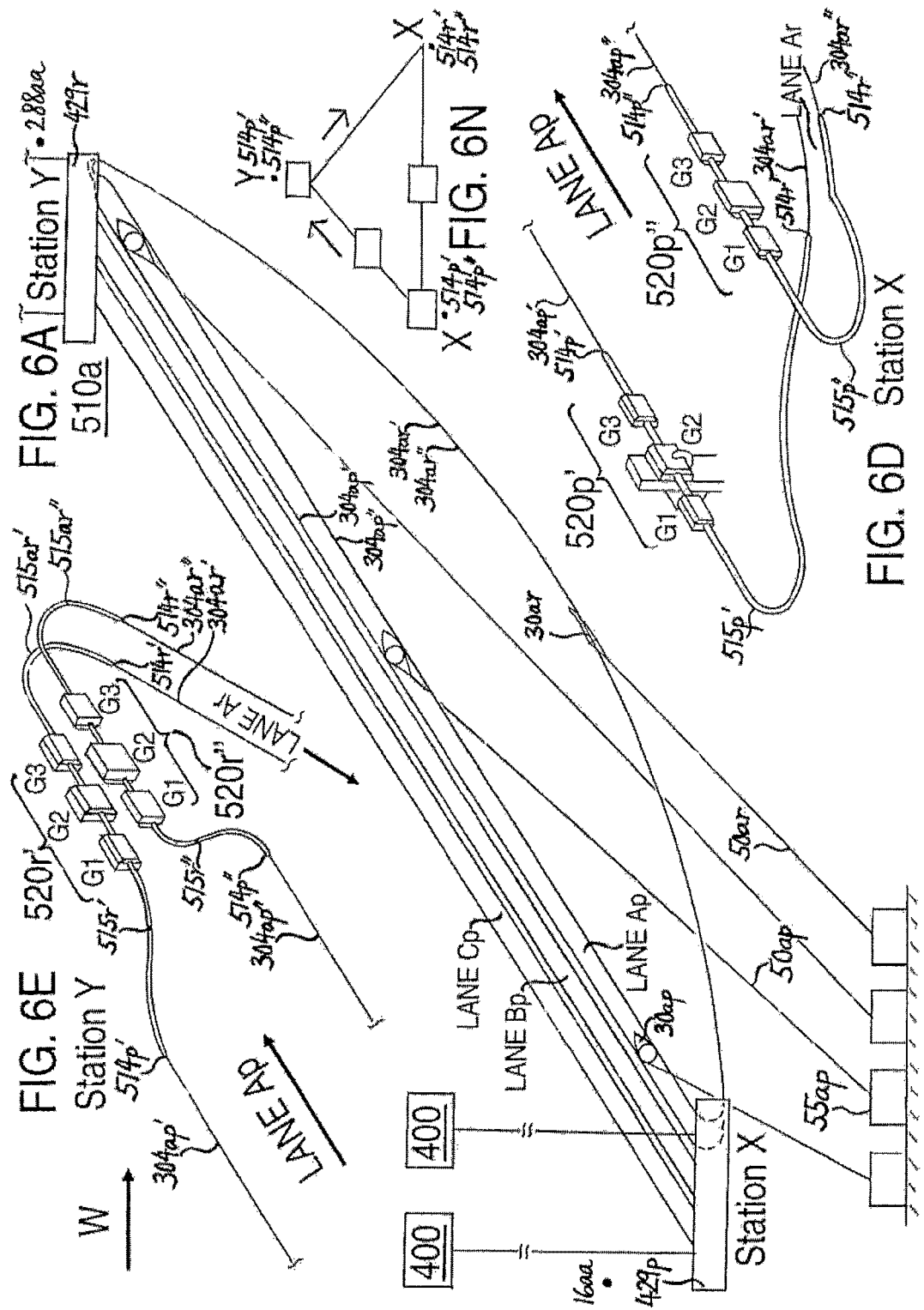

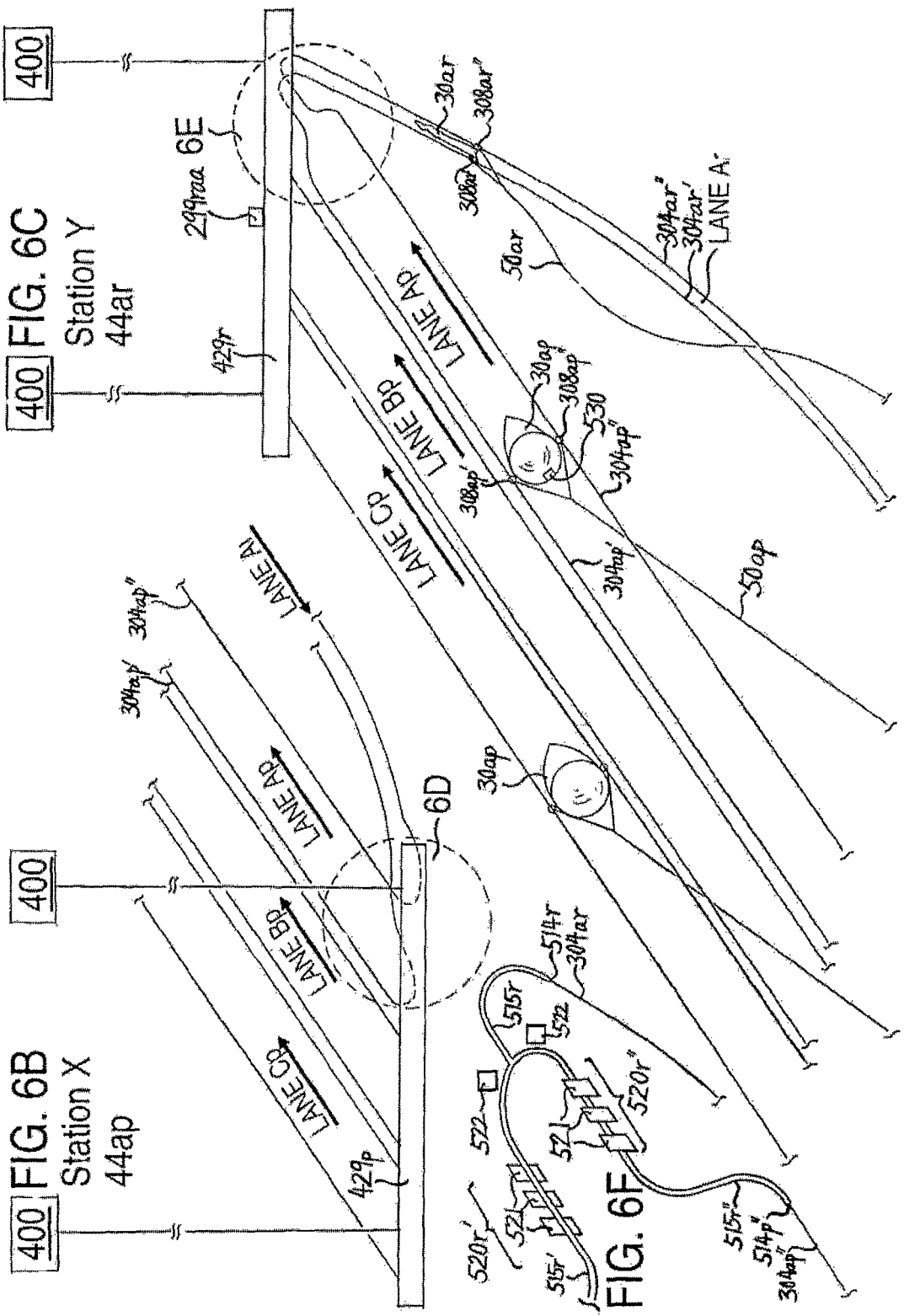

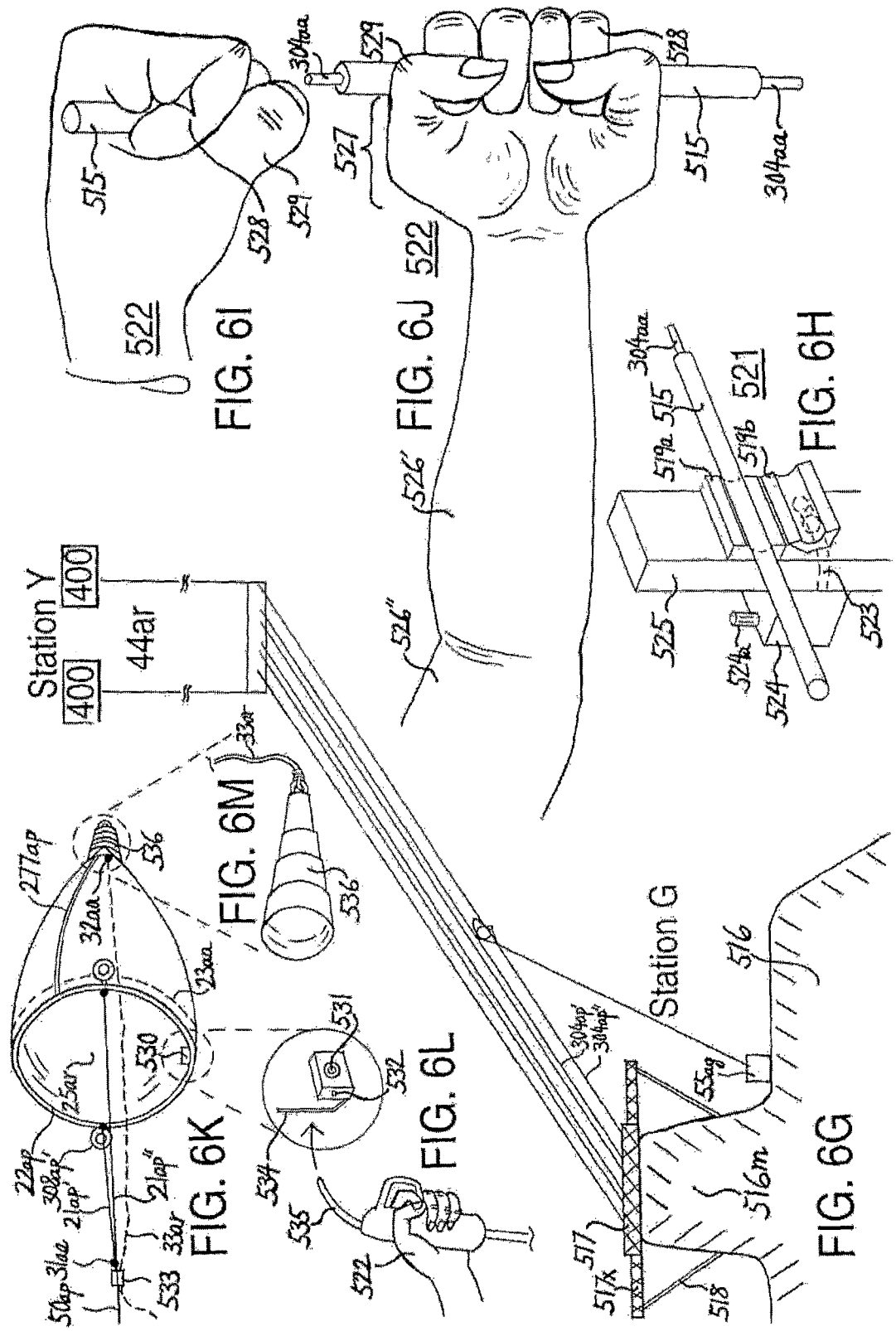

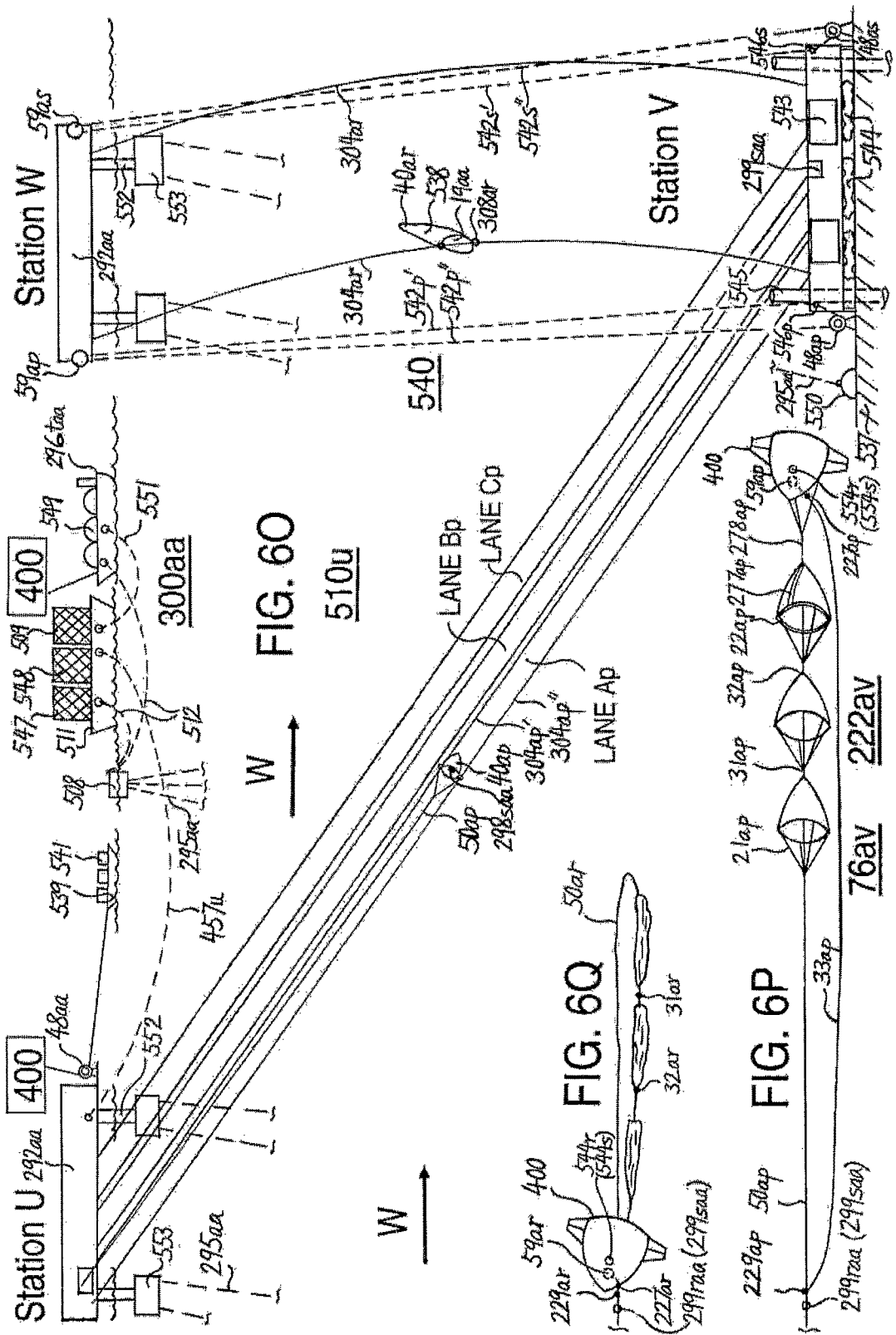

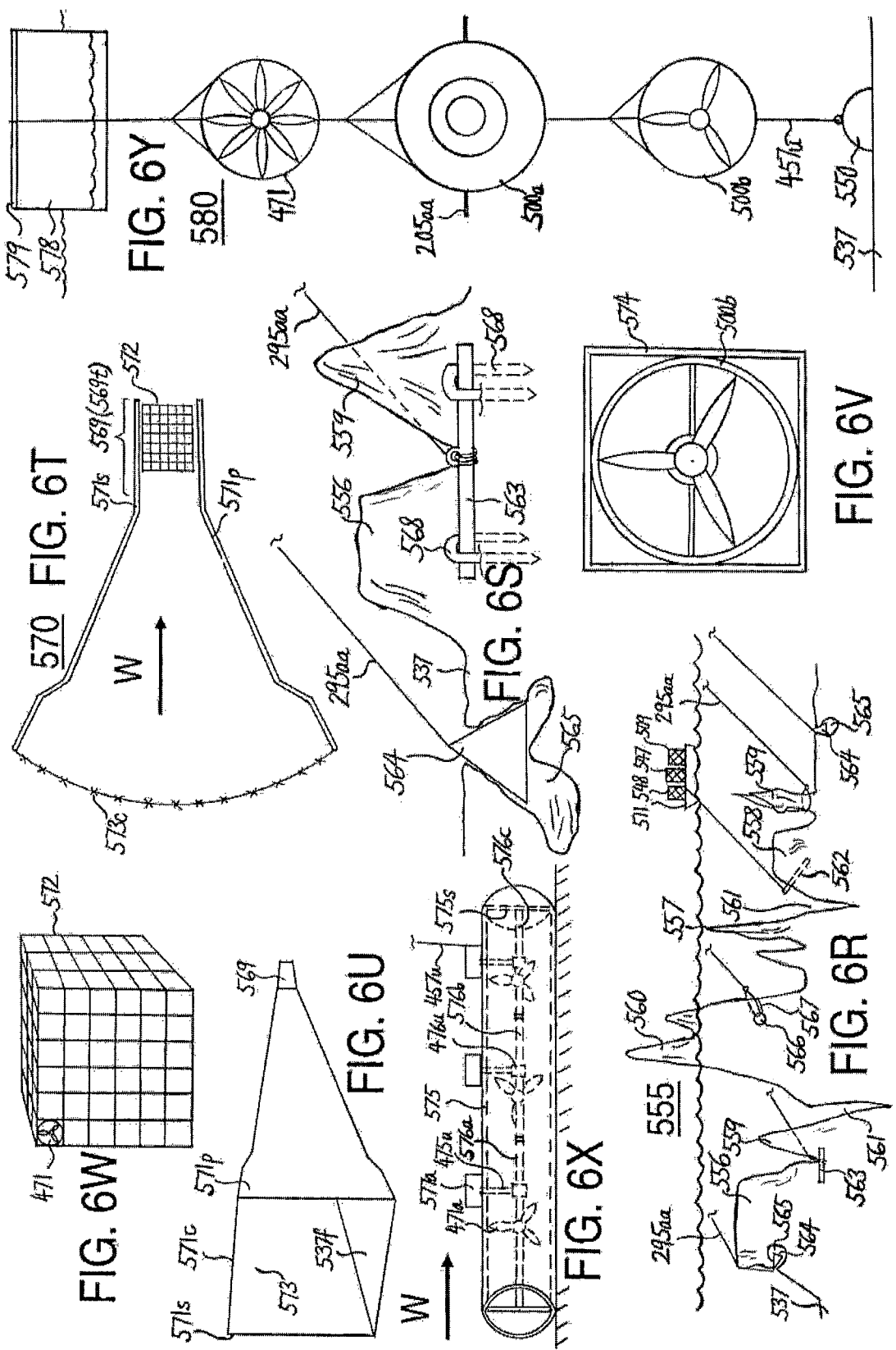

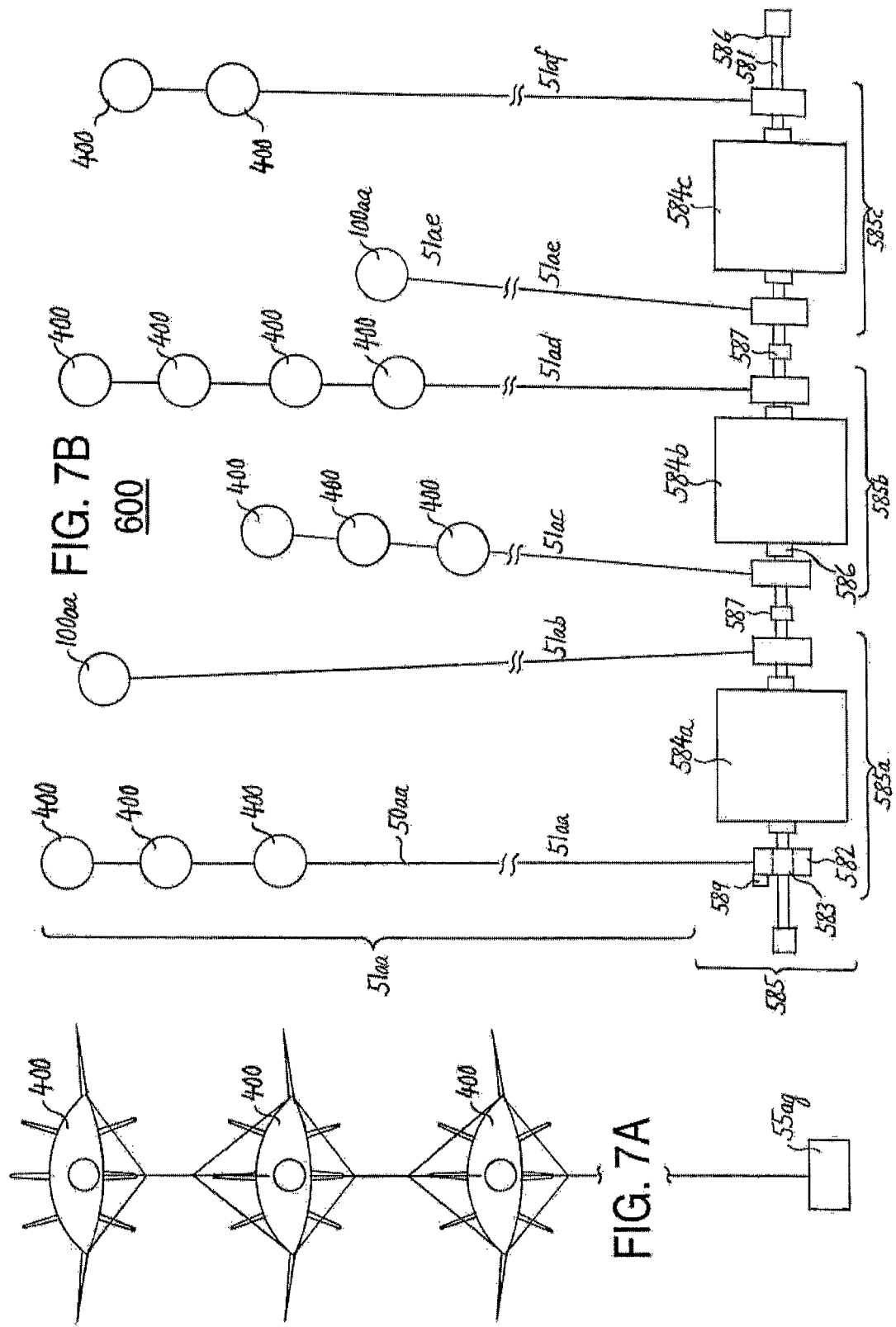

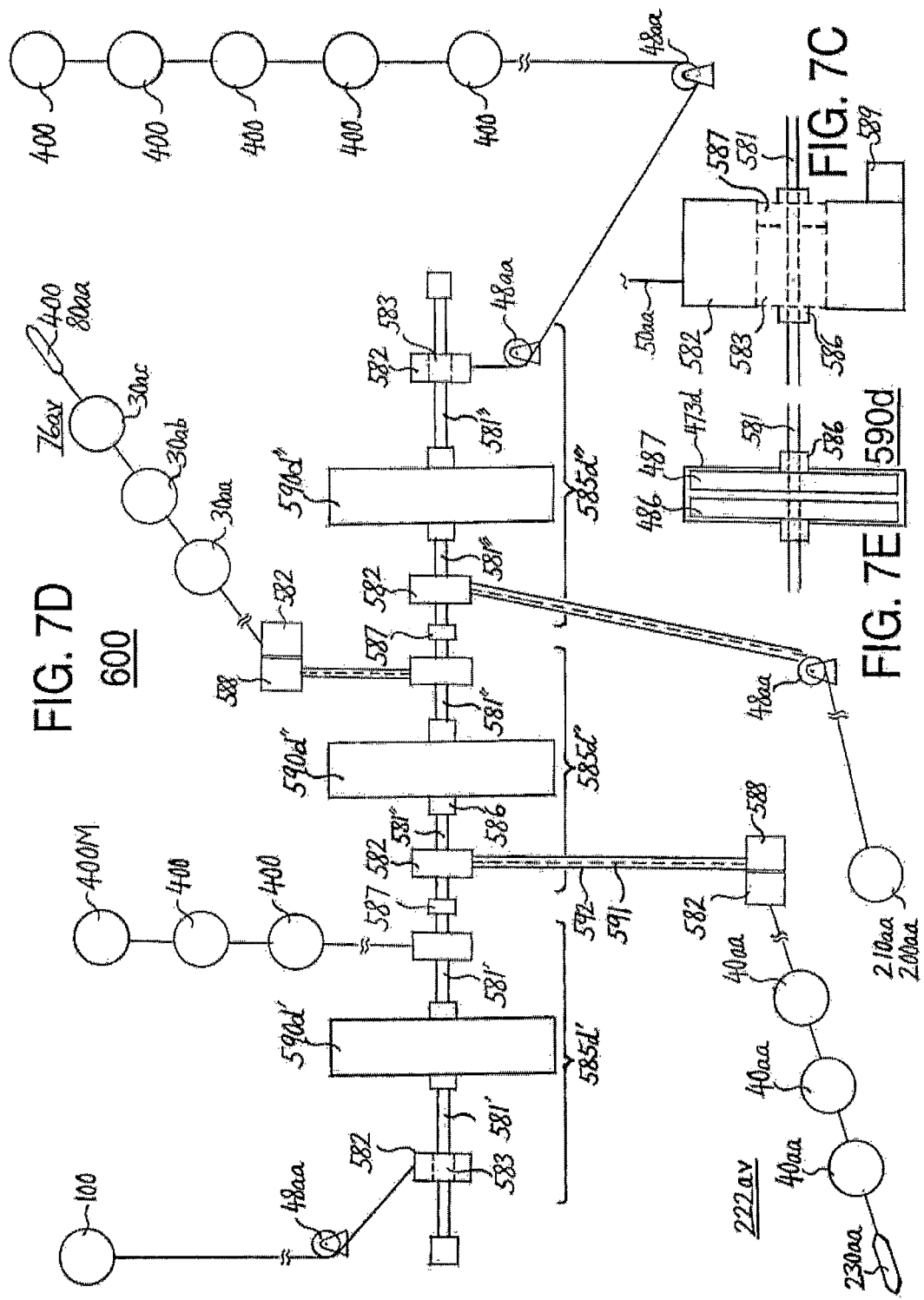

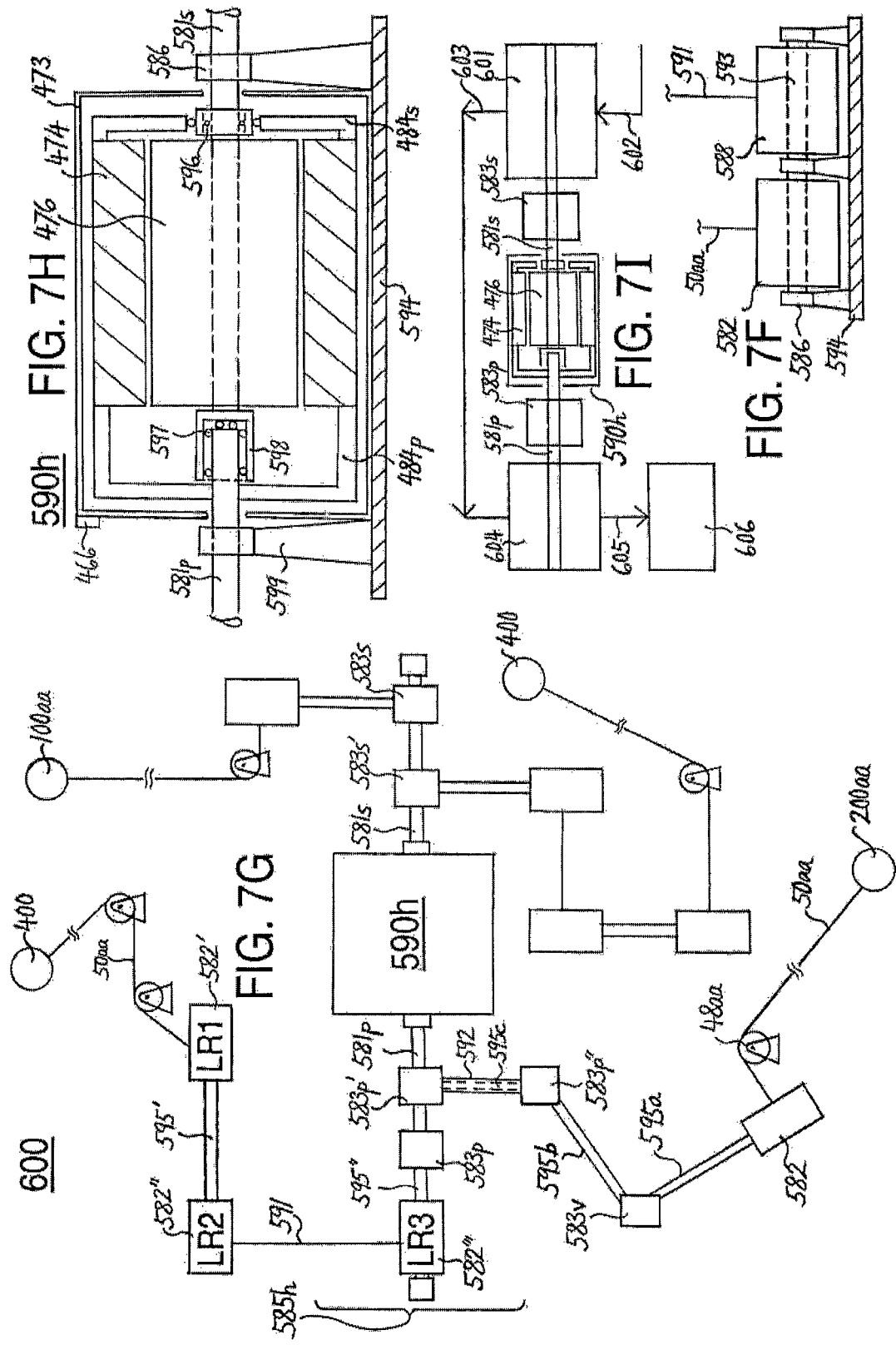

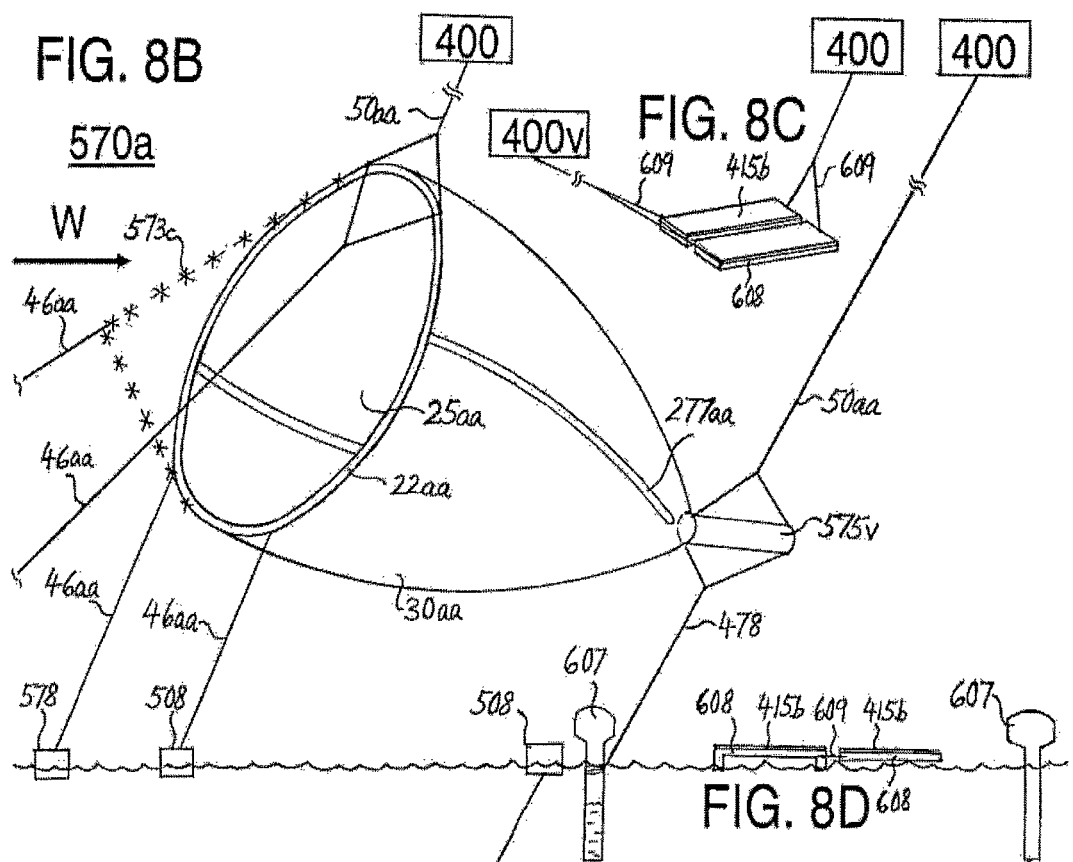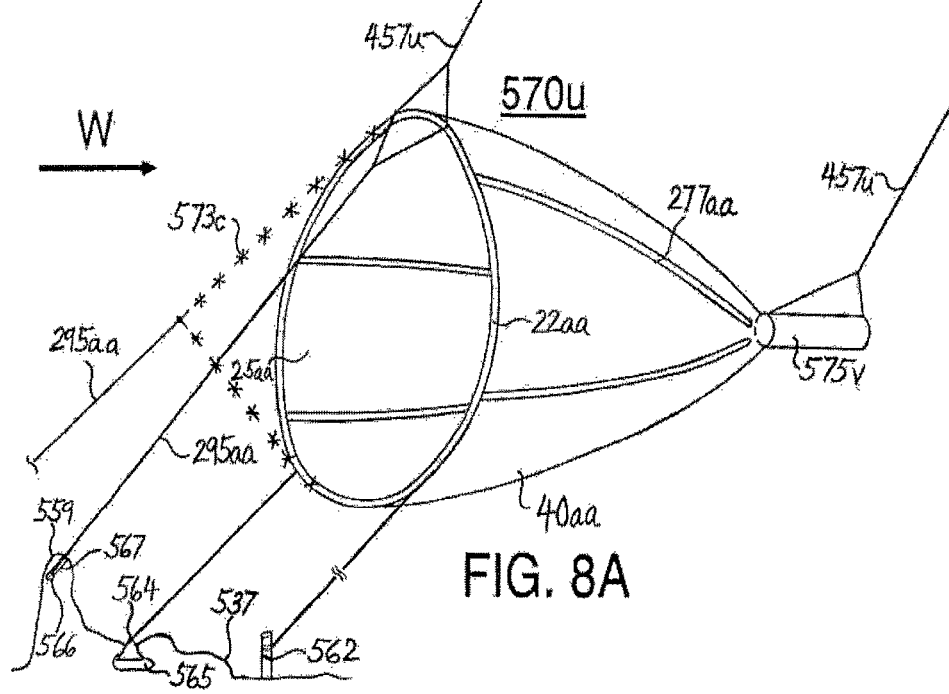

POWER GENERATING WINDBAGS AND WATERBAGS

This application is a continuation of U.S. application Ser. No. 15/630,670, filed Jun. 22, 2017, which is a continuation-in-part of U.S. application Ser. No. 15/270,500, filed Sep. 20, 2016, now U.S. Pat. No. 9,698,652, which is a continuation of U.S. application Ser. No. 14/976,855, filed Dec. 21, 2015, now U.S. Pat. No. 9,447,775, which is a continuation of U.S. application Ser. No. 14/608,511, filed Jan. 29, 2015, now U.S. Pat. No. 9,234,501, which is a continuation of U.S. application Ser. No. 13/870,413, filed Apr. 25, 2013, now U.S. Pat. No. 8,963,362, which in turn claims priority to SG application no. 201302987-1, filed Apr. 19, 2013 and SG application No. 201203067-2, filed Apr. 26, 2012.

FIELD OF THE INVENTION

Present invention relates to the utility purpose of deploying drones and adapting drone technologies for harnessing high altitude wind energy and deep sea ocean energy to generate renewable energy; displacing use of fossil fuels; mitigating the deadly effects of catastrophic global climate change. To safeguard and preserve our one and only life-support-system—Earth's Biosphere; in a habitable condition for all humans, animal and plant species to continue living. That the air we breathe, the water we drink remains clean and healthy; not poisoned by the toxic wastes we generate. Deploying drones to serve humanity. To generate clean energy; to preserve clean air; clean water; and a healthy planet Earth for future generations! That humans doesn't follow the dinosaurs—into extinction! Yeah, drones! Drones to the rescue of humanity! Drones to save mankind from this self-inflicted ecological suicide!

The harnessing of renewable "green" energy from the mass movement of naturally occurring fluid elements comprising wind; the capture and transformation of this kinetic energy into useful mechanical energy by means of specialized vehicles and a bagged power generation system configured for producing electricity comprising: wind powered generators. In particular wind energy comprising: high altitude wind energy; the Jet Stream. The harnessing and transformation of the fluid's kinetic energy into useful mechanical energy by means of tethers attached to the Hybrid Aerial Vehicles (HAV-400); production of stored potential energy; and electricity by means of generators. Specialized airborne Flying Energy Generators (FEGs) comprising HAV-400 configured to harness the kinetic energy of high altitude winds for doing useful work. A method, system, equipment, apparatus, techniques and a drone eco-system configured with vertical scalability and a quantum leap in the generation of renewable green energy: electricity, in comparison with existing systems at a minimized environmental and aesthetic cost.

BACKGROUND OF THE INVENTIONS

Present methods of harnessing wind energy by means of: kites, wind mills, wind turbines, kytoons, airfoils, etc.; use of sails on boat, ship or sledge for traction is known; as is the capture of water energy by means of: water mills, water wheels, turbines; balloons mounted on the sea-bed, floatation based devices, etc.; in converting the kinetic energy of wind into mechanical energy to do useful work: mills to grind flour, pump water, etc. including aero-electric power and hydro-electric power generation. However, some devices like: wind mills, wind turbines may be deficient and self-limiting due to (i) the minimized surface area for capture of the kinetic energy of the fluid medium as evidenced by the limited size and number of turbine blades, rotors, propellers, spokes; sails, etc. that may be affixed to an apparatus; (ii) the extremely short, momentary, contact time between the drive surface and the moving fluid medium providing the kinetic energy lasting a few seconds; and (iii) harnessing the kinetic energy in an ad-hoc randomized manner. Harnessing the energies of mother-nature in quantities huge enough for global consumption by means of utility scale generation plants/or farms; may require different approaches and solutions from conventional methods, systems and apparatus presently available. In particular high altitude wind energy, the Roaring 40's, the Furious 50's, the Shrieking/or Screaming 60's, the Jet Stream (exceeds 92 km/h; up to 398 km/h).

The low altitude sector (800 m to 1 km) of wind energy typically harnessed by wind turbines mounted on fixed towers comprises about 2% of the total global wind power. Whereas 98% of the global wind energy lies out of reach at a height of above 800 meters; and may be extracted by means of airborne wind energy systems operating above this altitude.

Present invention discloses methods of using tethered, Hybrid Aerial Vehicles (HAV-400) which may be transformed from their original airplane shaped bodies into different shapes as configured such as: puffed up and enlarged; Delta-shape; V-shape; etc. Thus maximizing its lifting efficiency; in effect being transformed into an airborne sky-crane; a wind-driven-sky-lifting vehicle capable of harnessing kinetic energy 11 of wind 10 movement; transforming it into green electricity directly; or indirectly when used in tandem with stored potential energy systems for generating potential energies which may in turn be converted into electricity later, as and when needed; such as 100% artificial green hydro-electricity. HAV-400 may also be used as a prime-mover to lift arrays of wind turbines/or carrier-apparatus mounted with wind turbines into high altitude in order to harness much more powerful wind energy. Configured as a glider drone, the engine of HAV-400 wind crane may be powered off at height; utilizing the surrounding wind power to generate aerodynamic lift; to power its internal system of ram air turbines (RAT) 71*aa*; 71*ab*; 71*ac*; for running onboard systems and equipment.

The forward moving force/or kinetic energy 11 of the wind 10 moving over the aerodynamically shaped surfaces of the HAV-400 creates a huge aerodynamic force lifting the vehicle vertically upwards at an angular inclination relative to the tether line 50*aa* cum reel system 52*aa*. This upward lifting force pulling on the attached tether line (kinetic energy 11) exerted a tensional force which turned the tether spool 52*aa*/or line reel drums 52*aa*. This rotational movement (mechanical energy 12) is transmitted via a transmission gear-box 53*ag*; and used to power a driven appliance 54*ag* comprising: a pump/or, compressor to produce potential energy 13/or, a generator to produce electrical energy 14. A multitude of such HAVs-400 and tethers-lines 50*ag* (drive unit 51*ag*) comprising thousands/or hundreds of thousands in number may be timed and arranged to take turns to drive the generators 54*ag* (driven unit 55*ag*) to produce Gwh/year or Twh/year of electricity 14. The HAV-400 and attached tether-line 50*ag* comprises drive unit 51*ag*. The revolving bobbin/or tether spool 52*ag*/or line-reel-drum 52*ag*; gear box 53*ag* cum generator 54*ag* comprises the driven unit 55*ag*. A winding motor 49*ag* may be used to operate the reel-drum 52*ag* to retract back the tether line 50*ag* and HAV-400. Towards the end of the power run/or end-of-run (EOR) point 288*aa*, the HAV-400 may be depowered by changing its aerodynamic wings profile into neutral lift; and then into negative lift; retracted, retrieved and pulled back (free load) to start-of-run (SOR) point 16*aa*; "ground zero"; where it may operably change its aerodynamic body profile into positive lift; and redeployed.

SUMMARY

Present invention discloses a method, system, equipment, apparatus, techniques and drone ecosystem for generating electrical power, comprising of: a shape-morphing glider-drones HAV-400, a mobile navigable vehicle body pulling a tether (drive unit 51*ag*) attached to an electricity generation module (driven unit 55*ag*). Such a dynamic method of power generation utilizes a vehicle generating a tremendous amount of aerodynamic lift; thus moving the vehicle vertically upwards at an angle relative to the direction of flow of the fluid medium; with the tensile force created in the tether line 50*ag* powering the generation module to produce electricity for the duration of its entire upward movement. In the wind-borne form this apparatus may be configured as a hybrid Unmanned Aerial Vehicle (UAV-400)/or Hybrid Aerial Vehicle (HAV-400). Equipment, apparatus and an ecosystem for operating the aerial drone may be mounted on and borne by the vehicle body, including: flight control surfaces, tether lines, bridle lines, control lines 46, retract lines, winches, motorized turbo-fans, propellers, side-thrusters, batteries, engines, compressed air-tanks, helium tanks, fuel tanks, balloons, ram-air-turbines, etc. Enabling capabilities includes providing airborne work-stations 44*aa* for station hopping, thus extending the range and power-run of the drive units 51. The airborne platform may comprise of highly specialized supporting systems such as the Unmanned Aircraft System (UAS) infrastructure for aerial drones. Said vehicles being remotely navigated, controlled and operated by human navigators by means of transmission wire-lines embedded into the tether lines 50*ag*; or remotely by means of radio frequency (RF) and sonar signals.

Disclosed herein is a motion-centric method; and dynamic system of generating power by means of specially configured motion based vehicles/motile apparatus; navigable vehicles traversing a fluid medium on a relatively linear trajectory or path of travel (from SOR point 16*aa* to EOR point 288*aa*); said multitude of fluid propelled navigable vehicles travelling in proximity may be remotely manipulated to avoid collision/or to maintain a journey free from interference from like vehicles. Said navigational means comprises ground based and onboard radar and sonar transmitters, receivers, sensors and cameras linked to a computerized Advanced Warning System for proximity warning to prevent collision. Including propulsion engines 408; thrusters 70*ae*; control surfaces comprising: wings 404; stabilizers 405; tail controls 406; emergency equipment comprising solid propellant discharge nozzles 242*ar*; compressed air nozzles 242*aa*.

Computerized self-navigation capability enabled by means of drone technologies along an assigned trajectory may also be incorporated into the guidance system of the drones. The main thrust of present invention comprises of: a HAV-400; essential components comprising a: shape morphing vehicular body; tether; surface based energy generation system. A tether line for transmitting the motive forces/or kinetic energy of the fluid propelled vehicle to a ground and/or surface based electricity generation system. The motion-centric vehicle moving vertically at a diagonal angle; extracting their energies as they travelled from the SOR point 16*aa* to the EOR point 288*aa*; generating power continuously and consistently for the duration of the whole upward journey. The full force of the fluid's aerodynamic lift may be imparted onto the widespread wings of the HAV-400. The desired amount of drag force may be set into the generator system—manually by hand; computerized auto controls or varied accordingly to maintain optimal operating conditions. Shape morphing wings attached to the vehicle bodies may be deployed and retracted while traversing in said fluid medium as and when desired/or commanded; as the vehicle navigated along a designated trajectory. The vehicle body and wings profile may be altered, to shrink and extend in shape; size; surface area; to provide changes in its aerodynamic configuration. Such that the HAV-400 changes its lifting capabilities comprising: positive lift (vehicle moves upward); neutral lift (vehicle stays at stationary height); and negative lift (vehicle moves downward).

BRIEF DESCRIPTION OF THE DRAWINGS

Preferred embodiments of the present invention will now be described with reference to the accompanying drawings wherein:—

FIG. 1A shows details of a fully deployed HAV-400. FIG. 1B shows details of the cross-sectional side view 1B-1B of FIG. 1A; FIG. 1C shows details of FIG. 1B with the drone's body at maximum inflation and generation of maximum aerodynamic lift.

FIG. 1D shows details of the composition, components and body structure of HAV-400.

FIG. 1E shows details of a compressed air generation and helium gas recycling system.

FIG. 1F shows details of the frontal view (fore) of FIG. 1A; and the internal construction and structural components of HAV-400's body at maximum inflation or lift.

FIG. 1G shows details of FIG. 1F with HAV-400's body profile at neutral lift; while FIG. 1H shows details of the body profile at negative lift.

FIG. 1I shows details of the original body of HAV-400M. FIG. 1J shows details of a fully morphed variant HAV-400M with extended wind engaging bag.

FIG. 1K shows details of a plan view of the shifting body contours of HAV-400.

FIG. 1L shows details of the deployment of wind engaging bag extended at the periphery of HAV-400.

FIG. 1M shows details of a plurality of UATV-80aa flexibly attached to HAV-400.

FIG. 1N shows details of an air-rib 277*aa* and solid rib-cage structure.

FIG. 1O shows details of attachment between plates 416 and metal ribs.

FIG. 2A and FIG. 2B shows details of the use of a HAV-400 in supporting role.

FIG. 2C shows details of a plurality of HAV-400 lifting an aerial work station enabling servicing and tether lines swapping of HAV-100aa.

FIG. 2D to FIG. 2E shows details of an airborne docking sub-system 430.

FIG. 2F to FIG. 2H shows details of the sequential deployment phases of a HAV-100aa upon release from docking sub-system 430 of work station 44*ab*.

FIG. 2I shows details of the forces generated on a tethered HAV-400.

FIG. 3A to FIG. 3B shows details of sub-system 440 and sequential phases and locations of a HAV-400 used with driven unit 55*ag* to produce electricity.

FIG. 3C shows details of sub-system 450 comprising a stored potential energy system for producing electricity on demand. FIG. 3D shows details of sub-system 460 comprising of a pumped hydro-electricity generation system.

FIG. 4A shows details of a sub-system 470 comprising a line of wind turbines airlifted by HAV-400. FIG. 4B shows details of sub-system 480 comprising an array of wind turbines built into a framework, carried aloft.

FIG. 4C shows details of the sectional side view of a counter rotating double sided turbine generator. FIG. 4D shows a sectional view 4D-4D of the generator.

FIG. 4E shows details of the side view; while FIG. 4F shows the sectional plan view 4F-4F of a vertically oriented counter rotating double sided turbine discs generator.

FIG. 4G shows details of a quad-bladed turbine generator of FIG. 4C; the turbine blades embedded with generating elements.

FIG. 4H shows details of a counter-rotating double sided wind turbine generator; the turbine blades embedded with generating elements.

FIG. 4I shows details of a counter-rotating vertical shaft wind turbine generator.

FIG. 5A shows details of a plan view; while FIG. 5B shows the sectional side view 5B-5B of a multi-tiered counter-rotating turbine generator.

FIG. 5C shows details of an airborne turbine generator lifted vertically by a HAV-400; while FIG. 5D shows a turbine generator lifted in an inclined position.

FIG. 5E shows details of the front view of a three bladed wind turbine generator; while FIG. 5F shows the front view of a six bladed turbine generator. FIG. 5G shows the front view of a multi-bladed turbine generator.

FIG. 5H shows details of the sectional side view 5H-5H of FIG. 5G; while FIG. 5I shows the sectional side view 5I-5I of a double layered arrangement (side by side; or over-under configuration) of the twin turbine generator of FIG. 5E; FIG. 5F and FIG. 5H.

FIG. 5J shows details of the sectional side view of a double layered arrangement (side by side; or over-under configuration) of the twin turbine generator of FIG. 5A and FIG. 5B.

FIG. 5K shows details of a HAV-400 wind-lifter carrying aloft a plurality of wind turbines 471; 500; 500a. FIG. 5L shows a rack container for keeping wind turbines.

FIG. 5M shows details of a HAV-400 wind-lifter carrying aloft an airborne wind turbine 500a in an inclined position. Including a seaborne ecosystem for processing the renewable energies harvested by means of floating electrolyzer plants.

Figure 3D:
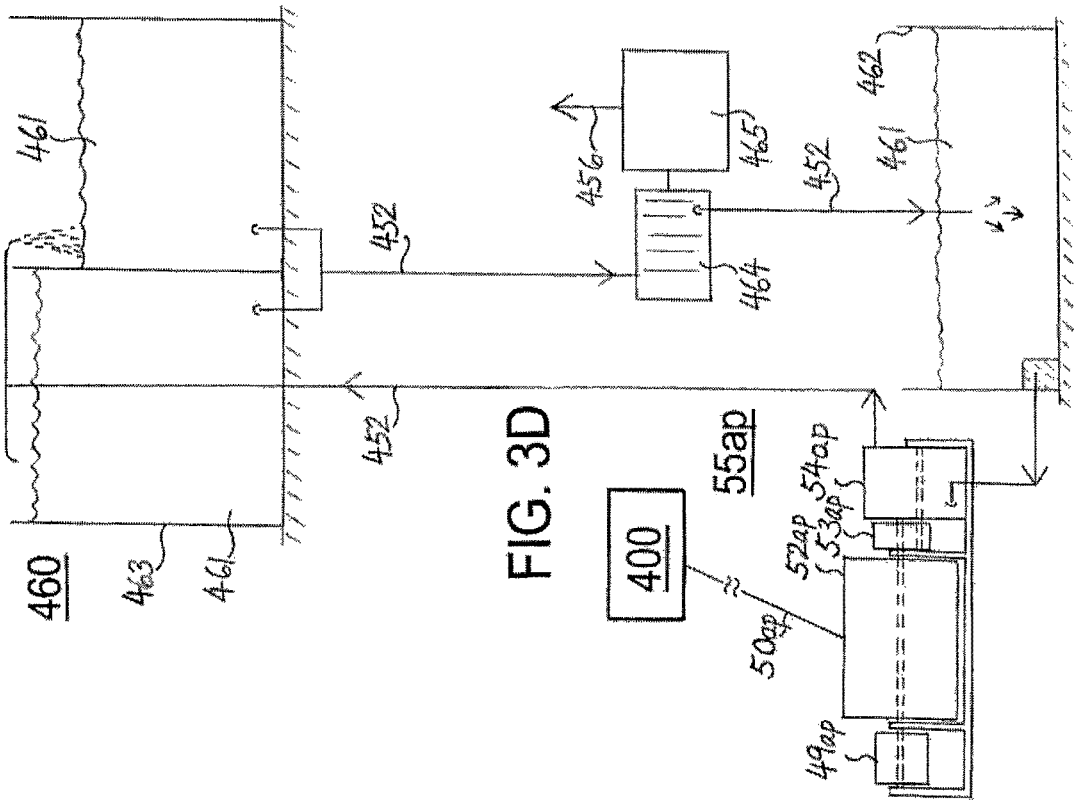

FIG. 6A shows details of an airborne wind energy harvesting system 510a by means of windbags. FIG. 6B and FIG. 6C shows more detailed illustration of the main components. FIG. 6D and FIG. 6E shows the fine details of FIG. 6B and FIG. 6C. FIG. 6F shows an optional arrangement for avoiding line interference. FIG. 6G shows a high altitude ground station used with an airborne station.

FIG. 6H shows details of a locking clamp mechanism for securing guide lines. FIG. 6I shows details of the side view; while FIG. 6J shows the front view of robotic limbs holding guide lines securely.

FIG. 6K shows details of a windbag outfitted with accessories. FIG. 6L shows a RF activated pressure control apparatus; and air nozzle. FIG. 6M shows a telescopic cover and string 33aa. FIG. 6N shows details of the rotational sequence in which a plurality of generators 55aa may be positioned relative to the power run phase; retract phase; standby phase.

FIG. 6O shows details of a seaborne water energy harvesting system 510u enabled by means of water-bags.

FIG. 6P shows details of an improved system 76av in power run comprising multiple windbags for harvesting wind and/or water energy; guided by a navigation unit HAV-400. A water-bags system 222av for harvesting water energy. FIG. 6Q shows the retraction phase of the system.

FIG. 6R shows details of adaptation of underwater seamounts 555 for anchoring cables for surface vessels harnessing and processing renewable energies. FIG. 6S shows details of securing an anchoring beam; and a plug in caverns.

FIG. 6T to FIG. 6W shows details of a funnel shaped undersea structure to converge sea water to power water turbines. FIG. 6X shows details of a turbines tunnel.

FIG. 6Y shows details of a plurality of submerged water turbines.

FIG. 7A shows details of a plurality of glider drones HAV-400 to increase tensile force acting on a driven unit.

FIG. 7B shows details of system 600; in which the tensile force from a plurality of drive units may be transmitted back to a centralized power generation plant.

FIG. 7C shows details of line reel drum 582 integrated with the gearbox 583; clutch 587; and retract motor 589.

FIG. 7D shows details of system 600; with a plurality of discs generators 590d. FIG. 7E shows details of said dual discs generator. FIG. 7F shows details of two inter-connected line reel drums.

FIG. 7G shows details of system 600; with new extension apparatus to transmit the harnessed energies to the generator 590h. FIG. 7H shows details of counter rotating generator 590h.

FIG. 7I shows details of improving the efficiency of a combined cycle generator.

FIG. 8A shows details of using water-bags to divert and converge ocean current into a seaborne hydro power generation tunnel. FIG. 8B shows details of a parallel windbags system to concentrate wind current into an aero power generation system.

FIG. 8C shows details of a flying carpet system comprising strips of solar fabrics mounted on light weight aerofoams; carried by glider drones HAV-400. FIG. 8D shows the use of such apparatus on water surface as solar energy collectors.

DETAILED DESCRIPTION OF THE INVENTIONS

The structural configuration, concept, method and system of providing an unmanned morphing HAV-400 for harnessing and extracting the energies contained in a moving air current (wind) for the generation of electricity; is herein disclosed. Transforming its kinetic energy into mechanical and then electrical energy by means of a tether.

The working principal of a HAV-400 lies in maximizing generation of aerodynamic lift. The airborne system may comprise of: customized aerial drone HAV-400 and tether 50ag (Drive Unit 51ag); Generation Modules housing the tethers-line reels 52ag, gear-box 53ag, generators 54ag (Driven Unit 55ag); computerized ground control systems, control links; navigators; supporting systems, equipment; radar system, GPS; Inertial Navigation System; parking aprons, control and command centre; Unmanned Aerial Tow Vehicles (UATV) 80aa; power collection grid; etc. Driven Unit 55aa may be integrated with other mechanical components such as air compressors; water pumps. The drive unit may be used to lift or carry heavy loads such as containers filled with fluid (water); solid blocks of concrete; metal; rocks; earth; timber; etc.

Glider drones HAV-400 may be used to lift a variety of items into high altitude to harvest wind energy such as: wind turbines 490$h$; 490$d$; 477$v$ 500$a$; 500$b$; 500$c$; 500$d$; airborne work stations; air-bridges 429$p$; 429$r$; control a multitude of drive units 30$aa$ to generate power; drive generators 584; 590$d$; 590$h$; etc. The combination of: a distributed system for extraction of energies comprising: high altitude wind current and deep sea ocean current; a tensile force transmission system to; a utility scale centralized power generation plant 585. Airborne wind energy harvesting system 510$a$ using windbags; seaborne energy harvesting system 510$u$ using water-bags.

FIG. 1A illustrates a deployed glider-drone HAV-400 with its body parts fully extended to generate aerodynamic lift; connected to a load, driven unit 55$ag$ by means of tether 50$ag$; while FIG. 1B illustrates the cross-sectional lengthwise side view 1B-1B of FIG. 1A with an inflated body profile. FIG. 1C illustrates further enlargement and puffing-up of the body of FIG. 1B to attain maximum inflation, for generating the maximum lift configuration that the drone had been designed to produce. Also illustrated are: wind inlet port 401; hollow cavity 402; exit port 403; control surfaces comprising: wings 404$a$, 404$b$; stabilizers 405$a$, 405$b$, 405$c$, 405$d$, 405$e$; tail controls 406$a$, 406$b$, 406$c$; wheels 407$a$, 407$b$, 407$c$; engine 408; cooling fins 418$a$. Since the HAV-400 operates as a tethered glider-drone 99% of the time; engine 408 may not be required at height. It may be used during take-off and for emergency propulsion purposes only.

Airplane shaped, HAV-400 may comprise of a flying-wings body design wherein, the whole body of the vehicle may take the form of, and be shaped like the profile of an aircraft's wings; configured with standard conventional flight control surfaces comprising wings 404; side stabilizers 405; main vertical stabilizer 406$a$; horizontal stabilizers 406$b$; 406$c$; rudder; slats; flaps; ailerons; elevators. Alike typical wings of an airplane; ailerons and flaps present in wings 404; may be manipulated to minimize or maximize aerodynamic lift generation, flight control and loading capacity of the drone. HAV-400 looks much like the shape of a manta-ray, but with the capability of a puffer fish to can suck in air, puffing up its stomach, distending its flat, thin discus-like body into an enlarged balloon several times its original body size. In HAV-400 this feature is applied selectively to inflate and deflate specific part(s) of the drone's body as and when required; to manipulate generation of aerodynamic lift to ascend, stay aloft, descend. The motivation for adapting the flying-wings body configuration is for the purpose of: maximizing generation of aerodynamic lift from the harnessing of high altitude wind energy; and employing the morphing body profile to do useful work for mankind. Not for the purpose of high speed flight, fuel efficiency, cost savings, or stealth capability.

While tether line 50$ag$ bore the main load for doing useful work; HAV-400 may also be anchored and manipulated by means of control line 46$aa$ or retract line 33$aa$. At the drive end, tether 50$ag$ may be connected to the three bridle lines 21$aa$, 21$ab$, 21$ac$ joined together at point 410. The three bridle lines may in turn be flexibly connected to HAV-400 at points 409$a$, 409$b$, 409$c$; on the drone's body, linked to concealed winches 59$aa$, 59$ab$, 59$ac$; sliding in and out via points 409; during adjustment of lines and angular inclination of the drone's body relative to wind flow. At the driven end tether 50$ag$ may be connected to the load, driven unit 55$ag$ for producing electricity. Flight control surfaces 404, 405, 406 may be manipulated and used to vary HAV-400's load carrying capacities; maximum lift (ascend), neutral lift (stay in position, hover) negative lift (descend). The leading edge's angle of attack (of the drone's body) may be adjusted automatically by varying the length of the 3 bridle lines 21$aa$; 21$ab$; 21$ac$; by means of concealed winches 59$aa$; 59$ab$; 59$ac$; in tandem with variability in the generation of aerodynamic lift produced by the variable shape and form of the drone's body.

The HAVs-400 may be configured with one bridle line 21$aa$ attached to the bow section (fore) at point 409$a$; line 21$ab$ to starboard side at point 409$b$; and line 21$ac$ to port side at point 409$c$; joining together with tether line 50$aa$ at point 410. The lengths of the bridle lines 21 may be adjusted by winches 59$aa$; 59$ab$; 59$ac$; to tilt and vary the vehicle body's position and angular inclination relative to the wind direction; thus optimizing the HAV-400 body's angle of attack. This provide a secondary means of adjustment; maximizing; or minimizing the HAV-400's aerodynamic load lifting capacities; apart from the primary generation of aerodynamic lift by means of the morphing body and changes in the wing's angle of attack.

Thus the directional, flight controls and load-lifting adjustments of HAVs-400 may be effected by means of: (a) Variations in vehicle shape (morphing) by means of pneumatic system for inflating/or deflating windbags 420 system constituting the airframe; said windbags 420 comprising: air-pillars 420$a$; air-pouches 420$b$; air-pads 420$c$; air-packets 420$d$; air-cells 420$e$; air-ribs 277$aa$, 277$ab$. (b) Variations in the angles and length of the three bridle lines by means of winches 59$aa$; changing the position of the drone's body; and thus the main body's leading edge's angle of attack. (c) Variations of conventional wings and tail mounted flight control surfaces 404, 405, 406. Sensors 411 on the drone's body interacts instantly with onboard and ground computer systems regarding its vital operating parameters and ambient conditions; adjusting and correcting its flight parameters accordingly.

FIG. 1D illustrates the preferred components used in constructing HAV-400. Solid structural framework 412 may comprise of: round pipes 412$a$; rectangular pipes 412$b$; square pipes 412$c$; girders; C-channels; V-channels; etc. Materials making up this body framework structure may comprise of: metallic; composites; carbon-nano-fibers; fiber glass; ceramics; Kevlar; carbon fiber reinforced plastics; glass fiber reinforced plastics; quartz fiber reinforced plastics; aluminum glass fiber laminates; glass laminate aluminum reinforced epoxy (GLARE). This structural framework is overlaid by the air-frame comprising layers of flaccid shaped air-bags 420 comprising air-pouches 420$b$; air-pads 420$c$; air-hoses 413$a$, air-tubes 413$b$; covered by an external layer of skin 415 bound by straps 415$a$ made of lifting harness materials; Dyneema; Spectra; Kevlar; etc. Solar fabrics 415$b$ may be embedded into the fabric materials of the uppermost layer of skin 415 to harness solar energy in flight. Optionally the skin 415 may be coated with a layer of reflective material to reflect back the sun's rays outward into space; creating an albedo effect. Deployed in large numbers, HAVs-400 may also provide a form of sun-shade to the surface below; reducing ambient temperature and the intensity of heat waves. This may be similar in effect to proposed geo-engineering initiatives of spraying a layer of airborne chemicals/surfactants on the ocean's surface to reflect sunlight back into space to mitigate the severity of global warming cum global climate change.

Optionally, the external surface of the vehicle body may comprise of large pieces of over-lapping scale-like-plates 416; an exo-skeleton providing strength and support. Such external plates may be inter-connected by a layer of pliable, durable membrane like material; and in turn mounted on an inner layer of fabric skin; replicating the reptilian skin in design; or flexibly connected to a framework and network structure of pliable ribs 446 by mean of sliding rings 447 (Refer FIG. 1O). The plates may be made of: metals; ceramics; composites; carbon fibers; plastics; thermoplastics, reinforced fabrics, etc. While the internals of the body comprising of: windbags, airbags, air-ribs, fabric; etc. may be arranged wherein a plurality of layers configured on top of one another may be inflated or deflated individually or in groups upon requirement. Such that variations in height or thickness of the body as desired, may be achieved by means of inflating and deflating designated pieces or groups of airbags 420; or layers of such airbags 420 stacked on top of each other. Minute adjustments to the airframe may be made by means of small sized air-packets 420d; air-cells 420e. While adjustment of air pressure may be used to balance the turgidity between air-ribs 277aa and 277ab in order to optimize external shape and aerodynamic lift generation of HAV-400. (Refer FIG. 1K)

The structural configuration of HAV-400 may comprise of two main components: (1) a solid skeletal body framework 412; covered by an external (2) airframe consisting of airbags 420 system which may be selectively inflated or deflated by means of pneumatic control and distribution system 421; with commands from computerized algorithms, logic and programs. The structural configuration of windbags/or airbags system 420 comprises a plurality of variably shaped: air-pillars 420a; air-pouches 420b; air-pads 420c; air-packets 420d; air-cells 420e; air-ribs 277aa, 277ab; including: air-hoses 413a, air-tubes 413b; 2-ways switching valves 414, 3-ways switching valves 414. The term airframe in present invention differs slightly from the normal meaning of "airframe" used to describe aircrafts; as it comprises 100% air inflated windbags 420 filled with compressed air/or helium gas; providing turgidity to the drone's body; giving HAV-400 its external shape, contour, morphology. Such that inflation and deflation of strategically positioned air-bags 420 changes the shape of the drone's body enhancing its aerodynamic properties; enabling it to attain neutral, power-up, depowering capabilities; allowing useful work to be done safely. Solid skeletal body framework 412 may comprise about 20% of the total drone body's component.

A ram-air-turbine (RAT) 71 is central to the working mechanisms of HAV-400; as a huge amount of compressed air is required for inflating the airframe of the vehicle comprising air-bags system 420 consisting of a variety of shaped: air-pillars 420a; air-pouches 420b; air-pads 420c; air-packets 420d; air-cells 420e; air-ribs 277aa, 277ab; including: air-hoses 413a, air-tubes 413b; switching valves 414a and 414b activated by means of computerized signals. Three ram-air-turbines (RAT) 71aa, 71ab, 71ac may be configured in series into the center of the drone's body for redundancy. An oval shaped hollow cavity 402 ran the whole length of the drone's body, from the fore (bow) through the aft (stern). High speed wind enters via fore mounted wind-intake port 401 driving ram-air-turbines RAT-71aa; 71ab; 71ac mounted inside cavity 402; expended air exiting via aft mounted port 403. RAT-71aa; 71ab may be used to produce compressed air; while 71ac may be used to generate electricity for onboard use. Compressed air produced by RAT-71aa driven compressor 417 may be cooled by means of air cooler 418; stored in cylinders 419; used to inflate the air-frame components as and when needed; and released into the atmosphere upon deflation of the air-bags 420. Optionally, HAV-400 may use lighter-than-air helium gas to inflate its air-frame.

Present invention discloses the use of high altitude wind current to: (1) Generate an aerodynamically shaped body profile (HAV-400) by means of compressed air for inflating a multitude of windbags/or airbags 420. (2) Creating aerodynamic lift on said body (HAV-400) of (1) above; to do useful and productive work for mankind; in a self-sustaining airborne system without the need for external input of energy; except for the initial lift to become airborne. Minor repairs might be carried out on the flying airborne platform 44ab; which double as a refueling station store, parking lot, crew change, etc. The drone is configured to stay airborne for extended periods of time until major maintenance required for it to land.

FIG. 1E illustrates a compressed air generation sub-system 422a and/or a helium gas recycle sub-system 422b. In sub-system 422a, compressed air generated by means of RAT-71aa; 71ab driven compressor 417 may be cooled down by an air-fin cooler 418; stored in cylinders 419; controllably released by means of a computerized pneumatic control and distribution system 421; to selectively inflate the air-frame comprising specific airbags 420; by means of a network of air-hoses 413a, air-tubes 413b, two-ways switching valves 414a and three-ways switching valves 414b activated by means of computerized signals from system 421. Valves 414 may be operated to inflate airbags 420 with compressed air from tank 419; and to deflate airbags 420 by venting off into the atmosphere; in a controlled manner as and when required. Cooling fins 418a of the air-fin cooler 418 may be embedded into the sides of hollow cavity 402. Optionally, if helium gas is used for inflating airbags 420, the helium gas recycle sub-system 422b may be adapted. Due to its rarity, helium gas is not vented off after use, but recycled back to RAT-71aa driven compressor 417; air-fin cooler 418; containers 419 and reused repeatedly. Air-Driven-Generators (ADG); Air-Driven-Compressors (ADC) comprising Ram-Air-Turbines (RATs) 71aa; 71ab; 71ac may be used to power all systems abroad HAV-400: hydraulic, electrical, pneumatic systems; for operating flight control surfaces; pressurization of the airbags 420 system; directional control air jets 242aa; engines 70aa, winches 59aa, etc. All components and materials used being designed and selected for their superior properties comprising: light-weight; durability; pliability; reliability; superb integrity; fire-resistance; etc.

FIG. 1F illustrates the cross-sectional breath-wise front view (bow) of the HAV-400 of FIG. 1A; and structural components of HAV-400's body at maximum inflation and lift (refer FIG. 1C). A large oval shaped wind inlet port 401 is located at the center-bow of the drone's body; lying atop solid structural components 412; covered by the external airframe structure 420; including: wings 404; main vertical rudder 406a; topside stabilizers 405a, 405b; hull side stabilizers 405c, 405d, 405e; integrated with wheels 407a, 407b, 407c. Also shown are internal construction and components of HAV-400; structural arrangement and architectural configuration of the vehicle's airframe mechanism comprising airbags system 420. The variety of shaped inflatable fabric airbags 420 system comprising: air-pillars 420a; air-pouches 420b; air-pads 420c; air-packets 420d; air-cells 420e; air-ribs 277aa, 277ab. Air-ribs 277aa may be configured around the circumference of the elliptically shaped HAV-400; while air-ribs 277ab may be configured to support top deck 423d and underbelly 423u surfaces. Air-pillars 420a are the equivalent of structural beams providing support for the top deck 423*d* and underbelly surfaces 423*u* of the drone's body; etc. giving it external shape and form. Thus air-pillars 420*a* may comprise thicker and much more robust fabrics to withstand much higher pressure required than the air-pouches 420*b*; air-pads 420*c*; air-packets 420*d*; air-cells 420*e*; which are the equivalent of body tissues. Air-pouches 420*b* comprises large box like cubes in form; while air-pads 420*c* comprises square or rectangular pieces of flat mattress/or cushion shaped. Air-packets 420*d* forms small adjustment pockets of air; while air-cells 420*e* enables minute space filling of gaps and topping up in between the other larger shaped bodies of airbags for a smooth exterior body surface. This is important in establishing a smooth air flow for optimized creation of aerodynamic lift. The airframe provided by compressed air or helium gas in airbags 420 works in tandem with solid-frame components 412 (refer FIG. 1D) which provides the structural skeletal backbones of the HAV-400.

Internal airbags configured into the top deck 423*d* and underbelly 423*u* portions of the body may be selectively inflated; or, deflated; their activation varied to change the body shape of the HAV-400; and their aerodynamic lifting capacities as and when required, in tandem with variations in the "angle of attack" of the body's leading edge and the wing's 404 leading edge. Wherein, neutral aerodynamic lift of a vehicle may be used to support the HAV-400's own weight of (e.g. 1 to 10 tons), keeping it airborne in a relatively steady hovering location/position. While generation of positive aerodynamic lift up to maximum lift by the wings and morphed body of the HAV-400 may be used for its ascent; enabling lifting of its designed load from its standard hovering height (e.g. 1 km level) to a greater height (e.g. 10 km level). The required lift may be varied by adjusting the shape of the body and wings profile to suit the load (drag) it is required to lift up and carry.

At high altitude, high speed wind current (e.g. 100 km/h) might be able to create adequate aerodynamic lift to power a tethered drone-glider HAV-400 to lift a heavy load. Such that for a drone with an aerodynamic lift generating surface area comparable in dimension to that of a commercial aircraft (e.g. Boeing, Airbus); a "loaded-positive aerodynamic lift" (e.g. 100 tons) may be achieved by means of balancing the HAV-400's own weight (e.g. 20 ton) plus the added load it is bearing/useful work done (e.g. 80 tons); relative to the required lift coefficient needed to keep the vehicle in a steady location/position. Negative aerodynamic lift (below neutral) generated by the morphing body and wings may be used for rapid descent of HAV-400; enabling retraction of tether lines 50*aa* and for the HAV-400 to return from its EOR point (288*aa*) to its SOR point (16*aa*) speedily.

A flying-wings-work-horse, HAV-400 may be used for generation of renewable energies and performing a variety of other heavy lifting tasks. HAV-400 may be used: (a) In a supporting role; in enhancing efficiency of HAV-100s; as a support vehicle (refer FIG. 2A to FIG. 2C) for provision of heavy lifting; enabling work stations 44*ab* to stay airborne; (b) Independently by itself as drive unit 51*aa* for generation of electricity; and stored potential energy. Three basic types of traction lifts may be performed by HAV-400 comprising: (1) batch lifting of static load comprising a heavy body e.g. blocks of stone; timber logs; etc. from one point to another point; (2) fixed position static lift e.g. carrying aloft an array of wind turbines to harness high altitude wind energy, and staying at a fixed location for an extended period of time; (3) running lift; in which a continuous force is exerted throughout its journey from SOR point 16*aa* to EOR point 288*aa*, e.g. running generators; pumps; compressors. HAV-400 may be configured with fixed bodily structure and deployed as such. Optionally, the airplane-shaped-body may be transformed into a variety of configurations comprising: V-shape; Delta-shape; 5-angled; rectangular; /or, resembling a full-moon-shaped-kite called the "wau-bulan"; etc.

FIG. 1G illustrates the front view and body profile of HAV-400 in a hovering position, in which the top deck 423*d* curvature of the airframe is minimized (while underbelly 423*u* remains the same) in comparison with FIG. 1F. The drone is at neutral aerodynamic lift; such that minimum lift generated roughly equals the body weight/or mass of the drone itself (zero load). While FIG. 1H illustrates generation of negative aerodynamic lift wherein the underbelly 423*u* curvature of the airframe is increased (while top deck 423*d* remains the same) in comparison with FIG. 1F; such that the drone descends from height rapidly towards ground level.

FIG. 1I and FIG. 1J illustrates a variant form comprising a morphing kite-drone HAV-400M; configured with concealed extensions of body-framework comprising: wing frames 424, bow frame 425; body length 426; and a collapsible arrangement of stowed windbag fabrics 30*aa*; air-ribs 277*aa*, 277*ab*; etc. These concealed extendable and retractable solid body frames 424; 425; 426; air-ribs 277*aa*; and a plurality of variously shaped airbags 420 hidden within may be deployed thereby transforming, morphing the HAV-400M into an enlarged and elongated body-frame with increased length and breath. Whereas from wing-tip to wing-tip; from nose to tail; the HAV-400M may be configured to vary from 10 m (normal pre-launch; launching) morphing up to 20 m (after launch; airborne) upon full extension of the HAV-400M's concealed body parts 424*c*; 425*c*; 426*c*. Deployment of concealed fabric materials 30*aa* stored lengthwise inside the belly of the main body transforms the drone into a kite shaped wing-suit apparatus/or a kite; kite-drone; kite-glider-drone. Winches 59*aa* and embedded lines 23*aa*; 66*aa* and pulley wheels 68*aa* beneath the wing-span pulls the fabric material 30*aa* breath-wise, opening up the wing-suit. Inflated air-ribs 277*aa* on the periphery of fabric materials 30*aa* kept the desired shape in place. Additional bridle lines 21*aa* may be used to link fabrics 30*aa* to the common joint 410. The fabric materials 30*aa* may be deployed and retracted as required to harness high altitude wind energy. Solar fabrics 415*b* may be embedded into bag fabrics 30*aa*.

FIG. 1K illustrates the change in the circumference of the body shape of HAV-400 between generation of maximum and minimum aerodynamic lift. Outer contour line 427*d* indicates the extended circumference of the drone's body when it is deflated and flaccid as shown in FIG. 1G; such that peripheral located air-ribs 277*aa* are fully inflated and extended while top deck located air-ribs 277*ab* are deflated and flaccid; giving neutral/or minimum lift. Inner contour line 427*i* indicates the shrunken circumference of the drone's body when it is fully inflated and puffed up as shown in FIG. 1C; such that top deck air-ribs 277*ab* are fully inflated and extended while peripheral air-ribs 277*aa* are deflated and flaccid; creating maximum lift; using minimum body mass.

FIG. 1L illustrates a variant form wherein HAV-400 may incorporate fabric materials 30*aa* around the circumference of its body to engage and capture wind. The fabrics 30*aa* may be extended and retracted as required by means of air-ribs 277*aa*; embedded lines 23*aa*; 66*aa*; rings 68*aa*; pulley wheels 48*aa*. Additional bridal lines 21*aa* operated by winch 59*aa* may be used to secure the fabrics to joint 410. Enabling HAV-400 to be flown like a drone glider, kite-drone or windbag 30*aa*.

FIG. 1M illustrates use of a plurality of unmanned aerial tow vehicles, UATV-80*aa*; 80*ab*; 80*ac*; in providing propulsion for elevating a HAV-400 from ground to a suitable altitude for it to generate its own lift before the towing vehicles detaches to return to ground. The three towing vehicles may be flexibly attached to both the port and starboard wing-tips 404 and the main vertical stabilizer 406*a*. Optionally, it may be elevated and lifted up by means of another unit of HAV-400 already deployed in high altitude; establish its own aerodynamic lift before being uncoupled/released from the tether line 50*ab* of the lifting unit. It may also be elevated by means of "airborne crane" comprising heavy lift helicopters; or towed by a manned aircraft just like a glider till it reaches a suitable altitude to generate its own lift before being released.

FIG. 1N illustrates the use of air-ribs 277*aa* concealed beneath the exoskeletal plates 416; in parts of the body and wings structure which may be configured to be pliable and bendable. Inflation or deflation of the air-ribs 277*aa* causes the solid rib-cage 445*a*; 445*b* structure to extend or retract; pushing up or shrinking the exoskeletal plates 416 covering the wings surface; and may be used to change the cross-section or profile of the wings structure. Such apparatus may be used on the leading edge portion of the wings; or the front leading edge of the main body, from the wind-intake port 401 (bow) running along both sides till the starboard and port side wings 404.

FIG. 1O illustrates a means of attachment in which the scale like plates 416 of the exoskeleton may be flexibly connected to a framework and network structure of solid ribs 446 by mean of a plurality of sliding rings 447.

FIG. 2A illustrates the use of HAV-400 in support of the deployment of HAV-100*aa*. The tether line 50*a*' of HAV-100*aa* may be airlifted to a high elevation by means of a roller wheel 48*aa* affixed to tether line 50*aa* borne by HAV-400. This allows HAV-100*aa* to attain higher altitudes speedily to harness more powerful winds to power driven unit 55*ag*. Thus HAV-400 displaces the use of tower 286*aa* in FIG. 13C of U.S. Pat. No. 8,963,362; U.S. Pat. No. 9,234,501.

FIG. 2B illustrates the optional use of HAV-400 in support of the deployment of a master HAV-400' leading a multitude of slave windbags 30*aa*. Master HAV-400' displaces power consuming UAV-80 in FIG. 5A of U.S. Pat. No. 8,963,362; U.S. Pat. No. 9,234,501. Such a tandem flight of HAV-400 and HAV-400' requires zero input of external energy and has zero emission as compared to using UAV-80 as previously disclosed. Other prior art disclosures such as connecting windbag 30*aa* to retract line 33 at point 32 may also be used. Control line 46*aa* or retract line 33*aa* may be used to retract back the whole drive unit 51 comprising HAV-400' and tether line 50*a*".

FIG. 2C illustrates the airborne version of station-hopping by means of airborne work-station 44*ab*; enabling the HAV-100*aa* to fly from one station to another without returning to base (please refer waterborne version of station-hopping: FIG. 2A; FIG. 13D of U.S. Pat. No. 8,963,362; U.S. Pat. No. 9,234,501). Wherein HAV-400 substitutes and displaces the use of HAV-45 in system 44. As such HAV-400 enabled system 44*ab* may also be used to support operation of flying airbags 30*aa* and HAV-100*aa* to generate renewable energy. A plurality of HAV-400s may be used in lifting a work-station 44*ab* (herein also referred to as Station B) into high altitude by means of tether 50*aa*'; and staying there for an extended period of time. The system 44*ab* may be configured to support a plurality of docking bays 428*w*, 428*x*, 428*y*, 428*z*, under air-bridge 429. Optionally, a docking bay 428 may be borne by tether 50*aa*' from a single unit of HAV-400.

A unit of HAV-100*aa* is shown attached to a docking bay 428*w* mounted beneath air-bridge 429 of Station B, 44*ab*; and another unit HAV-100*ab* anchored to two docking bays 428*x*; 428*y*. Air-bridge 429 may be constructed of rigid, solid structures comprising reinforced fiberglass; glass-reinforced plastics, carbon-fibers; composites; etc. The depleted (in run length) tether 50*aa* attached to HAV-100*aa* (originating from upwind Station A, 44*aa*) may be changed over to a fresh (full length) tether 50*ab* (originating from Station B, 44*ab*) enabling continued operation of HAV-100*aa* to Station C, 44*ac*; without being retracted back to Station A, 44*aa*. Airborne checking, servicing, refueling and minor maintenance may also be carried out prior to taking off for Station C. Fresh tethers 50*ab* attached to ground based driven units 55*ab* may be hoisted from grade up to Station B while depleted tethers 50*aa* may be lowered to ground level; and retracted to Station A by means of a dedicated HAV-400; or ground based facilities. Such capabilities enhances flexibility, efficiency and productivity of the renewable power generation plant.

FIG. 2D to FIG. 2E illustrates an anchoring sub-system 430 enabling the link-up, hook-up and docking of a depowered HAV-100*aa* to a docking bay 428*w* mounted beneath Station B. Guidance systems comprising homing signals transmitters 431*t*; receivers 431*r*; may be used to bring the two bodies into proximity. The depowered HAV-100*aa* traversing underneath bay 428*w* may be brought into alignment by means of its tether 50*aa* and motorized self-propulsion mechanisms 70*ad*, 70*ae*. A flexible U-shaped bracket 432 and suction cups 433*a* may be mounted on the belly-side of bay 428*w*. A grappling hook 435 attached to line 436 held in a concealed spring loaded self-restraining reel 437; and suction pads 433*b* may be installed on the body 99*aa* of HAV-100*aa*. In proximity, raised hook 435 attached to line 436 on HAV-100*aa* hitches up with flexible U-shaped bracket 432 which swung backward; bringing the body 99*aa* of HAV-100*aa* closer to the belly of bay 428*w*; with the suction pads 433*a* and suction cups 433*b* attaching themselves together. Suction cups 433*a* may also be configured with flexible holders 434 inlaid with vacuuming tubes connected to a vacuum system; and water spray nozzles for enhancing the suction effects between the suction cups 433*a* and suction pads 433*b*. Other anchoring mechanisms may then be brought into effect such as pneumatic clamps equipped with locking pins; locking arms; locking bars, etc. to grip and immobilize the HAV-100*aa*.

FIG. 2F to FIG. 2H illustrates the sequential phases of an aerial take off by HAV-100*aa* from docking bay 42*w*. Upon release from the anchoring sub-system 430 of FIG. 2D to FIG. 2E; HAV-100*aa* detaches and drops downward, slipping away from Station B (blown by the upstream wind) before powering up for its next run segment to Station C; affixed to a full length tether line 50*ab* (just changed out at joint 229*az*) from driven unit 55*ab* located on ground level beneath Station B; the bi-directional winch 59*az* is activated to turn the HAV-100 around, wherein the bow and stern exchanges position. Joining point 229*az* of the tether 50*ab* on the retract lines 33*az*; 33*ay*; is moved from the bow, point 227*az* (FIG. 2F); to midpoint (FIG. 2G); to the stern, point 215*az* (FIG. 2H). Windbag 30*aa* may then be deployed propelling the drone downwind of Station B, moving to Station C.

FIG. 2I illustrates the interactive forces generated in a HAV-400. The primary forces comprising the flow of wind current; and the load acting on tether line 50aa; causes generation of resultant forces acting on the drone causing it to move upwards 438 and backwards 439.

FIG. 3A to 3B illustrates a renewable energy generation sub-system 440. HAV-400 may be connected to driven unit 55ag for generating electricity. FIG. 3A illustrates the possible sequence of the various stages of lifting flight; from location L1 marked as Start-Of-Run (SOR) point 16aa; ascending to higher downwind location L2, point 441; then location L3, point 442; until reaching final End-Of-Run (EOR) point, 288aa marked as location L4; prior to depowering; and descending to lower altitudes with slower winds while being retracted back to location L5, point 443; then location L6, point 444; and then finally back to location L1, SOR point 16aa; where it awaited redeployment. FIG. 3B illustrates driven unit 55ag connected to drive unit HAV-400 via tether 50ag for producing electricity by means of tether spool 52ag; gear box 53ag; generator 54ag; and retract motor 49ag. Optionally, system 55ag maybe flexibly connected to air-compressors 55ac; or pumps 55ap; etc.

Figure 3C:
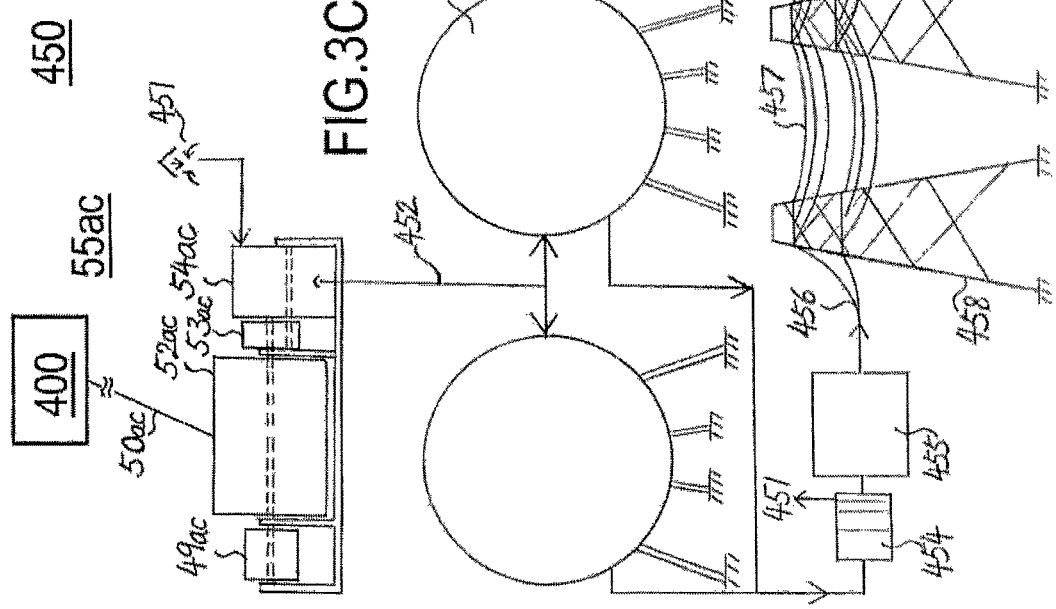

FIG. 3C illustrates an aero-electric generation plant and sub-system 450. HAV-400 is shown connected to driven unit 55ac comprising line reel drum 52ac; gear box 53ac; air compressor 54ac; and retract motor 49ac; for producing highly pressured compressed air; which may be routed via pipes 452 for storage in spherical tanks 453a; or underground storage facilities 453b (not shown). The stored potential energy in compressed air 451 may be used to run air turbine 454 driven generator 455 to generate electricity 456 on demand; which may be routed to consumers via cables 457 and transmission towers 458. Optionally it may be used to do other useful work on demand. It may also be used together with impact induced energy conversion systems.

FIG. 3D illustrates a pumped hydro-power generation plant and sub-system 460. HAV-400 may be connected to a driven unit 55ap comprising line reel drum 52ap; gear box 53ap; water pump 54ap; used with a stored potential energy system to produce hydro-electricity on demand. Water 461 may be moved by pump 54ap from reservoir 462 at grade to a plurality of elevated reservoirs 463 located at height. Potential energy of stored water 461 from elevated tanks 463 may be used to run water turbine 464 driven generators 465 to produce electricity 456 on demand. For FIG. 3C to 3D instead of using HAV-400, the drive units may be substituted by HAV-100aa. Optionally, instead of directly using HAV-400 to run compressor 54ac or pump 54ap; power produced by drone HAV-400 and generator 55ag in FIGS. 3A and 3B may be used to run the motors powering compressors 54ac of FIG. 3C; or, pumps 54ap of FIG. 3D.

FIG. 4A illustrates a heavy load lifting sub-system 470 for air-lift of a plurality of wind-turbines 471 to harness high altitude wind energy. Wind-lifter HAV-400 carries aloft a linear array comprising a multitude of wind turbines 471 by means of tether 50at for generating electricity. High altitude wind acting on turbine blades 472 mounted on shaft 475 running through turbine housing 473 embedded with stator coils 474 drives horizontal shaft 475 which rotates rotor coils 476 to produce electricity 456, as is known in any wind turbine generators. Vertical shaft wind turbines 477 may also be airlifted. Electricity 456 generated may be transmitted by means of cables 478 embedded into load tether 50at; or, control line 46aa.

FIG. 4B illustrates a variant sub-system 480 wherein an array of wind turbines 471; of various sizes mounted in a framework or carrier-apparatus 480 may be carried aloft at height by means of tether 50at to harness high altitude wind energy. A plurality of such arrays 480 of wind turbines 471 may be lifted into high altitude to harness high altitude wind energy. Carrier apparatus 480 may comprise of an internal lattice work of square shaped supporting struts 479 and diagonally inclined supporting struts 481; enabling mounting of turbine housing 473. HAV-400 may be kept in location by means of control lines 46aa and ground based system comprising line reel 52aa and winding motor 49aa. A plurality of bridle lines 21aa may be used to connect the tether 50at with carrier-apparatus 480 at point 410. Optionally, a pulley-roller apparatus 482 installed at point 410 may be used to lift or lower the tether line 50at and array of turbines 471 up or down without altering the height of the HAV-400. Such that line 50at may be looped through apparatus 482; one end bearing the load of wind-turbines with the other end connected to a ground line reel system used for control line 46aa comprising line reel 52aa; winding motor 49aa. Fixed or adjustable wind vanes 483 may be used to provide proper alignment of apparatus 480 relative to wind flow; ensuring effectiveness, efficiency and productivity of the system.

FIG. 4C illustrates the cross-sectional side view; FIG. 4D illustrates the cross-sectional view of the motor of FIG. 4C; a counter-rotating airborne wind-turbine-generator system AWTG-490h configured with dual rings of rotor coils and rotor magnets; turning the shaft 475 (and rotor magnet 476h); and yoke 484 (and rotor wire coil 474h) in two opposite directions of rotation. Such a twin rotors concept differs in structural configuration from a standard turbine-generator setup comprising: a stator wire coil 474 and a rotor magnet 476; or conversely (a stator magnet and a rotor wire coil); with single or dual turbines 472 turning the shaft 475 in a single direction of rotation as illustrated in FIG. 4A and FIG. 4B. To this end wind energy harnessed by means of the dual front and rear (fore and aft) mounted turbines may be used to produce counter-rotational movements in both rings of the rotor coils. Such that both rings of rotors comprising: wire coil 474h and magnet 476h are rotating; but in opposite directions to each other; individually connected to and powered by its own dedicated wind-turbine propulsion sub-unit 472f and 472a. Fore turbine 472f may be connected directly by means of shaft 475h to the centrally mounted electro-magnet 476h. Aft mounted turbine 472a may be directly connected to the shell mounted wire coil 474h (surrounding magnet 476h) by means of a yoke 484 connected to hub 485. The generator 473 may be protected by external body cover 473h. A variable electrical (or magnetic flux) controller 466 may be used to vary the supply of current to the electro-magnet 476h of the generator; and thus vary the production of electricity relative to the wind power available at the point in time. If the wire coil 474h rotates clockwise; then the magnet 476h rotates anti-clockwise. Or, vice-versa. Wherein the speed and movement of the generating surfaces of both rotating elements relative to each other may be doubled. Such a double counter-revolving dynamic surfaces configuration of system 490h enables much higher efficiency and productivity as compared to standard airborne wind turbine generators of FIG. 4A and FIG. 4B. And may be used to replace them/or used together with them.

FIG. 4E to FIG. 4F illustrates a variant system with twin "flattened" disc-shaped generating surfaces vertically aligned. FIG. 4E illustrates the side view of a vertically disposed generation system AWTG-490d; while FIG. 4F illustrates the cross-sectional plan view of FIG. 4E. Wherein the double counter-rotating discs comprising the wire coil 486 and magnet 487 may be directly connected by means of shafts 475'; 475" and angular transmission gear mechanism 467 to the fore turbine 472f and aft turbine 472a. If the wind energy harnessed is directly transmitted from the turbines to generator without angular transmission gear mechanism 467, the generating components may be aligned directly facing the wind direction. This incurs undesirable drag forces. To overcome this shortcoming, the counter-rotating discs may be realigned in a streamlined manner relative to the wind flow as shown. The discs may also be oriented horizontally; instead of vertically aligned.

FIG. 4G illustrates a variant system AWTG-490q of FIG. 4C and FIG. 4D wherein quadruple turbines comprising two sets of twin counter rotating turbines may be configured in close proximity to each other. The first fore turbine 472fw may be connected to the shaft 475h to power the generator. While the second fore turbine 472fx may be configured to be freely spinning, but turning in a direction opposite to that of front fore turbine 472fw. The turbine blades may incorporate/or be embedded with generating elements comprising: wire coils 488 and magnets 489. The first fore turbine blades 472fw may incorporate wire coils 488. The second fore turbine blades 472fx may incorporate magnets 489. Oncoming wind flow (W) may rotate the blades of first fore turbine 472fw (powering the shaft 475h) clockwise; then flows to rotate the blades of second fore turbine blades 472fx (free-spinning) anti-clockwise. Such that when the twin turbines in close proximity counter rotates against each other the embedded elements 488 and 489 in the moving turbine rotor blades may generate electricity. The same configuration applies to the first aft turbine 472ay and second aft turbine 472az. Oncoming wind exiting fore turbines 472fw and 472fx flows over to rotate the first aft turbine 472ay (free-spinning) clockwise; then flows over to rotate the second aft turbine 472az (powering the yoke 484) anti-clockwise. Two generation sources comprises: (a) twin rotors of wire coil ring 474h and magnet ring 476h; (b) embedded wire coils 488 and magnets 489 present in the turbine blades 472fw; 472fx; 472ay; 472az.

Likewise FIG. 4H illustrates twin turbine rotors 472f (fore) and 472a (aft) mounted on fixed pillar 469 and adjustable pillar 469m; which counter rotates against each other to produce power by means of embedded wire coils 488 and magnets 489. A swivel joint 468 may be incorporated into the top of fixed pillar 469 near generator module 473; while movable pillar 469m may be shifted by means of a motor in a semi-circular arc shaped base 459c configured into concrete pedestal 459. This enables shifting of the turbines to face the wind. Two generation sources comprises: (a) conventional stator 474 and rotor 476 assembly of generators 473; (b) wire coils 488 and twin magnets 489 embedded into the turbine blades 472f and 472a.

FIG. 4I illustrates the sectional front view of a variant version of vertical axis turbine 477v wherein, a plurality of counter-rotating sections of said turbine may be configured to operate as a single unit 477v for producing electricity by means of twin rotors powered generators 474r; 476r; and disc generators 486r; 487r mechanisms; using both vertical axis generating elements comprising: rotor wire coils 474r; rotor magnets 476r; and flat discs of rotor wire coils 486r; and rotor magnets 487s. The entire apparatus 477v may be set up on fixed pillars/or, it may be lifted into high altitude by means of tether 50at affixed to HAV-400 wind crane. Section A and C may be configured to revolve clockwise; while section B and D may be configured to rotate in an anti-clockwise direction. The vertically aligned rotor shaft 475v ran from the topmost vertical axis generating elements 486r; 487s (above section Ag) to the bottom most generating elements 486r; 487s (below section Dg). Shaft 475v bore the entire weight of apparatus 477v. An orifice 459 may be configured into the magnet discs 487s and 487r to enable passage of vertical shaft 475v. Electricity generated may be routed via tether-cable 478.

The vertical axis generating elements may comprise of: rotor shaft 475v affixed with wire coils 474r; and rotor casings 477c affixed with magnets 476r. In section A and C; rotor shaft 475v driven by the turbine blades may be configured to turn in a clockwise direction. In section B and D; shaft 475v may be integrated with a layer (ring) of wire coil 474r; surrounded by a layer (ring) of magnet 476r integrated into rotor casings 477c of turbine blades 477. Casing 477c is equivalent to yoke 484 of FIG. 4C and FIG. 4D. The turbine blades 477 may be configured to turn casings 477c and layer (ring) of magnet 476r in an anti-clockwise direction. This counter revolving movement provided by the (a) rotating shaft 475v to the rotor wire coils 474r (clockwise); and the (b) rotating turbine casing 477c to the rotor magnet rings 476r (anti-clockwise) may be used by the vertical axis generators 477v to produce electricity.

The horizontally aligned disc generating elements AB; BC; CD; configured in between sections A; B; C; D; may also be used to produce electricity; from the counter rotational movement of the rotor wire coiled discs 486r and the rotor magnet discs 487r. Vertical axis disc generator AB uses the clockwise movement of section A turbine to drive the wire coil disc 486r; and the anti-clockwise movement of section B turbine to drive the magnet disc 487r. The topmost and bottom most discs generators Ag and Dg may comprise of: rotor wire coil discs 486r and stator magnet discs 487s. Two generation sources comprises: (1) wire coils 474r; magnets 476r; (2) rotor wire discs 486r; rotor magnet discs 487r; and conventional stator-rotor setup 486r; 487s.

An airborne ecosystem 500 for extraction of high altitude wind energies for generation of renewable energies; comprising the integration of: (1) an aerial system of heavy lifting drones HAV-400; with (2) heavy lifted loads. Wherein said heavy lifting apparatus comprises HAV-400 wind cranes. Said heavy lifted loads comprises: (a) wind turbines: 471; 477v; 490h; 490d; 490q; 500b; 500c; 500d; multi-staged counter-rotating wind turbines 500a; (b) a high altitude wind energy harvesting system 510a comprising airborne Station X, Station Y; (c) and an improved system 76aa with a multitude of flying windbags 30ap spearheaded by a drone HAV-400; a drone HAV-100aa. This ecosystem 500 may be illustrated by FIG. 5A to FIG. 5M; in combination with FIG. 4A to FIG. 4G; FIG. 4I; FIG. 6A to FIG. 6N; FIG. 6P to FIG. 6Q; and FIG. 8B.

FIG. 5A to FIG. 5M illustrates a variant system 500a to 500d of Airborne-wind-Turbine-Generators-500a herein designated as AWTG-500a to 500d; lofted into high altitude by means of HAV-400 wind-cranes to harness and to harvest high altitude wind energy. The Airborne-wind-Turbine-Generators AWTG-500a being lifted may be configured to be vertically disposed; or inclined at an angle relative to the wind direction (refer FIG. 5C; FIG. 5D; FIG. 5J; FIG. 5M). This systemic variability may be required to adjust to changes in wind speed/energy; turbulence; loading; for operational purposes and practicability of application. At a certain angle of incline, wind-lift caused by the upward thrust of the wind current on the AWTG-500a may reduce its weight; or load on the HAV-400; thus partially balancing out the weight of AWTG-500a.

FIG. 5A to FIG. 5D illustrates a system comprising of a multi-staged counter-rotating airborne wind turbine generator AWTG-500a mounted on a single plane; with multiple rings of generating mechanisms 491 comprising: concentrically arranged rings of turbines blades 492; rotor wire coils 493; rotor magnet coils 494. One rotating circular ring 491 mounted inside/or outside of another rotating circular ring 491. FIG. 5A illustrates the front view of a vertically lifted wind turbine 500a; FIG. 5B illustrates the cross-sectional plan view of FIG. 5A. FIG. 5C illustrates a side view of FIG. 5A; while FIG. 5D illustrates a side view with the turbine lifted at an inclined position.

The structural configuration of conventional wind turbines comprises stators and rotors. Wherein the configuration of present invention comprises: dual rotors; no stators. Dual rings of rotor coils and rotor magnets; turning the generating mechanisms in two opposing directions of rotation. To this end wind energy harnessed by means of such dual rotors may be used to produce counter-rotational movements in both rings of the rotor coils. With reference to FIG. 5A to FIG. 5B viewed from the center hub 496 moving towards the periphery, the outer-most edge 501; the configuration of AWTG-500a may be described as follow: (a) Stage 1 turbine-generator ring 491a comprising: a circular ring of turbine blades 492a; configured with a ring of rotor wire coil 493a at the outer edge; and a ring of rotor magnet 494a surrounding a stator wire coil 495s at the hub 496. (b) Stage 2 turbine-generator ring 491b comprising: a circular ring of turbine blades 492b affixed to a ring of wire coil 493b at the outer edge; and a ring of magnet 494b at the inner edge. (c) Stage 3 turbine-generator ring 491c comprising: a circular ring of turbine blades 492c bearing a ring of wire coil 493c at the outer edge; and a ring of magnet 494c at the inner edge. Central hub housing 496 may be configured with conventional rotor magnet 494a and stator wire coil 495 assembly to produce electricity. While the generation mechanism at the circumference of apparatus 500a may comprise of a ring of rotor wire coil 493c and stator magnet ring 497s. Rotor wire rings 493 and rotor magnet rings 494 rotates and moves in extended guide sleeves 498 of framework girders 499; keeping them in position. Roller bearings and ball bearings may be used where applicable.

The whole wind-turbine-generator apparatus 500a may be slotted into and securely mounted in a circular body clamp 501; supported by a framework comprising girders 499; struts 502; etc. Any number of girders 499 and struts 502 may be used to support the apparatus as desired. Circular body framework 501 may be configured as a clamp mechanism gripping tightly onto apparatus 500a. Hub 496 and body clamp 501 may be configured with provisions for line (21aa to 21ad) attachments such as lifting rings 501c for use with lifting clamps and hooks; winches 59aa (for line adjustment); rudders 69, rudder-fins 84aa; fins 85aa and winglets 85aa; for computerized 503 directional control and orientation. Electricity may be generated when one power generating ring 491 comprising: a ring of turbine blades 492 mounted with a ring of rotor wire coil 493 and a ring of rotor magnet 494 at each end; rotates against the counter rotating components of another ring(s) 491 mounted adjacent to it in close proximity. Or, rotates against fixed stator components such as the stator wire coil 495 located at the central hub 496; and the outermost stator magnet ring 497 located at the edge of apparatus 500a. Optionally, stage 3 turbine blades 492c may be configured with rings of magnets 494c at both the inner and outer edges; surrounded by a stator wire ring 497 at the outermost edge of AWTG-500a. Such flexibility of configuration may be used to optimize design and efficiency.

The stage 1 turbine-generator ring 491a; and stage 3 turbine-generator ring 491c may be configured to rotate in the same direction, with stage 2 turbine-generator ring 491b (located in between stage 1 and 3) configured to rotate in the opposite direction. For example: if stage 1 and stage 3 are configured to rotate clockwise; stage 2 shall be configured to rotate anti-clockwise. Or conversely configured. Such a counter-rotational structural configuration enables doubling of the relative speed of rotation between the stage 2 turbine-generator 491b (anti-clockwise); and that of stage 1 turbine-generator 491a (clockwise); and stage 3 turbine-generator 491c (clockwise). And vice-versa. Thus rotational movement and relative speed between the stage 2 turbine-generator 491b (rotating anti-clockwise); and that of stage 1 and stage 3 turbine-generators 491a; 491c (rotating clockwise) may be doubled. This may increase the efficiency and productivity (e.g. doubled power generating capacity) of the Airborne-wind-Turbine-Generator-500a in producing renewable electricity. Multiple stages of counter-rotating AWTG-500a in excess of three stages (as illustrated); for example: five stages; ten stages; etc. may also be configured for use.

FIG. 5C illustrates the side view of an AWTG-500a lifted in a vertical position; while FIG. 5D illustrates the side view of an AWTG-500a lifted in an inclined position by means of HAV-400 wind crane. Tether line 50aa and a plurality of bridle lines 21aa may be used to enable lifting of the units into a suitable height for harnessing high altitude wind energy. FIG. 5E to FIG. 5G illustrates the front view of variant Airborne-wind-Turbine-Generator 500b; 500c; 500d. FIG. 5H illustrates the cross-sectional side view 5H-5H; while FIG. 5I illustrates the cross-sectional side view 5I-5I. FIG. 5H and FIG. 5I illustrates two possible arrangements in which the apparatus as shown in FIG. 5E to FIG. 5G may be configured. Wherein AWTG-500b; 500c; 500d; may be configured as illustrated in FIG. 5H (single plane), FIG. 5C and FIG. 5K. Or arranged side-by-side in a port and starboard configuration as illustrated in FIG. 5I; FIG. 5J (dual plane); and/or in an over-under configuration (inclined lift); if FIG. 5J is lifted in an inclined position as illustrated in FIG. 5D and FIG. 5M.

The apparatus may be configured to generate electricity by means of a centrally located hub 496 in the middle; and at the periphery 497e; 497f; 497g. Hub 496 may comprise of rotor magnet ring 494e; 494f; 494g; and stator wire coil 495e; 494f; 494g/or standard stator 474 and rotor 476 coils (refer FIG. 4A). The generation mechanism at the circumference of the turbine may comprise of a ring of rotor wire 493e; 493f; 493g and a ring of stator magnet 497e; 497f; 497g. The inner ring of rotor wire 493e; 493f; 493g mounted at the tip of the turbine rotors 492e; 492f; 492g revolves around an outer coiled ring of magnet 497e; 497f; 497g; mounted in a ring at the outermost edge 473e; 473f; 473g. Optionally in a vice versa arrangement; the configuration or location of generating mechanism comprising: stator wire ring 495 and rotor magnet ring 494 may be swapped.

FIG. 5E, FIG. 5F and FIG. 5I illustrates a system wherein generating mechanisms comprising rings of rotor wire 493f; 493g and rings of coiled stator magnet 497f; 497g; may be integrated into a single unit protected by generator housing 473f; 473g. FIG. 5A illustrates a configuration comprising exposed individual rings of rotor magnet 494; and coiled stator wire 493 components. FIG. 5H illustrates the side view of a standard single turbine-generator 500b; 500c;

500d; configured with rotor 494e and stator 495e assembly in the central hub 496e. The ring of rotor blades 492e may be affixed with a ring of rotor wire 493e at the edge; surrounded by an external ring of stator magnet 497e.

FIG. 5I illustrates a variant configuration of FIG. 5H wherein dual units of turbine-generators 500b; 500c; 500d; may be configured side-by-side, vertically oriented and aligned in a fore and aft position (refer FIG. 5J) or in a port-starboard configuration and in close proximity to each other, facing the wind. The blades of twin turbines 492f (fore); 492g (aft) may be configured to counter-rotate against one another. The counter-revolving turbine blades 492f; 492g may incorporate/or be embedded with power generating elements comprising: rotor wire coil 488 and rotor magnets 489. For example: if the fore turbine blades 492f embedded with wire coils 488 rotates clockwise; the aft turbine blades 492g embedded with magnets 489 shall rotate in an anti-clockwise direction. These embedded rotor wire coils 488 and rotor magnets 489 present in counter-revolving turbine blades 492f and 492g may also be used to produce electricity. Just like the standard rotor 494f; 494g; and stator 495f; 495g assembly in the central hub 496f; 496g.

In this configuration, electricity may be produced from three generation mechanisms comprising: (a) standard rotor magnet ring 494f (and 494g) and stator wire coil 495f (and 495g) in the hub 496f (and 496g); (b) rotor wire coil ring 493f (and 493g); and stator magnet ring 497f (and 497g) at the circumference; and (c) counter-rotational movement of wire coils 488 and magnets 489 embedded into turbine blades 492f and 492g. Electricity 456 produced from all of the three above points of generation may be collected and channeled into tether-cables 478 to a mooring buoy 508 for conveyance to processing plants on floating platforms.

FIG. 5J illustrates a variant version of FIG. 5I wherein twin units of ATG-500a (mounted on dual planes) may be combined together in a side-by-side/or, in an over-under configuration to function operably as a single unit. Incorporation of embedded rotor wire coils 488 and rotor magnets 489 into turbine blades 492 as illustrated by FIG. 5I may enable improved productivity and efficiency. The apparatus may be lifted into high altitude in a vertical/or inclined position by means of HAV-400 wind crane using a plurality of bridle lines 21aa and tether line 50aa. FIG. 5K illustrates system 500; showing the front view of a wind-crane HAV-400 lofting a plurality of vertically disposed turbine generators 471; AWTG-500a; 500b; by means of tether 50aa facing the oncoming wind. FIG. 5L illustrates a customized storage rack-container 504 with partitioned slots 505 for keeping the ATGs-500. Demobilized units may be lowered and slotted back into rack 504.

FIG. 5M illustrates system 500; wherein, an inclined AWTG-500b may be lifted into high altitude by means of a HAV-400 wind-crane. The tether 50aa may be linked to bridle lines 21aa; 21ab; 21ac; 21ad; at common joint 506; with camera 507 attached. Lines 21aa to 21ad may be attached to the external framework 501 of turbine-generator 500b by means of lifting lugs and rings 501c and their lengths adjusted by means of winches 59aa. Electrical power generated may be routed by means of cable-tether 478 to reel system 52aa mounted on a seaborne mooring buoy 508; which may in turn be routed by means of submarine cables 457u to floating electrolyzer plants 509s abroad FPSO vessel 511 for producing hydrogen gas. Cable 457u may also route the electricity to a land based hydrogen gas generation plant 509t. Specially configured Floating Production Storage Offloading (FPSO) vessels 511; sited proximate to buoy 508 provides a floating platform for producing hydrogen gas/or for other means of energy conversions; storage; transfer of products to seaborne carriers; etc. The renewable electricity generated may also be channeled by means of submarine cables 457u to land based transformer stations, overhead cables 457 and towers 458 for transmission to consumers; /or to land based electrolyzer plants 509t for conversion, storage, transfer, etc. Such electrolyzer plants 509s may also be sited on fixed leg platforms 290aa/or borne by mobile floating production rigs and flatbed vessels comprising: semi-submersible platforms 292aa; flatbed platforms 293aa; inflatable floating bodies 294aa; anchored to the seabed piles 545 by means of subsea cables 295aa; supported by mother ships 289aa; factory ships 296faa; tankers 296taa; etc. Such mobile floating platforms/or bodies may also be moored by means of lines 512 to floating buoys 508; which may in turn be secured by means of subsea cables 295aa to undersea pillars 545; piles 562; beams 563; plugs 564; etc. (Refer: System 300 of FIG. 13I; FIG. 13D of U.S. Pat. No. 8,963,362). The external frame of the AWTG-500b may be equipped with computerized 503 directional control surfaces comprising: rudder-fins 84aa; fins and winglets 85aa; which may be manipulated to orientate the module into a desirable; optimal position relative to the wind direction and altitude. Computerized system 503 abroad may be configured for total operational control of AWTG-500b comprising: self-alteration, self-alignment and automated adjustment of system 500b's orientation and position relative to the wind direction; wind speed; optimized energy production; used to monitor AWTG-500b's system performance; faults and deficiencies with the help of cameras 507. And for liaison and feedback with surface based/or ground based computerized smart control systems such as the DCS; integrated with Artificial Intelligence (AI).

FIG. 6A to FIG. 6N illustrates an airborne high altitude wind-energy extraction system 510a for deploying a plurality of windbags 30aa. FIG. 6O illustrates a deep-sea-diving ocean-energy extraction system 510u for deploying a plurality of water-bags 40aa. Systems 510a and 510u may be deployed together in the combined wind and water energies extraction plant 300 (previously disclosed in FIG. 13I of U.S. Pat. No. 8,963,362)—a marine eco-system specially configured for the production of renewable energies. FIG. 6A to FIG. 6N illustrates an airborne system 510a; while FIG. 6O illustrates a seaborne system 510u; wherein said disclosure may comprise parallel systems to the riverine hydro-energy extraction plant 310 (previously disclosed in FIG. 14A to 14G of U.S. Pat. No. 8,963,362).

However, compared to riverine system 310 executed on land; airborne system 510a and deep-sea diving system 510u are much more complex and difficult; and operates in an occupational environment more hazardous than run of the river systems. Requiring the use of apparatus, equipment, systems, methods and techniques as disclosed in FIG. 6A to FIG. 6N. The airborne system 510a requires much more complex light weight components, HAV-400; air-bridges 429p; 429r; radio-frequency activated sub-systems. While the seaborne system 510u requires semi-submersible platforms comprising: upstream surface Station U; downstream bottom Station V; supporting surface Station W; secured by cables 295aa to pillars 545 piled into the seabed 537; or, to suction cups 550 affixed to the sea-floor 537; submarine boats 220aa; personal submersible vehicles 220aa. The combined airborne system 510a and seaborne system 510u may also be integrated with other components of the marine ecosystem 300 comprising: fixed leg platforms 290aa; mobile floating production rigs and flatbed vessels; semi-submersible platforms 292*aa*; floating flatbed platforms 293*aa*; inflatable floating bodies 294*aa*; mooring buoys 508; electrolyzer plants 509 abroad FPSO 511; anchored by means of undersea cables 295*aa* to pillars 545; piles 562; beams 563; plugs 564; etc. in the seabed 537 and seamounts 555; supported by mother ships 289*aa*; factory ships 296*faa*; tankers 296*taa*; etc. deep-sea diving and operation components; sonar activated sub-systems; etc. including other hi-tech equipment such as advanced Artificial Intelligence computers; specialized equipment and much more complex sub-systems than the riverine extraction plant 310. Actionable solutions much more difficult to execute than the prior art disclosure. Relevant components disclosed herein may also be adapted for use with system 310.

FIG. 6A illustrates an overall view of the airborne high altitude wind energy extraction cum power generation system 510; whereas, FIG. 6B and FIG. 6C illustrates more detailed arrangements of Station X, 429*p* (Start-of-Run) SOR point 16*aa*; and Station Y, 429*r* (End-of-Run) EOR point 288*aa*. For ease of description these two points may be referred to as Station X and Station Y. Wherein, both Stations X and Y may be lofted; carried up into high altitude by means of a plurality of HAV-400 wind-cranes. Optionally, tethered 46*aa* HAVs-45*aa*; balloons; airships-45*aa*; aerostats-45*aa* and blimps 45*aa* may also be used. Station X may be located upwind of Station Y. Station Y may be located at the same altitude as Station X; or Station Y may be located at a higher altitude than Station X; enabling windbags 30*aa* to engage wind of much higher speed and energy as they ran from Station X (SOR) to Station Y (EOR). One pair of guide lines (304*ap*'; 304*ap*") forms a complete loop from Station X to Station Y for power run of windbags 30*ap*; and from Station Y back to Station X (304*ar*'; 304*ar*") for retraction, return, retrieval of windbags 30*ar*. A multitude of such pairs of guide-lines (forming lane A, lane B, lane C, etc.) may be configured running to and from Station X and Station Y. With the windbags 30*aa* used and reused repeatedly within the loop of running lanes (A; B; C). Generating renewable energies from High Altitude Wind Power.

Windbags 30*ap* may be flexibly connected to a pair of guide lines marked 304*ap*' and 304*ap*" (which forms aerial runway Lane A) by means of a pair of swivel holding rings 308*ap*' and 308*ap*". At the air-bridge 429*p* of Station X (a more advanced form of work platform 47*aa*) windbags 30*ap* with inflated ring 22*ap* and air-ribs 277*ap* may be released through the SOR gates 520*p*'; 520*p*"; running from Station X to Station Y along Lane A formed by guide lines 304*ap*' and 304*ap*"; pulling tether 50*aa*; powering generator 55*ag*. At the End-of-Run phase near Station Y, air may be released from the exhaust port 532 of pressure control sub-system 530; deflating ring 22*ap* and air-ribs 277*ap*. Sub-system 530 may be activated by means of (RF) radio frequency transmission from a proximity transmitter 299*raa* located on work bridge 429*r* to receiver antenna 534 (refer FIG. 6K; FIG. 6L). The collapsed, depowered windbag 30*ar* may be released through the EOR gates 520*r*'; 520*r*"; of air-bridge 429*r* Station Y. The returning windbag 30*ar* may be retrieved by means of tether 50*ar* wound in by line reel 52*aa* and retract motor 49*aa*; via retraction guide lines 304*ar*' and 304*ar*"; moving from Station Y to Station X.

FIG. 6D illustrates a much more detailed arrangement of Station X, than FIG. 6B for launching windbags 30*ap* at air-bridge 429*p*. While FIG. 6E illustrates a much more detailed arrangement of Station Y, than FIG. 6C for depowering windbags 30*ar*; and for their return to Station X. FIG. 6D and FIG. 6E also illustrates details of the gated sub-system 520*p* and 520*r* (refer FIG. 6H to FIG. 6J) at the SOR and EOR phases for passage of windbags through these anchoring points. Wherein said plurality of windbags 30*aa* are used for generation of power; returned to the starting point; reused and recycled repeatedly in a closed loop.

FIG. 6D illustrates the detailed layout of the air-bridge 429*p* of Station X for launching windbags 30*ap*. This is the Start of Run (SOR) point 16*aa* where incoming windbags 30*ap* are prepared; readied for deployment; and launched for a power generating run from Station X to Station Y. Collapsed incoming windbags 30*ar* returning from Station Y arrives by means of dual returning guide lines 304*a*' and 304*a*"; with the port and starboard holding rings 308*a*' and 308*a*" in close proximity to each other due to the collapsed state of windbag 30*ar*. At Station X the pair of guide lines 304*a*' and 304*a*" may be enjoined to a pair of "Y"-shaped solid state frames 515*p*'; 515*p*" at joints 514*r*'; 514*r*". Said port and starboard guide lines 304*a*' and 304*a*" may be enwrapped/or embedded inside of a thick solid state frame 515*p*' between the points 514*r*' to 514*p*"; and frame 515*p*" between the points 514*r*" to 514*p*". The "Y"-shaped frames 515*p*'; 515*p*" may be held in position by the dual banks of the gated sub-system 520*p*'; 520*p*". Components 521 and 522 of sub-system 520*p* may be configured along the windbags 30*ap* run-way (Lane A) formed by port and starboard guide lines 304*ap*' and 304*ap*" embedded in frames 515*p*' and 515*p*". Dual guide lines 304*ap*'; 304*ap*" in turn forms an airborne run-way for the guided flights of windbags 30*ap*; which for reference purposes may be designated as: "Lane A"; "Lane B"; "Lane C"; etc. Said "Y" shaped frames 515*p*'; 515*p*" may be spread out reflecting the actual diameter (e.g. 2 m) of the inlet port ring 22*ap* of the inflated windbag 30*ap* as configured.

Solid frame 515*p* comprises a component of the guide lines 304*ap* system. It does not form part of the structure of Station X or Y. Guide lines 304*ap* running from Station X to Station Y provides a guided aerial running pathway for windbags 30*ap*; pulling tether 50*ap* to generate power by means of generation system 55*ag*. Returning guide lines 304*ar* running from Station Y to Station X provides a means for retrieving depowered windbags 30*ar*. Retracted by means of tether 50*ar* wound back by spool 52*ar* and motor 49*ar*. Said guide-lines 304*aa* system forms a round loop from Station X to Station Y; then back again from Station Y to Station X. In this loop windbags 30*aa* rotates; going from one phase to another; from one cycle to another repetitive cycle.

Though solid frames 515*p* and 515*r* does not comprise part of the structure of Station X; Y; it may be flexibly and securely connected to said structures by means of gated sub-system 520 and affixed holder-stands 525. At station X, as the windbag 30*ar* moves past point 514*r*'; 514*r*"; frame 515*p*'; 515*p*" spreads out and widens the "Y" shaped gap in between the two incoming guide lines 304*a*'; 304*a*". Cover 536 may be removed from the external of windbag 30*ar* and/or retract line 33*ar* disengaged from clip 533 at point 31*aa* by means of robotic appendages 522 comprising arms 526; hands 527; fingers 528; and thumbs 529. Depowered windbag 30*ar* is freed and opens up. Pressurized air may be injected into inlet port 531 of controller 530 by means of hand held (robotic limbs 522) compressed air nozzle 535; inflating inlet port ring 22*ap* and air-ribs 277*ap*. Windbag 30*ap* passes through the electronic gated sub-system 520*p* before being released to fly to Station Y. Sub-system 520*p* and 520*r* provides the two main contacts and only anchoring points securing guide lines 304*aa* in between Station X and Station Y. Sub-system 520*p* allows safe and secure passages of windbags 30*ap* through the anchored guide-lines 304*ap'*; 304*ap"* at the SOR point 16*aa*. Sub-system 520*r* allows safe and secure passages of windbags 30*ar* through the anchored guide-lines 304*a'*; 304*a"* at the EOR point 288*aa*. Ensuring positive physical contact between the guide lines (304*ap* and 304*ar*) and the air-bridges (429*p* and 429*r*).

FIG. 6E illustrates a more detailed layout of the air-bridge 429*r* of Station Y for depowering windbags 30*ap*. This is the End of Run (EOR) point 288*aa* where incoming windbags 30*ap* are depowered and processed for return to Station X (SOR). The port and starboard guide lines 304*ap'* and 304*ap"* joined the solid frames 515*r'* port side and 515*r"* starboard side at points 514*p'* and 514*p"*; thereafter the twin pieces of solid frame 515 port and 515 starboard may be curved to converge together in proximity to each other. Securely held in position by locked gate sub-system 520*r* affixed to holder-stands 525 which forms part of air-bridge structure 429*r*. After the gated sub-system 520; solid frames 515 may be curved to bend downwards; joining port guide-line 304*a'* at point 514*r'* and starboard guide-line 304*a"* at point 514*r"*. Guide-lines 304*a'* running from Station Y may be connected to the port solid frame 515*r'* of Station X air-bridge 429*p* at point 514*r'*; and 304*a"* connected to the starboard solid frame 515*r"* at point 514*r"*.

In proximity to EOR Station Y air-bridge 429*r*, incoming windbag 30*ap* may be depowered by means of apparatus 530; activated by RF signals from apparatus 299*raa*. Inlet port ring 22*ap* and air-ribs 277*ap* collapsed. Gear box 53*ag* of generator 55*ag* may be freed. The collapsed windbag 30*aa* may be routed to apparatus 520*ar* where it passes through the plurality of gates 521; 522 one at a time till it reaches the downward bending portion of frame 515*r'*; 515*r"*. The returning windbag 30*ar* is reeled in by means of tether 50*ar* and retract motor 49*ag*; from Station Y to Station X.

Optionally, after exiting gated sub-system 520*r*, holding ring 308*ap'* may be shifted from port guideline 304*ap'* to starboard guideline 304*a"* by means of robotic limbs 522; prior to the return journey from Station Y to Station X. Upon arrival at Station X, this maneuver may be reversed. The holding rings 308*a'* may be shifted from the port frame 515*p"* holding guideline 304*a"* back to starboard frame 515*p'* holding line 304*ap'*; prior to entering gated sub-system 520*p*. Such a maneuver avoids interference of lines 50*ap* and 50*ar* between a multitude of running and returning windbags 30*aa*.

FIG. 6F illustrates an optional configuration wherein twin retract lines 304*a'* and 304*a"* may be combined together and merged into a single line 304*ar* for returning depowered windbags 30*ar* from Station Y to Station X. Such a structural configuration eliminates problems of line interference; entanglements; knots formation; etc. between lines 50*ap* in power run and line 50*ar* in retraction phase. Because multiple windbags and tether lines 50*ap*; 50*ar* may be moving to and fro between Station X and Y along a single lane A at any one point in time. And along any of the other lanes B; C; D; etc. To this end the dual pieces of "Y" shaped solid frame 515*r'*; 515*r"* may be merged into one piece 515*r* at the confluence of the two split forks 515*r'* and 515*r"* at Station Y. Apparatus 515*p'*; 515*p"* may be similarly modified at Station X. At Station Y, upon outgoing windbags 30*ap* having cleared the gates 520; robotic limbs 522 may be used to effect the switching of the swivel rings 308*ap'* and 308*ap"*. From the forked frame 515' and 515" holding guide lines 304*ap'* and 304*ap"*; over to the merged frame 515*r* holding a single combined guide line 304*ar*. This process may be reversed at Station X wherein, depowered incoming windbags 30*ar* may be transferred from merged portion of frame 515*r* holding line 304*ar*; to the forked portion of frame 515' and 515" holding lines 304*ap'* and 304*ap"* by means of robotic limbs 522. Readied and prepared for the power up phase; passed through the gated sub-system 520; and put on hot standby.

FIG. 6G illustrates use of a tall relief feature/or topographically advantageous geological features like for example: a high mountain top 516 adapted as a high altitude ground Station G. The relief 516 may be suitably modified, converted and configured with structural features 516*m*; for use as a platform (Station G) for launching windbags 30*ap* to an airborne air-bridge 429*r* (Station Y) supported by a plurality of HAV-400 wind-cranes. Ground Station G may replicate Station X of FIG. 6A to 6D; except that it may be sited on solid ground at a high altitude (e.g. 2 km). It may also comprise of a fixed platform 517 configured with flexibly adjustable side extensions 517*x* which may be moved around whenever needed to face the wind direction for optimized wind energy capture; extraction and renewable energy production. Motorized mobile side extensions 517*x* supported by beams 518 may provide extended length; increasing the useful work area. Likewise, an air-bridge station suspended in between a plurality of mountain peaks may also be used together with an airborne air-bridge (Station Y).

FIG. 6H to FIG. 6J illustrates components of sub-system 520 comprising mechanical clamps 521 and robotic limbs 522 for working in an environment fraught with extremities—high altitude and deep-sea work stations. FIG. 6H illustrates a mechanized hydraulic clamp cum robotic holder 521 for securing a guide-line 304*aa* embedded inside a solid state frame 515. The two piece clamp 519*a* and 519*b* may be activated by means of mechanized push rods 523 using hydraulic or pneumatic pressure from a pump 524*a* and reservoir 524. Clamps 519*a* and 519*b* may include magnetized locks to maximize locking hold. Apparatus 521 may be securely affixed to holder-stand 525 which forms part of the air-bridge structure 429*p*; 429*r* of Station X and Station Y.

FIG. 6I illustrates a side view; while FIG. 6J illustrates a front view of a variant apparatus 522 of sub-system 520. Mechanical limbs/or appendages 522 may consist of touch sensitive activated mechanisms integrated with computerized-mechanized robotic limbs/or appendages 522 comprising: robotic arms 526 (lower arm 526'; upper arm 526"); hands 527; fingers 528; and thumbs 529; integrated with electronic eyes (cameras 509) and artificial intelligence (AI). The figures illustrates robotic limbs 522 which may be configured with 4 fingers 528 and two thumbs 529; the robotic limb 522 securely holding a thick solid state frame 515 with a guide-line 304*aa* embedded inside. Two thumbs pressing on the four fingers provides superior grip and better hold than a single thumb; with the thick solid frame 515 providing a larger area and much better holding grip than a single strand of line 304*aa*. Frame 515 may comprise of: glass; fiber-glass; plastics; carbon-fibers; metal; etc. Similar robotic limbs 522 different in arrangement and form may also be configured to do useful work. Such artificial robotic limbs mimicking the extreme dexterity of the human limbs integrated with cameras and computerized Artificial Intelligence provides the best equipment and tools required to perform repetitive menial tasks in dangerous workplaces. Such as high altitude flight and deep sea diving, working in an environment fraught with extreme difference in pressure, temperature and oxygen deficiency. Where prolonged exposure may not be tolerated by human bodies. Apart from sub-system 520, the computerized-mechanical robotic limbs 522 comprising: robotic arms 526; hands 527; fingers 528; thumbs 529; may also be used for performing other delicate tasks on the air-bridge 429p and 429r; Station X and Station Y; used in support of other components of present invention and parent U.S. Pat. No. 8,963,362.

Gated sub-system 520 may comprise 3 individual pairs of gate apparatus 521 and/or 522 configured directly opposite each other along Lane A. One apparatus mounted on each side of the solid state frame 515'; 515" embedded with guide lines 304aa'; 304aa"; each pair of apparatus arranged one facing the other; aligned along the port side 515' and the starboard side 515" of said gate 520. Spaced out at an optimum distance; a multitude of such pairs of apparatus 521 and/or 522 greater than 3 in number (maybe up to 10) may be configured; in order for the sub-system 520 to work efficiently. A synchronized sequence of opening and closing said electronic gates 520 enables phased passage of the swivel holding rings 308aa (affixed to windbags 30aa) through the individual apparatus 521 or 522 of gates 520p; 520r. One gate at a time. The first gate to open being gate 1; with gate 2 and 3 closed. Then with gate 1 and 3 closed; gate 2 opens. Then with gate 1 and 2 closed; the last gate, gate 3 opens. Then with all the gates closed, the sequence started over again for a refreshed "new" incoming windbag 30aa.

FIG. 6K illustrates a puffed up windbag 30aa with inflated inlet port ring 22ap and air-ribs 277ap; outfitted with apparatus 530; a pair of swivel holding rings 308ap'; 308ap" at the sides; and bag cover 536 with retract line 33ar at the rear. FIG. 6L illustrates a computerized electronic air pressure control sub-system 530 for controlling the inflation and automated deflation of ring 22ap and air-ribs 277ap. Air may be pumped into the inlet port 531 by means of a hand held (robotic limb 522) air nozzle 535 to inflate windbags 30ap prior to being deployed. Equipped with radio frequency (RF) activated depressurizing system, controller 530 may be activated by means of RF transmitter 299raa and receiver antenna 534 to deflate windbags 30ap via exhaust port 532 as it approaches in proximity to gated sub-system 520r of Station Y. Flexible antenna 534 may be integrated into ring 22ap; or windbag 30ap. Transmitter 299raa may be mounted on air-bridge 429r. Apparatus 530 may also be used for RF activated depowering (299raa; 534) of the overall airborne wind power generation system 510 in time of emergency: e.g. approaching storms; faulty equipment; emergency shut down and demobilization of the whole plant, etc.

FIG. 6M illustrates a collapsible-extendable light weight cover 536 for keeping the depowered windbags 30ar in a collapsed form for passage from Station Y back to Station X. The cover 536 may be extended over windbags 30ar by means of robotic limbs 522 comprising robotic arms 526; hands 527; fingers 528; and thumbs 529; as the windbags 30ar passes through the gates 520r of Station Y. At Station X, as windbag 30ap approaches gate 520p; cover 536 may be collapsed and air injected into port 531 by means of hand-held (robotic limbs 522) air nozzle 535; inflating the ring 22ap, air-ribs 277ap. Windbag 30ap passes through gate 520p and is ready for the power run from Station X to Station Y. Optionally, at Station Y, a short retract line 33ar (aft) affixed to the apex 32aa of windbag 30aa may be pulled by robotic limbs 522 and secured to joint 31aa (fore) by means of a spring-loaded clip 533; keeping bag 30aa in a depowered state. Joint 31aa being the attachment point between tether 50aa and bridle lines 21aa. A piece of string 33ar affixed to point 32aa on the external of windbag 30aa; or the rear of cover 536; pulled and secured to clip 533 by robotic limbs 522 may serve the same purpose.

FIG. 6N illustrates sub-system 540; for coordinating the running sequence of the multitude of windbags 30aa. When a windbag 30aa starts its power run from Station X to Station Y; the driven unit 55ap may be moved from point marked X (514p'; 514p") to Y (514p'; 514p") on the ground. During the windbag retraction phase from Station Y to back to Station X; the driven unit 55ar may be moved from point Y (514p'; 514p") to point X (514r'; 514r"); the driven unit 55ar then waited for its turn before moving to point X (514p'; 514p") to start its next power run again.

For ease of identification in FIG. 6A to 6N, apparatus related to power generating phase from Station X to Y had been assigned a letter "p"; while apparatus related to the return; retrieval; or retraction phase from Station Y to X had been assigned a letter "r". For example: letter "p" in windbag 30ap denotes a bag in "power run" phase. Letter "r" in windbag 30ar denotes a bag in "retraction" phase. Windbag 30aa denotes reuse of a previously used number from the parent U.S. Pat. No. 8,963,362.

Windbags 30aa attached to guide-cables, wire-lines or guide-lines 304aa may be used for harnessing and extracting high altitude wind energy; said windbags running from one airborne workstation/or air-bridge to another: e.g. Station X to Station Y. Work stations X and Y may be airlifted by means of a plurality of HAV-400 wind-cranes; and kept in a relatively stable location and position. Station X and Station Y may be located at the same altitude. Or, Station X may be located at a height of up to 2 km; while Station Y may be located at a height of up to 10 km. Stations X and Y may be separated by a distance of up to 10 km. Windbags 30ap released from upwind Station X may be driven diagonally by the wind to downwind Station Y. Wind bags 30ap attached to tether lines 50ap may be connected to ground/or surface based generators 55ag. The capture of the wind current by means of windbag 30ap (drive unit 51); its power run from Station X to Y by the moving wind current being used to power generator 55ag (driven unit 55) to produce renewable electricity.

Spaced at regular intervals (distance of e.g. 100 m to 200 m apart) multiple wind bags 30ap may be run on a single pair of guide-lines 304ap (Lane Ap) at the same time. At the SOR point, a deflated incoming windbag 30ar from EOR point may be checked, prepared, and put on standby; ready to be deployed at the correct time. Wherein, said windbag 30aa may be refreshed by filling ring 22ap; air-ribs 277ap with compressed air; via the air inlet port 531 of apparatus 530; and released through the gates 520p; running from Station X to Station Y along guide lines 304ap'; 304ap"; pulling tether 50ap; powering generator 55ag. At Station Y windbag 30ap may be depowered and collapsed (air released from ring 22aa; air-ribs 277aa) via exhaust port 532 of apparatus 530. A piece of collapsible-extendable cylindrical/ or, cone shaped plastic cover 536 tapered at one end may be pulled and slipped over the depowered windbag 30ar to keep it in a collapsed position for the return journey. Retract line 33ar located at point 32aa pulled to point 31aa and secured to clip 533 serves the same purpose. Inlet port 25ar ring 22ar may also be clipped shut by means of robotic limbs 522. Or, embedded string 23ar may be pulled taunt to shut inlet port 25ar. The bag may then be routed to return guide-lines 304a'; 304a"; Lane Ar for retrieval by means of tether 50ar and retract motor 49ag from Station Y to X.

FIG. 6O illustrates a parallel seaborne system 510u; of the high altitude airborne wind energy harvesting system 510a as disclosed in FIG. 6A to FIG. 6N above with some variations. Such a parallel system may comprise of: a floating semi-submersible Station U 292aa located upstream; an underwater submerged Station V located downstream on the sea bed 537; a floating semi-submersible Station W 292aa located on the surface above Station V. Water-bags 40ap may be launched on power generating runs from surface Station U to submerged Station V located on the sea bed 537. Enabled by means of guide-lines 304ap' and 304ap" along run Lane Ap, Lane Bp, Lane Cp; etc. Sonar transmitter 299saa may be used to activate depowering of water-bags 40ap at the EOR phase; working in tandem with sonar receiver 298saa mounted at inlet port ring 22ap of bags 40ap. Upon completion of the power run; the swivel rings 308a'; 308a" may be detached from guide lines 304ap'; 304ap" by means of robotic hands 522 and attached to retract lines 304ar; and the bags 40aa moved to surface transition Station W located above Station V. This may be enabled by means of air pockets 538 formed in cavity 19ar; injected by robotic hand 522 held air nozzle 535. At Station W the bridle lines 21aa and bag 40aa may be detached from line 50aa. Line 50aa are retracted to Station U at speed. The water-bags are stacked together, then retracted from Station W back to Station U by means of surface vessels 539 bearing stacks of water-bags 541 via pulley system 48aa powered by HAV-400 wind crane. The bags are recycled and reused repeatedly.

Station V and Station W may be connected by a subsystem 540 for raising the submerged Station V from the seabed 537 to the surface level for servicing and repair works at intervals. And for lowering and reinstalling back Station V into its original location and position to continue working. System 540 may include motorized winches 59ap (port); 59as (starboard); loops of dual winching lines 542p'; 542p"; and 542s'; 542s"; seabed mounted pulley wheels 48ap (port); 48as (starboard); ballast tanks 543 (varying the amount of air to water content provides variable buoyancy); airbags 544; mounting pillars 545 piled into the seabed 537. Station V may be securely anchored to twin pillars 545 by means of designated slots, clamps, attachments, etc. Dual pairs of winch lines 542p'; 542p" and 542s'; 542s" may be used to connect Station V and Station W. At Station W winch lines 542p'; 542p" and 542s'; 542s" forms a loop around port winch 59ap and starboard winch 59as. The winch lines extends to two pulley wheels 48ap and 48as affixed to the seabed 537; forming two complete loops. Line 542p' and 542s' extending from Station W may be securely affixed to the sides of Station V at points 546p and 546s; and continues on, looping through the pulley wheels 48ap and 48as until the lines portions (now indicated as) 542p"; 542s" reached winches 59ap; 59as.

Such a configuration enables Station V to be brought up to the surface for repair works. Ballast tanks 543 normally full of water may be filled up with air displacing the water; creating buoyancy for lifting Station V. Airbags 544 located between the seabed 537 and the bottom of Station V may also be filled up with air to create added buoyancy. Reducing the weight of Station V; such that winches 59ap and 59as may lift it up to the surface with ease. Ballast-tanks 543 and airbags 544 may be inflated by means of compressed air from storage cylinders 203aa via air lines 204aa; or by means of air lines 204aa connected to surface based air cylinders 203aa or a compressor located at Station W. This may be enabled by means of underwater drones 230aa equipped with robotic limbs 522.

Seaborne eco-system 300aa may comprise of: power generation stations U; V; W; mooring buoys 508; FPSO vessel 511 with hydrogen generation plants 509; atmospheric carbon-dioxide (CO2) capture plant 547; diesel or methanol production plants 548 for manufacturing carbon neutral liquid fuels; tankers 296taa with spherical tanks 549 for offloading hydrogen via transfer line 551. CO2 derived from carbon capture and sequestration (CCS) projects may also be brought in by CO2 tankers to provide feedstock for liquid fuel production plants 548. Tankers 296taa and other ocean faring vessels may be powered by means of glider-drones HAV-400; or its variant HAV-400M. Anchoring lines 295aa from the mooring buoys; semi-submerged columns 552 and submerged pontoons 553 of Station U; Station W; may be anchored by means of pillars 545 piled into the seabed 537; or by means of suction cups 550 attached to the surface or floor of the seabed 537. Station V may be affixed to piles and pillars 545 extending from the seabed 537. Or, a subsea based Station V suspended in the sea below Station W may be anchored to the seabed piles using lines 295aa. Spar mounted facilities may also be adapted for use where applicable.

The height of the stations (Station U; Station W) above the sea surface may be controlled by the flooding or de-ballasting of the ballast tanks inside the columns 552 (legs) and bottom pontoons 553 of the semi-submersible stations. Flooding of ballast tanks reduces its buoyancy; and the station sink deeper/lower. De-ballasting of ballast tanks increases its buoyancy; the station rises higher up. Such flexibilities may be used during maintenance of Station V. Station W may be lowered down near to the sea surface; then Station V may be raised up to the surface by means of winch lines 542p and 542s; buoyancy tanks 543 and lifting air bags 544. Heavy duty chains may be used to link and attach the two stations together; one on top of the other. Station W may then be raised to a higher level by increasing the buoyancy of its ballast tanks. Thus enabling repair works to be carried out on Station V under dry dock conditions.

All phases of execution may be automated by means of an integrated system comprising: computerized smart artificial intelligence (AI); robotics; cameras; sensors; actuators; activation mechanisms; radio-frequency transmission; sonar transmission; remote sensing command and control systems.

FIG. 6P illustrates a variant reconfigured airborne wind-bags system 76av; with improvements in productivity, efficiency; fuel savings; zero-carbon-pollution wherein a zero-emission vehicle (ZEV) comprising HAV-400 (drone navigation unit) spearheaded a multitude of windbags 30ap in a power generating run; as compared to prior art system 76 (refer FIG. 5A of U.S. Pat. No. 8,963,362). HAV-400 replaces UAV-80 as drone navigation unit. FIG. 6Q illustrates the retraction phase of system 76ay. The navigation unit may consist of aerial drones comprising: glider drones; remote controlled drones; autonomous drones; or any type of suitable drones. Said drone navigation unit HAV-400 provides a means of directional control; guidance; powered flight if required to return to base. HAV-400 may be outfitted with winch 59aa; with the winch line 33ap affixed to point 229ap on tether line 50ap. The retract line 33aa may be reconfigured to connect winch 59ap (mounted inside HAV-400) via point 227ap (on the outside of HAV-400's body) to point 229ar on tether line 50aa. Compressed air generated by the ram-air-turbine 71aa of HAV-400 may be used to inflate ring 22ap and air ribs 277ap by means of an air-line 278aa integrated with tether 50ap. During the end of run (EOR) phase, gearbox 53ag of driven unit 55ag may be put on free gear; wherein said windbag 30aa flows freely with the wind current exerting zero tensile force on tether 50aa. HAV-400 may use winch 59ap to wind back the retract line 33ap until point 229ap coincides with point 227ap on body of HAV-400. Optionally, it may turn on its propulsion system to fly a short distance to point 229*ap*. A radio frequency transmitter (RF) 299*raa* may be installed at point 229*aa*. A radio frequency receiver cum RF signal homing device 554*r* may be installed at point 227*ap*. In case of retract line 33*ar* failure; a radio-frequency transmitter 299*raa* positioned at joint 229*ar*; and a radio-frequency receiver cum homing device 554*r* installed in the body of HAV-400 at point 227*ar* may be used. Homing in on the RF homing signal coming from point 229*ar*; HAV-400 flew towards 299*raa* until points 227*ar* and 229*ar* coincides; and latches itself securely onto line 50*ar* near to point 229*ar* by means of specially configured and customized attachments comprising: hooks; rings; clips; grippers, etc. Wherein said multiple windbags 30*aa*; 30*ab*; 30*ac* reversing direction behind HAV-400; are instantly depowered. As their aft joining point 32*ap* faces fore, into the oncoming wind (W); while the fore bridle lines joining point 31*ap* faces aft; as illustrated in FIG. 6Q. The glider-drone HAV-400 and line of depowered bags may then be retracted back to the start-of-run (SOR) point 16*aa* by means of electric powered retract motor 49*aa* which reeled back tether line 50*ap*. Such an arrangement eliminates the need for a long retract line 33*aa* all the way from the SOR point 16*aa* to the EOR point 288*aa*. And requires only a short portion of retract line 33*ap* from point 229*ap* to point 227*ap* (and winch 59*aa*) to be used. The inlet-outlet port 227*ap* on the external body of HAV-400 allows retract line 33*ap* to pass through to internal winch 59*ap*. This modification totally eliminates the need for HAV-400 to fly all the way from EOR point 288*aa* back to SOR point 16*aa* under its own power. Thus saving fuel; eliminates carbon pollution; improving productivity and efficiency of the improved system 76*ay*.

A variant reconfigured parallel underwater system 222*av* using drone navigation unit UUV-230aa/or HAV-200aa may be used as a substitute for system 222 (refer FIG. 5A; U.S. Pat. No. 8,963,362); or to improve it. The reconfigured system 222*av* may comprise of a modified zero-emission-vehicle (ZEV) UUV-230av equipped with pneumatic/or battery powered winch 59*aa*; air tanks 203*aa*; air lines 204*aa*; 278*ap* combined with tether line 50*ap*; etc. The retract line 33*ap* may be reconfigured and/or modified to connect winch 59*ap* (mounted inside UUV-230av) via point 227*ap* (inlet and outlet port) to point 229*ap* on tether line 50*ap*. A sonar transmitter 299*saa* may be installed at point 229*ap*. A sonar receiver cum sonar signal homing device 554*s* may be installed at point 227*ap*. In case of retract line 33*ar* failure; a sonar transmitter 299*saa* positioned at joint 229*ar*; and a sonar receiver cum homing device 554*s* installed in the body of UUV-230aa at point 227*ar* may be used. Homing in on the sonar homing signal coming from point 229*ar*; UUV-230aa propels itself towards 299*saa* until points 227*ar* and 229*ar* coincides; and latches itself securely onto line 50*ar* near to point 227*ar* by means of specially configured and customized attachments comprising: hooks; rings; clips; grippers, etc. Hydrogen fuel cells (using hydrogen gas generated by eco-system 300*aa*) and batteries may be used to provide electric propulsion for said ZEV drones; HAV-100aa; HUV-200aa; UUV-230av; HAV-400. Renewable fuels mix comprising methanol; biodiesel, etc. may also be used. Bottled compressed air from cylinders 203*aa* may be used to inflate inlet port ring 22*ap* and air ribs 277*ap* by means of air-line 278*aa* integrated with tether 50*ap*. Two-way communications between the Control Center (command; execution signals) and the drone navigation unit (feedback; status signals) may also be enabled by means of a hard wire communication line integrated with the tether line 50*ap*.

FIG. 6R illustrates the use of naturally occurring reliefs and geological features on the seabed or the sea-floor 537 as anchoring points for securing lines 295*aa* to anchor mooring buoys 508; semi-submersible production stations U, W, 292*aa*; floating flat-bed platforms 293*aa*; inflatable floating bodies 294*aa*; and other components of ecosystem 300*aa*. Such geologic features may comprise seamounts 555 and islands 560. Submerged seamounts 555 may comprise: guyots 556; pinnacles 557; knolls 558; etc. Such that surface unevenness in the topography comprising: holes; indentations; protrusions; fissures; cracks; nooks and crannies, etc. of the seamounts 555; submarine ridges 559; trenches 561; canyons; seafloor 537, etc. may be adapted, modified and converted for use as anchoring points for securing lines 295*aa*. By means of man-made apparatus comprising: piles 562 and pillars 546; reinforced concrete beams 563; cement plugs 564 inserted or built into artificial and/or natural caverns 565; holes 566 drilled and artificial grooves 567 cut into suitable places of the rocky features of the seamounts 555 and islands 560, etc. Such that anchor lines 295*aa* may be secured to pillars 545 and piles 562; lines looped around small hills, pinnacles 557 ridges 559; lines looped through holes 566 held securely in recessed grooves 567; etc.

FIG. 6S illustrates an enlarged view of a strategically located reinforced concrete beam 563 placed in position in between the V-shaped valley formed by two seamounts; a guyot 556 and a ridge 559 with the securing line 295*aa* exiting from the opposite side of the V-shaped valley; for securing a floating body on the surface in position. Pillar and beam 563 may be locked in position by means of U-shaped piles 568 inserted into the seabed 537. Also illustrated is an enlarged view of a reinforced concrete wedge 564 built inside a small natural or artificial cavern 565 with a narrow opening; with line 295*aa* attached to the exposed tip of the conical/or pyramidal shaped cement plug 564. All such modifications and adaptations shall be carried out with the least disruption to the existing natural ecosystem.

FIG. 6T to FIG. 6X illustrates system 570 for channeling sea water current by means of man-made sea walls 571*p* (port) and 571*s* (starboard); said walls 571 may be configured into a V-shaped apparatus. An inclined overhead ceiling 571*c* may be used to divert water flow from above. Seafloor 537*f* (floor) forms the bottom floor. A skid 572 of turbines 471 may be located at the V-shaped apex 569 where converging water flowed fastest due to constriction caused by the walls of the apparatus 570. A large inlet port converging the water to flow through a small constricted outlet or port. Wherein said skid 572 comprising a multitude of water turbines 471 may be used to harvest the kinetic energy of the high speed water current efficiently. Optionally, said apex 596 may be configured as a tunnel-like structure 569*t*; into which a specially configured seaborne hydro-electric generation tunnel 575 carrying a plurality of large turbines 471 units may be slotted/or inserted.

FIG. 6T illustrates the plan view of a funnel shaped configuration of sea walls 571; while FIG. 6U illustrates the perspective view. Water intake port 573 of apparatus 570 may be protected by a cage and mesh 573*c* which acts as a filter keeping out marine wildlife. FIG. 6V illustrates the front view of an individual turbine 500*b* mounted in a square shaped frame 574. FIG. 6W illustrates the perspective view of a skid 572 of turbines 471. This structural configuration enables a plurality of turbines 471; 500*b*; etc. to be slotted into and stacked up in the skid 572. One unit on top of another. Wherein, rows upon rows; stacks upon stacks of turbines may be arranged inside said skid 572. Apparatus 570 and skid 572 may be anchored to the sea floor by means of pillars 545 or piles 562. The whole skid 572 may be installed/or removed by means of winches 59as; 59ap; mounted on semi-submersible Station W 292aa; or by means of floating crane barges for periodic maintenance.

FIG. 6X illustrates a variant configuration wherein said apex 569 may be configured as a tunnel-like structure 569t; with a flip-able top roof cover. Such that this top roof cover may be flipped open or close; and secured in place. A specially configured seaborne hydro-electric generation tunnel 575 containing a plurality of large water turbines 471; or 500b; etc. may be slotted into/or removed from the flip-able top roof cover of tunnel 569t. Such that apparatus 575 may be lowered into tunnel 569t during installation; or lifted out by means of semi-submersible Station W 292aa; or crane barges for maintenance. A central shaft 576 for mounting said plurality of turbines may be configured in the center supported by peripheral beam 575s. Shaft 576 may be split into sections 576a; 576b; 576c; and configured for separate operation of each individual turbine units. The rotational movement of the turbine unit 471a may be transmitted from the individual horizontal shaft section (e.g. 576a) to an angular transmission gear box 476u; to vertical shaft 475u; to generator unit 577a. Submarine cable 457u may be used for transmission of power generated to shore or surface vessels 511.

FIG. 6Y illustrates system 580; a plurality of water turbines suspended in the sea. A mooring buoy 508; or, a floatation-ballast tank 578 on the sea surface enables line 457u to hold the submerged turbines 471; 500a; 500b; in place while the other end of line 457u may be anchored to the sea floor by means of a suction cup device 550; or to other means such as piles 562. Top surface of tank 578 may incorporate solar cells 579 for generation of electricity to power navigation lights and RF signals. The body of turbines 471; 500a; 500b; may be outfitted with swim control surfaces comprising: fins, planes 205aa; 207aa; stabilizers 208 to keep them in proper orientation. Optionally, the whole apparatus comprising: the ballast tank 578 and line of turbines may be configured to be totally submerged below the sea surface. In order to avoid hazards posed by surface ships. This may be effected by means of: air tanks 203aa; air-lines 204aa; and an automated system for buoyancy control of ballast tank 578.

All critical components of the above water-turbines; their electrical generation and transmission systems, etc. may be enwrapped in an impervious layer of cover/or protective materials. Such materials may comprise plastics; polymers; fiber-glass; carbon composites; poly-ethylene; poly-propylene; etc. Such protective materials for insulation of electrical components and corrosion prevention may be sprayed-on, applied as a coating, wrapping, embedded, impregnated, etc.

Normally renewable energy generation may be associated with a distributed network for direct extraction and generation of electrical power. However, in a variant configuration renewable energies extracted by a multitude of drive units 51aa may also be congregated into integrated driven unit 585a; 585b; 585c; comprising a centralized generation plant 585 for production of electricity as illustrated from FIG. 7A to FIG. 7H.

FIG. 7A to FIG. 7H illustrates system 600 comprising: (a) A Distributed System for Extraction of Energies from high altitude wind currents and deep sea ocean currents by means of drive units 51aa; (b) a tensile force transmission system for channeling and transmitting this extracted energies to a; (c) utility scale Centralized Power Generation Plant 585. Said generation plant 585 comprises: driven unit 584a; 584b; 584c; line reel drums 582; gearboxes 583; clutch boxes 587; retract motors 589; for producing renewable electricity; wherein, variant driven units may include counter-rotational generators 590d; 590h. The energies transmitted may be converted into other forms of energy; or for doing other useful work.

FIG. 7A illustrates a single drive unit 51aa comprising of: a plurality of drones HAV-400a linked in series flying one on top of another; connected by a single tether 50aa to generator 55ag. Combined use of such a multitude of airborne glider-drone HAV-400 wind-cranes produces a much more powerful lifting force to power generator 55ag; than a single unit. Such a configuration may also be used to power the systems of centralized power generation plant 585.

FIG. 7B illustrates system 600 comprising of: a centralized power generation plant 585 connected to and powered by a multitude of high altitude wind energy extraction apparatus made up of drive units 51aa comprising: HAV-100aa; windbags 30aa; HAV-400; windbags system 76av; morphing kite-glider-drone vehicles HAV-400M armed with windbags and wing-suits 30aa. The generation plant 585 may comprise of a plurality of driven units 585a; 585b; 585c connected to a single common shaft 581. Wherein, said driven units 585a; 585b; 585c may be powered by a plurality of drive units: 51aa; 51ab; 51ac; etc. The common shaft 581 linked together all components of the plurality of driven units 585a; 585b; 585c. Wherein, an individual driven unit 585a may comprise: line reel drum 582, gearbox 583, generator module 584a; bearing boxes 586; clutch box 587; retract motor 589. Said plurality of driven units 585a; 585b; 585c may be configured to move in unison with each other in a single direction of rotation (stators-rotors configuration); just like conventional generators the world over.

A variant configuration allows and enables each individual driven unit (e.g. 585a; 585b; 585c) to move in different directions of rotation. Wherein, said main shaft 581 may be adapted into individual section 581a; 581b; 581c; etc. Such that each said section 581a; 581b; 581c; may be connected together; or segregated from each other by means of an apparatus 587. Working like a simplified vehicle's clutch-gear system; apparatus 587 may be used to link and connect two shaft sections (e.g. 581a; 581b) together when it is shifted into an engaged position. When it is shifted into the neutral position (freed), apparatus 587 disengages this linkage; breaking the connection between the two sections (e.g. 581a; 581b); allowing them to rotate freely and turn independently of each other. Apparatus 587 may be also be integrated with gearbox 583 into a single unit; such that a particular drive unit may be engaged; or disengaged as and when required (refer FIG. 7C). Such flexibility enables the use of counter-revolving generators comprising 590d; 590h. For example: driven unit 585a; driven unit 585c mounted in section of shaft 581a; 581c may be configured to rotate clockwise; whereas driven unit 585b mounted in section of shaft 581b may be configured to rotate anti-clockwise. Such that said opposing directions of rotations may be used to power variant generator modules such as: 590d; 590h; configured with dual counter-rotating rotors comprising: rotor wire coils and rotor magnets.

FIG. 7C illustrates details of FIG. 7B wherein the line reel unit 582; gearbox unit 583 and clutch unit 587 may be integrated together as a single unit; powering the generator 584 by means of main shaft 581. The combined unit 585 may be assigned new identifying numbers: line reel drum (582); gear box (583); retract motor (589). Retract motors 49*ag* may be directly connected to the line reel drums 582 (bypassing the common shaft 581) and identified as 589.

FIG. 7D illustrates system 600; a variant driven unit 585*d* configured with a variant vertically disposed twin rotating discs generation unit 590*d'*; 590*d''*; 590*d'''*. FIG. 7E illustrates details of FIG. 7D. Driven by a plurality of drive units 51*aa* via shaft 581; said double discs comprising: rotor coiled wire disc 486; rotor magnet disc 487; turning in opposite directions; counter rotates against each other to generate electricity (refer FIG. 4E; FIG. 4F). Generator 590*d* of FIG. 7E may be used in the centralized power plant 585 to generate electricity. Wherein, said individual driven units 585*d'*; 585*d''*; 585*d'''*; associated with individual sections of shaft 581'; 581''; 581'''; may be connected to and powered by a multitude of: (a) high altitude flying wind energy extraction apparatus made up of drive units 51*aa* comprising: HAV-100aa; 30*aa*; HAV-400; HAV-400M; windbags 30*aa* system 76*av*; and (b) deep-sea diving water energy extraction apparatus made up of drive units 51*aa* comprising: HUV-200aa; water-bags 210*aa*; water-bags 40*aa* system 222*ay*. The drive units 51*aa* may be linked to the driven units 585*d'*; 585*d''*; 585*d'''*; by means of: (a) pulley wheels 48*aa*; (b) line reel drums 582; (c) dual line reel drums 582 cum 588 with transmission lines 591 protected by hard cover 592. This system of using auxiliary apparatus enables drive units 51*aa* to be distributed at an extended range/or a long distance away from the centralized generation plant 585. Providing an extended range and an enlarged area/or volume for extraction of airborne and waterborne energies.

FIG. 7F illustrates a variant line reel spool 582 in which dual units of line reel drums 582; 588; may be joined together with a shaft 593; and bearing boxes 586 mounted on a supporting body frame 594. Line reel drum 582 may be loaded with tether lines 50*aa*. While line reel drum 588 may be purposely kept empty; and linked to line reel drum 582' (full drum). Such that when the lines are transferred from drum 582' to drum 588; drum 588 may be fully loaded with transmission lines 591 from drum 582' (refer FIG. 7D, drive unit 222*av*). Such auxiliary apparatus may be used as a transfer mechanism for intermediate energy transmission between the drive units 51*aa* and driven unit 581*a*; when the two units may be separated by a long distance, e.g. 3-5 km apart.

FIG. 7G illustrates system 600; a variant driven unit 585*h* configured with a variant horizontally disposed twin rotors generation unit 590*h*. FIG. 7G also illustrates the combined use of auxiliary apparatus (a) to (c) disclosed in FIG. 7D above; together with: (d) extended transmission shafts 595; (e) and a variant angular transmission gear box 583*v*; etc. in the extraction of wind and water energies from an enlarged area/or volume of the natural ecosystem. Such apparatus may be used to overcome physical obstructions caused by hills, cliffs, corners, sharp bends, etc. and improve operational flexibility and dexterity. The extended transmission shafts 595; and tensile force (energy) transmission lines 591 running in between line-reel-drums (LR1) 582'; (LR2) 582''; (LR3) 582''' and the gear boxes 583; 583*v*; may be covered by conduit pipe 592 for safety purposes.

The following description on the port side of generator 590*h*; main shaft 581*p*; illustrates combined use of the plurality of line-reel-drums: 582'; 582''; 582'''; powered by HAV-400. For simplicity the drums may be referred to as: LR1; LR2; LR3. The LR1 comprises of normal line reel drum 582' fully loaded with tether line 50*aa*. LR2; LR3; lines 591 in between them may comprise the tensile force transmission system. To start with, LR1 may be loaded full of line 50*aa*. LR2 may be empty; LR3 may be loaded full of lines 591. Operation of said plurality of line-reel-drums: 582'; 582''; 582'''; for transmission of tensile force produced by HAV-400 on tether line 50*aa* to generator 590*h* may be described in the following steps: Tensile force on tether line 50*aa* may be transmitted by means of pulley wheels 48*aa'* and 48*aa''*; causing LR1 to rotate. This rotational movement is transmitted from LR1 to LR2 by means of extended transmission shaft 595'. This causes empty LR2 to wind in lines 591 from the fully loaded LR3; causing LR3 to rotate. LR3 then transmitted this tensile force by means of extended transmission shaft 595'' to gearbox 583*p*; which transmitted this tensile force to the port side main shaft 581*p*; causing it to rotate. This shaft rotation is transmitted to generator 590*h*; causing the rotor wire coil 474 to rotate.

The following description illustrates use of a plurality of extended transmission shafts 595; gearboxes 583 and a variant angular transmission gearbox 583*v*; for transmitting the tensile force produced by HUV-200aa to generator 590*h* (port side; shaft 581*p*). Tensile force generated by HUV-200 may be transmitted by means of: the tether line 50*aa* to line reel drum 582 via pulley system 48*aa*; causing drum 582 to rotate. This rotational movement may be transmitted by means of extended transmission shaft 595*a* to variant gearbox 583*v*; then to gearbox 583*p''* by means of extended transmission shaft 595*b*; then to gearbox 583*p'* mounted on main shaft 581*p* by means of extended transmission shaft 595*c*. Gearbox 583*p'* then transmitted this torque to shaft 581*p*; which is then transmitted to generator 590*h*; causing the rotor wire coil 474 to rotate.

Drive units HAV-400 and HUV-200aa may take turn to run. When one drive unit is working; the other may be retracted and put on stand-by. Similarly, drive units HAV-100aa and HAV-400 located on the starboard side of generator 590*h*; main shaft 581*s*; takes turn to operate to power generator 590*h*; causing rotor magnet 476 to rotate. The counter-rotation of said rotor wire coil 474 and rotor magnet 476 enables utility scale generator 590*h*; and thus the Centralized Power Generation Plant 585 to produce renewable electricity. Instead of two alternate drive units on each of the port and starboard side of generator 590*h*; multiple units may be configured and sequenced to run providing much more powerful torque for 590*h*.

Such a tensile force transmission system comprising: energy transmission tools, equipment and apparatus provides an enabling means for operation of system 600. A system for harvesting energies from the natural environment by means of a multitude of distributed apparatus; and the transmission of this collected energies; to a central power plant 585 for generation of renewable electricity.

FIG. 7H illustrates details of FIG. 7G. Driven by a plurality of drive units 51*aa* via shaft 581*p*; 581*s*; said double rotors generator comprising: rotor wire coil 474; rotor magnet 476; may be configured to turn in opposite directions; counter rotating against each other to generate electricity (refer FIG. 4C; FIG. 4G). If the wire coil 474 rotates clockwise; then the magnet 476 rotates anti-clockwise. Or, vice-versa. Both of the rotors comprising: wire coil 474 and magnet 476 may be individually connected to the shaft 581*p* (port side); 581*s* (starboard side) and powered by its own dedicated drive units. Port side drive units 200*aa* and 400 may be connected directly to the shell mounted wire coil 474 by means of shaft 581*p* and yoke 484*p*. Wire coil 474 may be supported on the starboard side by yoke 484*s* and bearing ring 596. While the starboard side drive units 100*aa* and 400 may be connected directly to the center mounted electro-magnet 476 by means of starboard side shaft 581*s*. Generator 590*h* may comprise of rotor wire coil 474; rotor magnet 476 linked by individual sections of shaft 581*p*; 581*s*; wherein, said sections 581*p*; 581*s* may be held in position by means of a bearings 597 sleeve 598. Such that even though sections of shaft 581*p*; 581*s* may rotate in opposing directions; they may be aligned with each other. The sections 581*p*; 581*s*; may be supported by a plurality of bearing boxes 586 affixed to pedestals 599. Generator 590*h* may be protected by external body cover 473; and mounted on a solid base 594. Compared to conventional rotor-stator generators, such a counter-rotating configuration of system 590*h* enables much higher efficiency and productivity. As the speed and movement of the generating surfaces of both rotating elements relative to each other may be doubled. A variable electrical (or magnetic flux) controller 466 may be used to vary the supply of current to the electro-magnet 476 of the generator; and thus vary the production of electricity relative to the wind power available at the point in time.

Conventional combined cycle power systems typically have a primary drive unit to power a stator-rotor generator; then use the exhaust flue gas; (or recover the heat energy by generating steam) for powering a secondary drive unit cum generator.

FIG. 7I illustrates a variant combined cycle power generation plant using a counter-rotating generator 590*h*. Input to the primary drive unit 601 comprising fuel; high pressure steam; etc. may be routed by means of pipe 602. Wherein, the exhaust flue gas; or steam from primary drive unit 601 located on the starboard side of said generator 590*h*; may be routed via pipe 603 to the secondary drive unit 604 (located on the port side) to drive said generator 590*h*. Such that the primary drive unit 601 drove the rotor magnet 476; while the secondary drive unit 604 drove the rotor wire coil 474. After drive unit 604; the exhaust may then be routed via pipe 605 to the tertiary drive unit 606 for driving a steam turbine-generator; or flue gas turbine-generator to produce power. Or a waste heat generator to produce low pressure steam or hot water.

FIG. 8A illustrates a variant submerged system 570*u* of FIG. 6T to FIG. 6X; wherein a reconfigured water-bag 40*aa* may be integrated with a seaborne hydro-electric power generating tunnel 575*v* for producing renewable energy. Tunnel 575*v* may be similar in purpose to the penstock of a HEP dam. Water-bag 40*aa* may be used as a funnel to entrap the flow of sea water; concentrate this large flow of water into a constricted tunnel 575*v* fitted with a plurality of turbines 471 to generate electricity. Turgid inlet port ring 22*aa* and water-ribs 277*aa* kept water-bag 40*aa* in functional shape. The light-weight tunnel 575*v* made of fiberglass; carbon fiber; Kevlar, plastics, etc. may be and attached to a semi-submersible Spar buoy 607 on the water surface. The bottom portions of the submerged water-bag 40*aa* and the power generating tunnel 575*v* may be securely anchored by means of a plurality of lines 295*aa* to the seabed 537; seamounts 555 comprising: ridges 559; beams 562; plugs 564 inserted into cavern 565; holes 566 with grooves 567. The while the upper portions may be anchored to floating buoys 508 on the sea surface and/or submerged ballast tanks 579 by means of lines 457*u*. Fishing nets 573*c* may be used to keep out marine wildlife. Electricity generated by the seaborne hydro-electric power generating system 570*u* may be routed by means of cable lines 457 to ground stations on shore/or, to mooring buoy 508; FPSO 511 equipped with electrolyzer plants 509; ecosystem 300.

FIG. 8B illustrates a parallel airborne system 570*a*. Such a system may also be configured and used for airborne deployment of windbags 30*aa*. Wherein, similar to the underwater system 570*u*; said airborne system may comprise of a plurality of glider-drones HAV-400; HAV-400M wind-cranes carrying aloft a large windbag 30*aa* connected to a light-weight tunnel 575 bearing a plurality of turbines; by means of a plurality of tether lines 50*aa* and mooring lines 46*aa*. Inflated inlet port ring 22*aa* and air-ribs 277*aa* kept windbag 30*aa* in functional shape. The upper portions of the windbag 30*aa* and tunnel 575*a* may be lifted up by means of a plurality of tether lines 50*aa*; bridle lines 21*aa* attached to a plurality of HAV-400s; balloons filled with LTA gases; etc. While the bottom portions may be anchored to a plurality of boats 220*aa*; mooring buoys 508; semi-submersible Spar buoy 607 on the sea surface. On land the system may be secured to the ground; adapted hills; mountains and valleys by means of a plurality of tether-cable 478 and piles specially inserted for mooring the system. Electricity generated by the airborne aero-electric power generating system 570*a* may be routed by means of tether-cable 478 to ground stations/or to mooring buoy 508; FPSO 511 equipped with electrolyzer plants 509; a combined ecosystem 500 and 300.

FIG. 8C illustrates a system wherein, a plurality comprising pieces or strips of fabric materials 415*b* may be carried aloft by means of a plurality of light duty glider-drones HAV-400; or HAV-400M wind cranes. A variant system of power kites gliders 400*v*; /or kite drones 400*v* which use only wind energy to generate aerodynamic lift; tether 50*aa* and mooring lines 46*aa*; may also be used. Said strips of light-weight materials may comprise solar fabrics 415*b* for harnessing solar energy to generate renewable electricity. Such materials may be mounted on a layer of aero-foams 608; light weight foams filled with bubbles/or pockets of lighter-than-air gases: comprising helium; hydrogen; etc. Such that said pieces of aero-foams 608 may be buoyant to a certain degree due to the presence of LTA gases used in its manufacture; light-weight; and maintains its physical shape. Multiple strips of such aero-foams bearing solar fabrics 415*b* may be joined together by means of lines 609 forming an airborne flying carpet for harnessing solar energy. A plurality of lines 609 may also be used by a plurality of HAV-400 to lift the apparatus up. Gaps of empty space left in between said strips of interlinked aero-foams 608 cum solar fabrics 415*b* allows passage of wind current. Power generated may be channeled by means of cable-tether 478. Such light weight aero-foams 608 and solar fabrics 415*b* may also be used on water surfaces as floating solar energy collectors as illustrated in FIG. 8D.

Whenever and wherever practicable all activities, equipment, vessels, etc. of present invention shall be powered by means of zero-carbon energies generated by the bagged power generation system. All activities would be carried out in compliance with relevant government regulations; international protocol; IPCC requirements; in consultation with NGOs; environment groups; etc. expediting change-over of our present carbonaceous; hydrocarbon based economy to a clean hydrogen—electrified economy powered by renewable energies.

Global climate change is a man-made catastrophe. Therefore, this existential threat may be aggravated or mitigated dependent upon: human decisions; actions and reactions. $CO_2$ caused climate change is bad enough. The main danger lies in the hijack of climate change by methane gas emissions—from the deep-sea methane hydrate deposits; Arctic and Antarctic methane hydrate deposits; stored underground for millions of years. When $CO_2$ induced global warming heated up these stored deposits of carbon; causing their inadvertent release into the atmosphere. That may well be the start of human extinction. What? Mankind—to follow the dinosaurs into extinction; history? And this is (may) already (be) happening!Because methane gas is 100 times more potent than CO2 in its first ten year period. It is 20 times more potent over a 100 years period. Another gas that accompanies methane release in smaller quantities, nitrous oxide N2O is 300 times more potent than CO2. Humans must use our own personal knowledge; common sense; judgment; moral and religious values; in our search for answers to questions in which we may not be experts. Scientific papers; peer reviewed documents; climate data; Paris Climate Accord; etc. may provide more information. Internet searches may include phenomena such as: "methane bubbles in Arctic lakes"; "methane blow holes"; "exploding pingo"; "trembling tundra"; "7000 under-ground methane gas bubbles poised to explode in the Arctic"; methane gas bubbles trapped in ice in Alaska, tundra; Arctic expeditions; surveys of Centre for Arctic Gas Hydrates and Environment (CAGE); "SWERUS"; undersea methane flares; etc.

Mission-Vision Statement: To reduce; eliminate Global Warming; to save our spaceship—Planet Earth from the dangerous effects of Global Climate Change! The use of drones to serve humanity! To produce clean energy; to preserve clean air and clean water for all of us! We must always remember this; that we only have:

One race—Humanity! One planet—Earth! One common Destiny!

We must all work hard to preserve; not destroy, our one and only "live support system"—Earth's biosphere! For in the fate of mother Earth; and in our own hands, lies our common destiny—for all things living on this planet; and future generations of—plants; animals; humans. It is our common duty and responsibility to do our part: innovators, entrepreneurs, financers, governments and NGOs, etc. To Save The World, Our World! "Look high, look far. Our aim the sky, our goal the stars!" To an inventor the sky's the limit.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A system for generation of electrical power by means of a deep sea diving energy generator placed in sea water (222) comprising:

a drive unit (51) comprised of an underwater drone (230; 200), first and second tether lines (50$aa$; 50$a'$) each having a first end and second end, and a retract line (33) having a first and second end, the first tether line attached at its first end to the underwater drone and at its second end to the second end of the retact line, the retract line further includes a plurality of waterbags connected in series to the retract line;

a driven unit (55) having a body that includes a generator (54), the driven unit attached via the second tether line to the underwater drone where the first end of the second tether line is attached to the generator and the second end of the tether line is attached to the second end of the first tether line and the second end of the retract line;

wherein tensile force exerted on the waterbags by the sea water current is transferred via the tether line to the driven unit to generate electricity;

wherein the underwater drone controls the system and depowers the system by turning the retract line.

2. The system of claim 1 wherein the driven unit further includes a line reel drum (52), a gearbox (53), a retract motor (49), and means for supporting the driven unit, wherein the retract motor is operable to reel in and retract back the second tether and waterbag and the drive unit is adapted to turn the retract line.

\* \* \* \* \*